United States Patent [19]
Yoshimoto

[11] Patent Number: 5,818,968
[45] Date of Patent: Oct. 6, 1998

[54] HIGH-EFFICIENCY CODING METHOD, HIGH-EFFICIENCY CODING APPARATUS, RECORDING AND REPRODUCING APPARATUS, AND INFORMATION TRANSMISSION SYSTEM

[75] Inventor: Masakazu Yoshimoto, Kanagawa, Japan

[73] Assignee: Sony Corporation, Tokyo, Japan

[21] Appl. No.: 618,514

[22] Filed: Mar. 19, 1996

[30] Foreign Application Priority Data

Mar. 20, 1995 [JP] Japan .................................. 7-061202

[51] Int. Cl.$^6$ ...................................................... G06K 9/00
[52] U.S. Cl. .......................................... 382/236; 382/239
[58] Field of Search .................................... 382/103, 104, 382/106, 107, 168, 232, 233, 235, 236, 238, 239, 244, 245, 248, 251, 252, 253, 272, 275, 274, 300, 305, 307, 234, 240, 243, 250; 358/426, 427, 428, 429, 430, 431, 432, 433, 261.1, 261.2, 261.3, 261.4, 262.1, 699, 413, 416, 417, 418, 402

[56] References Cited

U.S. PATENT DOCUMENTS

| | | | |
|---|---|---|---|
| 4,307,420 | 12/1981 | Ninomiya et al. | 358/136 |
| 5,194,950 | 3/1993 | Murakami et al. | 358/133 |
| 5,398,078 | 3/1995 | Masuda et al. | 348/699 |
| 5,450,209 | 9/1995 | Niimura et al. | 358/335 |
| 5,650,829 | 7/1997 | Sugimoto et al. | 348/699 |

*Primary Examiner*—Leo H. Boudreau
*Assistant Examiner*—Bijan Tadayon
*Attorney, Agent, or Firm*—Frommer Lawrence & Haug LLP; William S. Frommer

[57] ABSTRACT

A high-efficiency coding apparatus is provided which can increase accuracy in motion compensation and also increase processing speed without increasing the circuit scale as compared with the case that motion detection is carried out with respect to both of even and odd fields. Thus, this high-efficiency coding apparatus can perform accurate encoding, and can realize satisfactory transmission or recording of information. This high-efficiency coding apparatus is formed with frame memories for storing image information of a present frame therein, a frame memory for storing image information of a preceding frame therein, a frame type/2-field type motion detecting circuit for obtaining frame motion vector data of half-pel accuracy and 2-field motion vector data of half-pel accuracy by effecting motion detection of pixel data located within reference blocks located within the search area of a preceding frame and pixel data located within a remarkable block of the present frame, and selectively outputting these motion vector data. A motion compensating circuit effects motion compensation based on the selected output and an adding circuit effects encoding of the image information of the present frame and motion-compensated image information.

15 Claims, 43 Drawing Sheets

16 Pixels
MB
16 Lines

Scanning Trajectory of Raster Scan

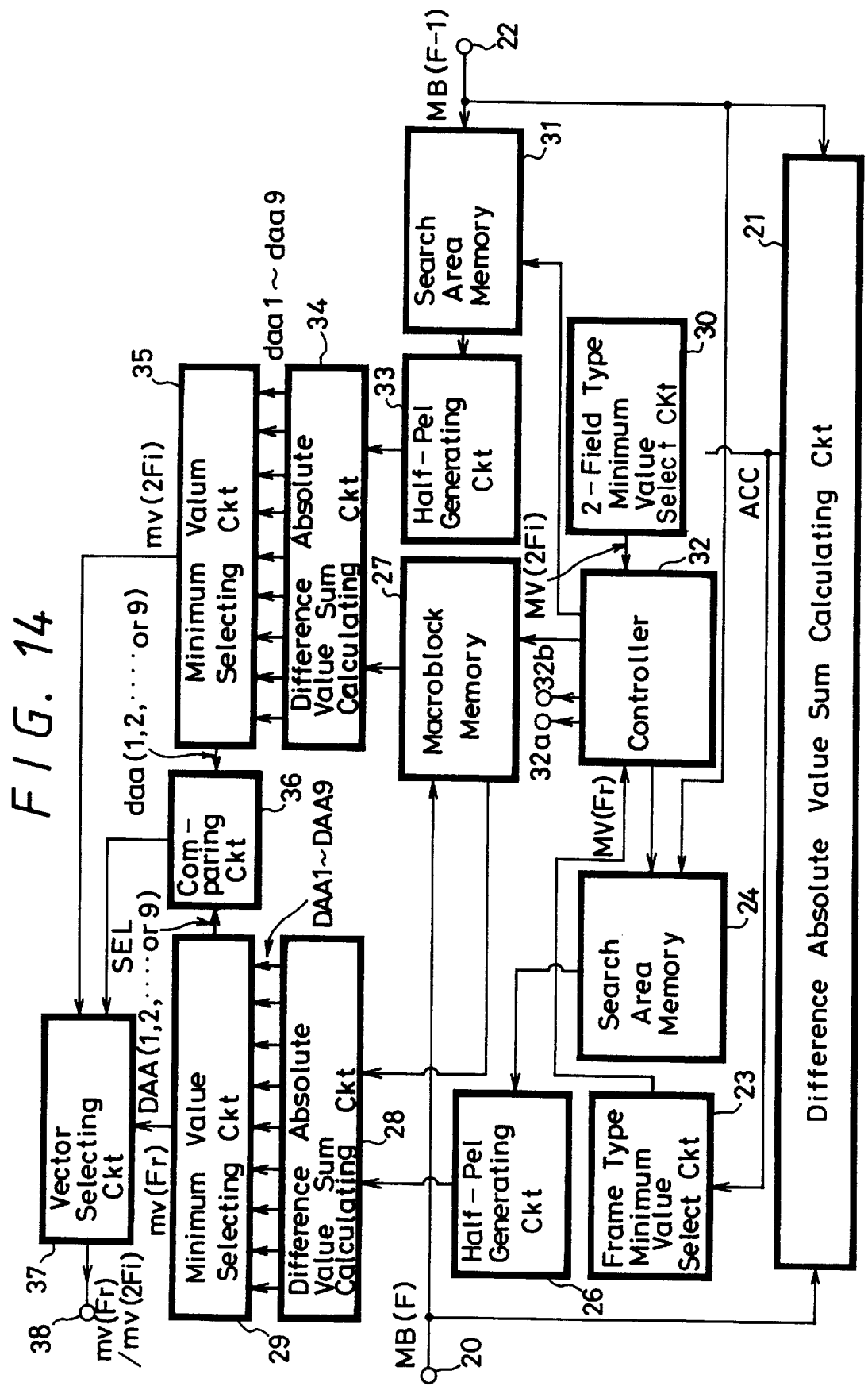
F I G. 14

F I G. 25
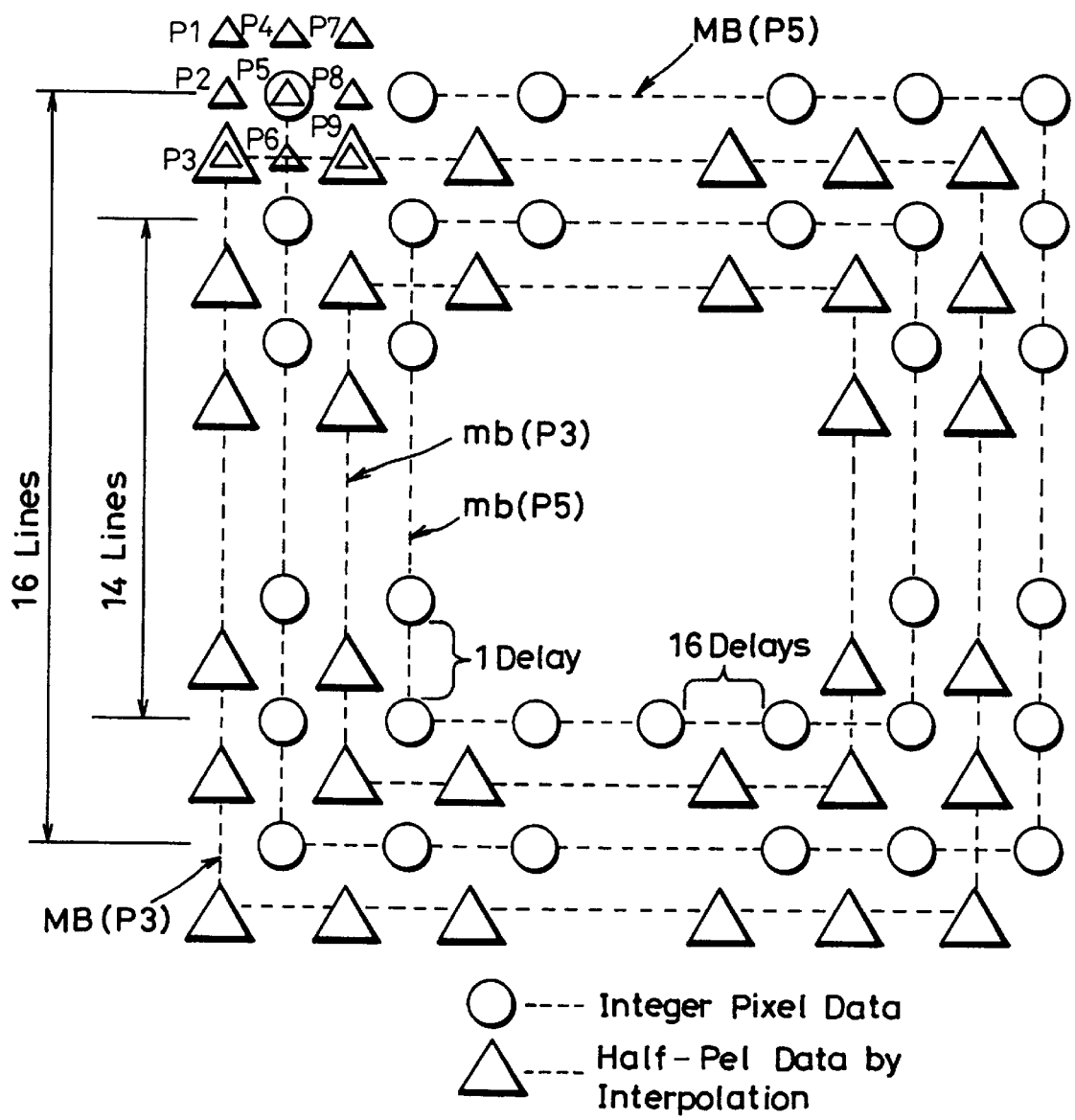

HIGH-EFFICIENCY CODING METHOD, HIGH-EFFICIENCY CODING APPARATUS, RECORDING AND REPRODUCING APPARATUS, AND INFORMATION TRANSMISSION SYSTEM

BACKGROUND OF THE INVENTION

The present invention relates to a high-efficiency coding method, a high-efficiency coding apparatus, a recording and reproducing apparatus, and an information transmission system for use with a VCR, an information transmission system or the like.

A method using a motion compensation prediction and a DCT (discrete cosine transform) has hitherto been known as a high-efficiency coding method for an interlace component digital moving picture signal (e.g., CCIR recommendation 601, etc.).

The following three methods are known as the motion compensation prediction method.

A frame type motion compensation method:

This is a method of motion-compensating a processed image as a frame. Graphics image data generated on a computer, for example, is a non-interlace image signal. Therefore, when the graphics image data is displayed on a television monitor for displaying an NTSC television signal, such graphics image data is converted into an NTSC interlace image signal. Since the non-interlace graphics image data obtained from the computer is converted into the NTSC interlace image signal, the interlace image signal is an image signal of frame unit, and an odd-numbered scanning line and an even-numbered scanning line do not have a time difference of one field therebetween unlike an ordinary NTSC television image signal obtained from a television camera or the like. Thus, in this case, it is optimum to effect the frame type motion compensation on the processed image signal.

Field type motion compensation method:

This is a method of motion-compensating a processed image at every field. An NTSC television image signal obtained from a television camera or the like, for example, have a time difference of one field between the odd-numbered scanning line and the even-numbered scanning line of one frame. Accordingly, in this case, it is optimum to effect the field type motion compensation on the processed image signal.

A frame type/field type adaptive motion compensation method:

This is a method of adaptively switching the frame type motion compensation and the field type motion compensation.

Important points of the frame type motion compensation method and the field type motion compensation method will be described below. A "half-pel" in the frame type motion compensation and a "half-pel", in the field type motion compensation become different from each other. Specifically, in the frame type motion compensation, an average value of pixels (pels) adjacent in the longitudinal, lateral or oblique direction within frame is referred to as a "half-pel", and in the field type motion compensation, an average value of pixels adjacent in the longitudinal, lateral or oblique direction within odd field and an average value adjacent in the longitudinal, lateral or oblique direction within even field are referred to as "half-pels". Accordingly, pixel data is newly generated by averaging two pixel data adjacent in the horizontal, vertical or oblique direction in a memory, for example. If half-pel data is newly generated and a motion detection is carried out in the state including the newly-generated half-pel data, then it is possible to obtain motion vector data with accuracy higher than that of motion vector data that has been detected when at least half-pel data is not generated. Thus, accurate macroblock data can be extracted from a preceding frame, and hence a difference between macroblock data of the preceding frame and macroblock data of the present frame can be made accurate.

The number of motion vectors within one frame in the field type motion compensation becomes twice of those within one frame in the frame type motion compensation. Since it is customary that data is processed in the macroblock unit in the motion compensation, when the macroblock in the frame type motion compensation is of 16 lines×16 pixels, macroblocks in the odd field and the even field in the field type motion compensation each become 8 lines×16 pixels.

In other words, the number of macroblocks within one frame in the field type motion compensation becomes twice the number of macroblocks within one frame in the frame type motion compensation. The reason for this is that the frame type motion compensation has one motion vector with respect to one macroblock and that the field type motion compensation has one motion vector with respect to a macroblock of odd field and a macroblock of even field. Accordingly, the frame type motion compensation has one motion vector with respect to one macroblock and the field type motion compensation has two motion vectors with respect to one macroblock in the frame type motion compensation.

The frame type motion compensation and the field type motion compensation are different from each other as described above. A coding apparatus for effecting the frame/field adaptive motion compensation will be described with reference to FIG. 1 and FIGS. 2A to 2C.

FIG. 1 of the accompanying drawings shows an example of an encoding apparatus for effecting the frame/field adaptive motion compensation.

As shown in FIG. 1, this encoding apparatus comprises a blocking circuit 201 for blocking interlace image data supplied thereto from an input terminal 200 at the macroblock unit of 16 lines×16 pixels, an adding circuit 202 for subtracting macroblock data MB(F-1) of motion-compensated preceding frame supplied thereto from a motion compensating circuit 214 from macroblock data MB(F) of the present frame supplied thereto from the blocking circuit 201, a switch 204 for switching the macroblock data MB(F) of the present frame supplied thereto from the blocking circuit 201 and difference data supplied thereto from the adding circuit 202 based on a switching control signal supplied thereto from an inter/intra judgement circuit 203, a DCT (discrete cosine transform) circuit 205 for transforming the macroblock data MB(F) of the present frame from the switch 204 or the difference data in the form of coefficient data of DC component to high-order AC component at the block unit of 8 lines×8 pixels, a quantizer circuit 206 for quantizing coefficient data supplied thereto from the DCT circuit 205 at a predetermined quantization step size, a variable word-length encoder 207 for variable-word-length-encoding the coefficient data supplied thereto from the DCT circuit 205 by use of a suitable method such as a run-length-coding method or a Huffman coding method, an inverse quantizer circuit 209 for inverse-quantizing the coefficient data supplied thereto from the quantizer circuit 206 to provide the coefficient data of the DCT circuit 205, an IDCT (inverse discrete cosine transform) circuit 210 for transforming coefficient data supplied thereto from the inverse quantizer circuit 209 into the original macroblock data MB(F) of the present frame or the difference data, an adding circuit 211 for adding the output of the IDCT circuit 210 and the macroblock data MB(F-1) of the motion-compensated preceding frame supplied thereto from the motion compensating circuit 214, a switch 212 for selectively supplying the output of the adding circuit 211 and the output of the IDCT circuit 210 based on the switching control signal supplied thereto from the inter/intra judgement circuit 203, a frame memory 213 for storing an output of the switch 212 in its storage area, a frame type motion vector detecting circuit 216 for obtaining frame motion vector data mv(Fr) by motion-detecting the macroblock data MB(F-1) of the preceding frame supplied thereto from the frame memory 213 and the macroblock data MB(F) of the present frame supplied thereto from the blocking circuit 201 at the frame unit, a field type motion detecting circuit 215 for obtaining odd field motion vector data mv(odd) and even-numbered motion vector data mv(even) by motion-detecting the macroblock data MB(F) of the present frame supplied thereto from the blocking circuit 201 and the macroblock data MB(F-1) of the preceding frame supplied thereto from the frame memory 213 at the field unit, a field/frame type switching circuit 217 for selecting the odd field motion vector data mv(odd) supplied thereto from the field type motion detecting circuit 215, the even field motion vector data mv(even) supplied thereto from the field type motion detecting circuit 215 or the frame motion vector data mv(Fr) supplied thereto from the frame type motion detecting circuit 216 and a motion compensating circuit 214 for generating address data generated based on the frame motion vector data or the field motion vector data mv(Fr)/mv(Fi) supplied thereto from the field/frame type switching circuit 217, reading out the macroblock data MB(F-1) of the preceding frame from the frame memory 213, and supplying the macroblock data MB(F-1) thus read to the adding circuit 202.

The switches 204, 212 are operated in unison with each other in response to the switching control signals supplied thereto from the inter/intra judgement circuit 203. Specifically, when the macroblock data MB(F) of the present frame from the blocking circuit 201 is selected, the switch 204 connects a movable contact c to one fixed contact a, and concurrently therewith, the switch 212 connects a movable contact c to one fixed contact a. When the difference data from the adding circuit 202 is selected, the switch 204 connects the movable contact c to the other fixed contact b, and concurrently therewith, the switch 212 connects the movable contact c to the other fixed contact b.

A manner in which the macroblock data MB is generated will be described with reference to FIGS. 2A to 2C. In FIGS. 2A to 2C, "an open square" represents a pixel of odd field, and an open circle" represents a pixel of even field, respectively. Arrows in FIGS. 2A to 2C show scanning trajectories obtained in the raster scanning or block scanning.

If image data of one frame obtained in the raster scanning shown in FIG. 2A is processed by the block scanning as shown in FIG. 2C, then there is extracted macroblock data MB of 16 lines×16 pixels, for example, shown by broken lines in FIG. 2B. Then, the motion compensation processing is carried out by use of the resultant macroblock data MB.

The inter/intra judgement circuit 203 compares dispersed values of the macroblock data MB(F) of the present frame and the difference data, and selects one of the macroblock data MB(F) of the present frame and the difference data having a smaller dispersed value. The dispersed values are calculated by the following equations (1) and (2):

$$MP = \frac{1}{256} \sum_{j=1}^{256} P_j \qquad (1)$$

where MP is an average luminance level of pixel provided within the macroblock, and Pj is a luminance level of pixel.

$$Var_{MBLK} = \sum_{j=1}^{256} (P_j - MP)^2 \qquad (2)$$

where $Var_{MBLK}$ is a dispersed value of macroblock.

The field type motion detecting circuit 215 and the frame type motion detecting circuit 216 carry out motion-detection by block-matching which will be described later on.

The frame type motion detection and the field type motion detection will be described with reference to FIGS. 3 and 4. In FIGS. 3 and 4, "open square" represents a pixel of odd field, "open circle" represents a pixel of even field, and "open triangle" represents a half-pel, respectively.

FIG. 3 is a schematic diagram used to explain the frame type motion detection. The vertical direction in FIG. 3 represents a motion vector between a pixel of odd field and a pixel (upper and lower direction) of even field adjacent to the above pixel of odd field, and a value of this motion vector is assumed to be "1", for example (motion amount of one pixel). A motion from upper to lower direction between the preceding frame and the present frame is represented by "minus (−)", and a motion from lower to upper direction between the preceding frame and the present frame is represented by "plus (+)". If one half-pel of the one-frame preceding frame is a pixel of even field of the present frame and the other half-pel of the one-frame preceding frame is a pixel of odd field of the present frame as shown by solid arrows in FIG. 3, then values of these frame motion vectors both become "−2.5" (motion amount of 2.5 pixels from upper to lower direction).

FIG. 4 is a schematic diagram used to explain the field type motion detection. In FIG. 4, the horizontal direction represents a motion vector obtained between the pixel of odd field and the pixel (upper and lower direction) of even field adjacent to the above pixel. A value of this motion vector is assumed to be "1", for example (motion amount of one pixel). A motion from upper to lower direction between the preceding frame and the present frame is represented by "minus (−)", and a motion from lower to upper direction between the preceding frame and the present frame is represented by "plus (+)". If a half-pel of the even field of the preceding frame is a pixel of even field with respect to the even field as shown by a solid-line arrow in FIG. 4, then a value of motion vector of even field becomes "−3" (motion amount of three pixels from upper to lower direction). The above half-pel, i.e., half-pel of even field becomes a pixel of odd field in the odd field. If a pixel of odd field of one-field preceding frame is a pixel of odd field of the present frame with respect to the odd field, then a value of motion vector of odd field becomes "−4" (motion amount of four pixels from upper to lower direction).

As is clear from the above description, when coordinates of vector in the longitudinal direction are examined from a frame standpoint, the half-pel in the frame type motion compensation corresponds to "0.5", and the half-pel in the field type motion compensation corresponds to "1.0". Accordingly, the field type motion compensation has two vectors, i.e., even field vector and odd field vector with respect to one macroblock, and the frame type motion compensation has one motion vector with respect to one macroblock.

The field/frame type switching circuit 217 is supplied with the frame motion vector data mv(Fr), the odd field motion vector data mv(odd), the even field motion vector data mv(even) and difference absolute value sum data obtained when these vector data are obtained. The field/frame type switching circuit 217 compares the above three difference absolute value sum data, and selects motion vector data obtained from the difference absolute value sum data of smallest value.

The interlace image data of the present frame is supplied through the input terminal 200 to the blocking circuit 201. This interlace image data is divided by the blocking circuit 201 into macroblocks of 16 pixels×16 pixels, for example, and supplied to the switch 204, the adding circuit 202, the field type motion detecting circuit 215, and the field/frame type switching circuit 217, respectively.

The adding circuit 202 subtracts the motion-compensated macroblock data MB(F-1) of the preceding frame supplied thereto from the motion compensating circuit 214 from the macroblock data MB(F) of the present frame to provide difference data, and this difference data is supplied to the switch 204. The macroblock data MB(F) of the present data supplied to the switch 204 and the difference data from the adding circuit 202 are selectively supplied to the DCT circuit 205 in response to the switching control signal from the inter/intra judgement circuit 203.

The macroblock data MB(F) of the present frame or the difference data supplied to the DCT circuit 205 is transformed into coefficient data of from DC component to high-order AC component, and supplied to the quantizer circuit 206, in which it is quantized with a predetermined quantization step size. The quantized coefficient data is supplied to the variable word-length encoding circuit 207 and the inverse quantizer circuit 209. The quantized coefficient data supplied to the variable word-length encoding circuit 207 is variable-word-length-encoded by a proper method such as run-length-coding method or Huffman coding method, and outputted through the output terminal 208.

On the other hand, the quantized coefficient data supplied to the inverse quantizer circuit 209 is transformed into the original coefficient data, which is not yet quantized, and supplied to the IDCT circuit 210. The coefficient data supplied to the IDCT circuit 210 is decoded by the IDCT circuit 210 into the original macroblock data MB(F) or difference data, and supplied to the adding circuit 211 and the switch 212.

The difference data supplied to the adding circuit 211 is added to the motion-compensated macroblock data MB(F-1) of the preceding frame supplied thereto from the motion compensating circuit 214, and supplied to the switch 212. The added output and the macroblock data MB(F) of the present frame supplied to the switch 212 are selectively supplied to the frame memory 213 in response to the switching control signal from the inter/intra judgement circuit 203, and stored in a memory space of the frame memory 213.

The macroblock data MB(F-1) of the preceding frame read out from the frame memory 213 is supplied to the field type motion detecting circuit 215 and the frame type motion detecting circuit 216. The field type motion detecting circuit 215 is supplied with the macroblock data MB(F-1) of the preceding frame read out from the frame memory 213 and the macroblock data MB(F) of the present frame from the blocking circuit 201. Then, the field type motion detecting circuit 215 effects a motion detection of the field unit on the basis of the macroblock data MB(F) of the present frame and the macroblock data MB(F-1) of the preceding frame. Resultant odd-numbered motion vector data mv(odd) and even-numbered motion vector data mv(even) are supplied to the field/frame type switching circuit 217 together with the difference absolute value sum data.

The frame type motion detecting circuit 215 is supplied with the macroblock data MB(F-1) of the preceding frame read out from the frame memory 213 and the macroblock data MB(F) of the present frame from the blocking circuit 201. The frame type motion detecting circuit 216 effects a motion detection of the frame unit by the macroblock data MB(F) of the present frame and the macroblock data MB(F-1) of the preceding frame. Resultant frame motion vector data mv(Fr) is supplied to the field/frame type switching circuit 217 together with the difference absolute value sum data.

The field/frame type switching circuit 217 compares the difference absolute value sum data supplied thereto from the field type motion detecting circuit 215 and the difference absolute value sum data from the frame type motion detecting circuit 216, and selects motion vector data with a smaller value, i.e., odd field motion vector data mv(odd), even field motion vector data mv(even) or the frame motion vector data mv(Fr). The motion vector data thus selected is supplied to the motion compensating circuit 214 as the frame motion vector data mv(Fr) or the field motion vector data mv(Fi). The motion compensating circuit 214 carries out a motion compensation. Specifically, the motion compensating circuit 214 reads out the macroblock data MB(F-1) of the preceding frame from the frame memory 213 in response to address data (or control signal for controlling a memory controller (not shown)) generated on the basis of the frame motion vector data mv(Fr) or the field motion vector data mv(Fi) from the field/frame type switching circuit 217. This macroblock data MB(F-1) of the preceding frame is data indicative of the original position of the macroblock data MB(F) of the present frame supplied from the blocking circuit 201.

The motion-compensated macroblock data MB(F-1) of the preceding frame from the motion compensating circuit 214 is supplied to the adding circuit 202. Thus, the adding circuit 202 subtracts the macroblock data MB(F-1) of the preceding frame from the macroblock data MB(F) of the present frame supplied thereto from the blocking circuit 201.

An example of the field type motion detecting circuit 215 and an example of the frame type motion detecting circuit 216 shown in FIG. 1 will be described with reference to FIG. 5.

As shown in FIG. 5, the field type motion detecting circuit 215 shown in FIG. 1 comprises an odd field first motion detecting circuit 243 for detecting a motion between odd fields with an accuracy of one pixel, an odd-field second motion detecting circuit 245 for detecting a motion between odd fields with an accuracy of half-pel, an even field first motion detecting circuit 244 for detecting a motion between even fields with an accuracy of one pixel, and an even field second motion detecting circuit 247 for detecting a motion between even fields with an accuracy of half-pel.

As shown in FIG. 5, the frame type motion detecting circuit 216 shown in FIG. 1 comprises a frame first motion detecting circuit 249 for detecting a motion between frames with an accuracy of one pixel, and a frame second motion detecting circuit 250 for detecting a motion between frames with an accuracy of half-pel.

An input terminal 240 to which the macroblock data MB(F) of the present frame is supplied from the blocking circuit 201 shown in FIG. 1 is connected to input terminals of the odd field first and second motion detecting circuits 243, 245, the even field first and second motion detecting circuits 244, 247, and the frame first and second motion detecting circuits 249, 250. An input terminal 242 to which the macroblock data MB(F-1) of the preceding frame from the frame memory 213 shown in FIG. 1 is connected to input terminals of the odd field first and second motion detecting circuits 243, 245, the even field first and second motion detecting circuits 244, 247 and the frame first and second motion detecting circuits 249, 250.

The odd field first and second motion detecting circuits 243, 245 are supplied with odd field macroblock data MB(odd, F) of present frame through the input terminal 240 and odd field macroblock data MB(odd, F-1) of preceding frame through the input terminal 242. The even field first and second motion detecting circuits 244, 247 are supplied with even field macroblock data MB(even, F) of present frame through the input terminal 240 and even field macroblock data MB(even, F-1) of preceding frame through the input terminal 242. Further, the frame first and second motion detecting circuits 249, 250 are supplied with the macroblock data MB(F) of present frame through the input terminal 240 and the macroblock data MB(F-1) of preceding frame through the input terminal 242.

The odd field first motion detecting circuit 243 detects a motion vector with an accuracy of integer pixels on the basis of the odd field macroblock data MB(odd, F) of the present frame and the odd field macroblock data MB(odd, F-1) of the preceding frame, and supplies resultant odd field motion vector data MV(odd) to the odd field second motion detecting circuit 245. The odd field second motion detecting circuit 245 detects a motion vector with an accuracy of half-pel on the basis of the odd field motion vector data MV(odd), the odd field macroblock data MB(odd, F) of present frame and the odd field macroblock data MB(odd, F-1) of preceding frame supplied thereto from the odd field first motion detecting circuit 243, and supplies resultant odd field motion vector data mv(odd) through the output terminal 246 to the field/frame type switching circuit 217 shown in FIG. 1.

The even field first motion detecting circuit 244 detects a motion vector with an accuracy of integer pixels on the basis of the even field macroblock data MB(even, F) of present frame and the even field macroblock data MB(even, F-1) of preceding frame, and supplies resultant even field motion vector data MV(even) to the even field type motion detecting circuit 247. The even field second motion detecting circuit 247 detects a motion with an accuracy of half-pel on the basis of the even field motion vector data MB(even), the even field macroblock data MB(even, F) of the present frame and the even field macroblock data MV(even, F-1) of the preceding frame supplied thereto from the even field first motion detecting circuit 244, and supplies resultant even field motion vector data mv(even) through the output terminal 248 to the field/frame type switching circuit 217 shown in FIG. 1.

The field type motion detection will be described more fully with reference to FIG. 6. In FIG. 6, only the even field type motion detection will be described, and the even field type motion detection is not shown and need not be described because only an object to be detected is different. The motion vector detection will be described later on with reference to FIG. 9, and concepts in detecting motion with accuracy of integer pixels and accuracy of half-pel will be described below.

In FIG. 6, the vertical axis represents coordinates of motion vector in the vertical direction, and horizontal axis represents coordinates of motion vector in the horizontal direction. In FIG. 6, "open circle" represents pixel data of even field, and "open triangle" represents half-pel data, respectively. FIG. 6 shows not only pixel data of the even and odd fields but also pixel data of even and odd fields of present frame and pixel data of even and odd fields of preceding frame in an overlapping state.

In this case, let us describe the field type motion detection on the assumption that the position of even field pixel data Pc of preceding frame coincides with the position of even field pixel data P(F) of present frame after one frame. If the even field pixel data P(F) of present frame is set to be a starting point, then coordinates of motion vector data MV1 with accuracy of integer pixels provided between the even field pixel data P(F) of present frame and even field pixel data Pc of preceding frame become (-1, -2) as shown by arrows and numerical values in FIG. 6, wherein "-1" is in the horizontal direction, and "-2" is in the vertical direction. In other words, the even field first motion detecting circuit 244 shown in FIG. 5 detects a motion of even field pixel data, and an accuracy of a resultant motion vector data MV1 becomes an accuracy of integer pixels.

The even field second motion detecting circuit 247 shown in FIG. 5 sets a search area (shown by a broken-line area in FIG. 6) about the even field pixel data Pc on the basis of the motion vector data MV1 {even field motion vector data MV(even) in FIG. 5} with an accuracy of integer pixels calculated by the even field first motion detecting circuit 244. Within that area, the even field second motion detecting circuit 247 detects a motion including half-pel generated from the even field pixel data, and detects motion vector data mv2 {even field motion vector data mv(even) in FIG. 5}.

If the position of even field half-pel data Pa of preceding frame is agreed with the position of even field pixel data P(F) of present frame, coordinates of motion vector data MV1 with accuracy of integer pixels become (-1, -2). In this case, a motion detection with an accuracy of half-pel is carried out, and consequently, coordinates of the motion vector data mv2 becomes (-0.5, -2). Specifically, in the first step, a motion detection with an accuracy of integer pixels is carried out, and the search area for effecting motion detection with an accuracy of half-pel is set on the basis of the resultant motion vector data in the next step. Then, a motion detection with an accuracy of half-pel is carried out, and a motion detection with a higher accuracy can be carried out.

On the other hand, the frame first motion detecting circuit 249 detects a motion with an accuracy of integer pixels on the basis of the macroblock data MB(F) of present frame and the macroblock data MB(F-1) of preceding frame, and supplies resultant frame motion vector data MV(Fr) to the frame second motion detecting circuit 250. The frame second motion detecting circuit 250 detects a motion with an accuracy of half-pel on the basis of the macroblock data MB(F) of present frame, the macroblock data MB(F-1) of preceding frame, and the frame motion vector data MV(Fr) supplied thereto from the frame first motion detecting circuit 249, and obtains resultant frame motion vector data with an accuracy of half-pel. The frame second motion detecting circuit 250 supplies this motion vector data mv (Fr) through the output terminal 251 to the field/frame type motion detecting circuit 217 shown in FIG. 1.

The frame type motion detection will be described with reference to FIG. 7. A manner in which a motion vector itself is detected will be described later on with reference to FIG. 9, and only concepts in detecting motion with an accuracy of integer pixels and with an accuracy of half-pel will be described below In FIG. 7, the vertical axis represents coordinates of motion vector in the vertical direction, and the horizontal axis represents coordinates of motion vector in the horizontal direction, respectively. In FIG. 7, "open square" represents odd field pixel data, "open circle" represents even field pixel data, and "open triangle" represents half-pel data, respectively. FIG. 7 shows not only pixel data of the present frame but also pixel data of present frame and pixel data of preceding frame in an overlapping state.

In the following description, let it be assumed that the position of pixel data Pc of preceding frame is agreed with the position of pixel data P(F) of present frame after one frame. If the pixel data P(F) of present frame is set to a starting point, then coordinates of motion vector data MV1 with an accuracy of integer pixels between the pixel data P(F) of present frame and the pixel data Pc of preceding frame are set to (−1, −2) as shown by arrows and numerical values in FIG. 7, wherein "−1" is set on the horizontal direction, and "−2" is set on the vertical direction. Specifically, the frame first motion detecting circuit 249 shown in FIG. 5 detects a motion on the basis of whole data provided within the frame, and an accuracy of resultant motion vector data MV1 becomes an accuracy of integer pixels.

The frame second motion detecting circuit 250 sets a search area (area encircled by a broken line in FIG. 7) about the pixel data Pc on the basis of motion vector data MV1 {frame motion vector data MV(Fr) in FIG. 5} with an accuracy of integer pixels calculated by the frame first motion detecting circuit 249. Then, within the above area, the frame second motion detecting circuit 250 detects a motion with an accuracy including half-pel generated from pixel data, and detects motion vector data mv2 {frame motion vector data mv(Fr) in FIG. 5}.

If the position of half-pel data Pa of preceding frame is agreed with the position of even field pixel data P(F) of present frame after one frame, then coordinates of the motion vector data MV1 with an accuracy of integer pixels become (−1, −2). In this case, a motion is detected with an accuracy of half-pel, and hence resultant motion vector data mv2 is set to (−1.5, −1.5). In other words, in the first step, a motion detection with an accuracy of integer pixels is carried out, and the search area for detecting a motion with an accuracy of half-pel in the next step is set on the basis of the resultant motion vector data. Then, a motion detection with an accuracy of half-pel is carried out within the above search area, thereby detecting a motion with a higher accuracy.

The frame type motion detection will be further described with reference to FIG. 8. FIG. 8 illustrates a macroblock of 16 lines×16 pixels, by way of example. In FIG. 8, similarly to FIG. 7, "open square" represents odd field pixel data, "open circle" represents even field pixel data, "open triangle" represents interpolated half-pel data, and vm1 to vm9 represent motion vector data with an accuracy of half-pel corresponding to positions of respective half-pels, respectively. In FIG. 8, macroblock data MB(VM5) is predicted on the basis of frame motion vector data VM5 {corresponding to the frame motion vector data MV(Fr) detected by the first motion detecting circuit 249 shown in FIG. 5}. Accordingly, the pixel data Pc shown in FIG. 7 corresponds to pixel data Pc shown in FIG. 8.

When the frame motion vector data MV5 detected by the frame first motion detecting circuit 249 is supplied to the frame second motion detecting circuit 250, the frame second motion detecting circuit 250 generates half-pel data provided around the pixel data Pc on the basis of the frame motion vector data MV5 with an accuracy of integer pixels, and detects a motion within that search area. As a result, macroblock data MB(vm3) is predicted as shown in FIG. 8. The macroblock data MB(vm3) is predicted by the frame motion vector data vm3 with an accuracy of half-pel. The half-pel data Pa shown in FIG. 8 corresponds to the half-pel data Pa shown in FIG. 7.

An example of motion detecting circuit shown in FIG. 5 will be described with reference to FIG. 9. A motion detecting circuit shown in FIG. 9 detects a motion by use of block-matching method. A frame memory provided within the blocking circuit 201 shown in FIG. 5 corresponds to a present frame memory 321 shown in FIG. 9, and the frame memory 213 shown in FIG. 1 corresponds to a reference frame memory 323 shown in FIG. 9. While the field first motion detecting circuits 242, 244, the field second motion detecting circuits 245, 247, the frame first motion detecting circuit 249, and the frame second motion detecting circuit 250 are illustrated in FIG. 5, in the case of the field type motion detecting circuit, reference blocks and remarkable blocks, which will be described below, are set at every field. In the case of the frame motion detecting circuit, reference blocks and remarkable blocks, which will be described below, are set every frame.

The motion detecting circuit shown in FIG. 9 comprises a present frame memory 321 for storing therein image data of present frame, a reference frame memory 323 for storing therein image data of preceding frame (reference frame), an address shift circuit 333 for sequentially supplying different address data to the reference frame memory 323, an adding circuit 324 for subtracting macroblock data MB(F-1) supplied thereto from the reference frame memory 323 from macroblock data MB(F) of present frame supplied thereto from the present frame memory 321, an absolute value generating circuit 325 for generating an absolute value of a subtracted result supplied thereto from the adding circuit 324, a latch circuit 327 for latching absolute value data supplied thereto from the absolute value generating circuit 325, an adding circuit 326 for adding an output of the absolute value generating circuit 325 and a latched output of the latch circuit 327 to provide difference absolute value sum data, a memory 328 for storing therein the difference absolute value sum data supplied thereto from the adding circuit 326, a minimum value detecting circuit 329 for detecting a minimum value from the difference absolute value sum data stored in the memory 328, a motion vector detecting circuit 330 for obtaining vector data based on the minimum difference absolute value sum data supplied thereto from the minimum value detecting circuit 329 and supplying the vector data to a controller 332 and the field/frame switching circuit 217 shown in FIG. 1, and the controller 332 for controlling the address shift circuit 333 based on the motion vector data supplied thereto from the motion vector detecting circuit 330 and controlling writing of image data in the present frame memory 321 and reading of stored image data from the present frame memory 321.

The motion vector detecting circuit 330 converts inputted difference absolute value sum data into motion vector data by reading out motion vector data corresponding to inputted difference absolute value sum data, e.g., data indicative of moving amount in the longitudinal and lateral directions from a suitable memory means, such as a ROM (read-only memory).

Pixel data of macroblock (8×8 pixels or 6×16 pixels) is sequentially read out from the present frame memory 321 as remarkable block under control of the controller 332. On the other hand, the address shift circuit 333 sets a search area on the memory space of the reference frame memory 323 under control of the controller 332, and sets a reference block of the same size as that of the above macroblock within the search area. Then, the address shift circuit 333 sequentially supplies address data, which is used to sequentially read out pixel data from the reference block, to the reference frame memory 323. After the reading of pixel data from the set reference block is completed, the address shift circuit 333 shift the position of the reference block by one pixel within the search area by supplying address data to the reference frame memory 323, and reads out pixel data within the reference block shifted by one pixel by sequentially supplying address data to the reference frame memory 323.

The adding circuit 324 subtracts pixel data provided within the reference block read out from the reference frame memory 323 from pixel data provided within the remarkable block read out from the present frame memory 321. A subtracted result from the adding circuit 324 is supplied to the absolute value generating circuit 325, in which it is converted to absolute value data, and supplied through the adding circuit 326 to the latch circuit 327. The latch circuit 327 latches an added result supplied thereto from the adding circuit 326, i.e., difference absolute value sum data, whereby difference absolute value sum data between the remarkable block provided within the present frame memory 321 and one reference block provided within the reference frame memory 323 is sequentially stored in the memory 328. Then, the memory 328 finally stores therein difference absolute value sum data of the number corresponding to a number of remarkable blocks that have been sequentially set in the search area with a displacement of one pixel.

After calculation of pixel data of reference block provided within one search area and pixel data of remarkable block is finished completely, the minimum value detecting circuit 329 selects the minimum difference absolute value sum data from all difference absolute value sum data stored in the memory 328, and supplies the selected minimum absolute value sum data to the motion vector detecting circuit 330. Also, the minimum value detecting circuit 329 supplies a control signal to the controller 332 such that the controller 332 starts the next processing.

The difference absolute value sum data from the minimum value detecting circuit 329 is supplied to the motion vector detecting circuit 330. The motion vector detecting circuit 330 detects motion vector data corresponding to the difference absolute value sum data supplied thereto from the minimum value detecting circuit 329. The motion vector data obtained by the motion vector detecting circuit 330 is supplied through an output terminal 331 to the field/frame switching circuit 217 shown in FIG. 1 and the controller 332. Then, the controller 332 sets a search area in a similar manner, and controls the address shift circuit 333 and the present frame memory 321 in such a manner that pixel data provided within the reference block and pixel data provided within the remarkable block are processed one more time.

FIG. 10 shows a concept of manner in which a motion is detected according to the block-matching method. In FIG. 10, MB1 represents a macroblock of present frame, SA represents a search area of preceding frame, SIT represents a position of the macroblock MB1 in the preceding frame, and MB2 represents a macroblock of preceding frame composed of the same data as that of the macroblock MB1 of present frame.

Let it be assumed that the position of the macroblock MB1 of present frame is agreed with the position SIT shown by a broken line in the preceding frame and that data of the macroblock MB1 of present frame is data of the macroblock MB2 in the preceding frame.

In such case, a difference absolute value between data of the macroblock obtained from the search area SA by shifting address one pixel and data of the macroblock MB1 of present frame is sequentially calculated, and this difference absolute value data is added to each block, whereafter the motion vector MV is calculated based on the minimum difference absolute value sum data within difference absolute value sum data of each block. Thus, as shown in FIG. 10, there can be obtained a position of the macroblock MB1 of present frame in the preceding frame, i.e., a position of the macroblock MB2 in the preceding frame. In this example, coordinates are (−2, 4), wherein "−2", represents a moving amount of horizontal direction within the preceding frame, and "4" represents a moving amount of vertical direction in the preceding frame. Further, "minus (−1)" represents a movement from upper to lower direction in the vertical direction, and "plus (+)" represents a movement from lower to upper direction in the vertical direction.

U.S. Pat. No. 4,937,666 describes a technique concerning 2-step vector search in which a motion detection with an accuracy of half-pel is carried out after a motion detection with an accuracy of integer pixels has been carried out. U.S. Pat. No. 4,897,720 describes a technique concerning a block-matching.

When a video camera picks up an object and generates a video signal, an electrical signal which results from receiving light from the object by a CCD (charge-coupled device) is converted into a video signal of even field and an electrical signal which results from receiving light from the object by the CCD next is converted into a video signal of odd field. Thus, the video signal of odd field and the video signal of even field constitute a video signal of interlaced system. That is, the video signal of odd field and the video signal of even field have a time difference of one field therebetween. If the object is moved during a time period of one field, a motion occurs between the video signal of odd field and the video signal of even field, i.e., there occurs a difference of luminance level between corresponding pixels.

Accordingly, when a video signal obtained from a device which outputs a video signal having a time difference between the odd field and the even field is frame-type-motion-detected by half-pel and frame-type-motion-compensated, there arise the following problems. That is, when two pixel data adjacent in the vertical direction are averaged in order to generate half-pel data, pixel data of odd field and pixel data of even field are averaged and resultant average value is used as half-pel data. Therefore, when the odd field and the even field have a motion therebetween, the half-pel data includes motion of odd field and even field, i.e., a fluctuation amount of level. Accordingly, an error occurs in the motion detection of half-pel accuracy using half-pel data and a reliable motion compensation cannot be made. As a result, an error occurs in encoding for transmitting or recording a video signal, and hence information cannot be transmitted or recorded accurately.

On the other hand, when the frame type motion compensation is carried out after the field type motion detection was carried out, motion vector data for odd field and even field are respectively obtained, thereby increasing an encoding amount.

Further, in the case of frame type/field-type adaptive motion compensation wherein motion vector data obtained by the field type motion detection and the frame type motion detection are selected and a motion compensation is carried out on the basis of the selected motion vector data, as is clear from the description of FIG. 5, there have to be prepared two detecting circuits of large circuit scale for the field type motion detection and the frame type motion detection, resulting in the circuit scale being increased.

In order to carry out motion detection with half-pel accuracy, there have to be generated nine half-pel data around integer pixel data including center half-pel data. When nine half-pel data around the integer pixel data Pc shown in FIG. 5 are generated together with the center half-pel data, in addition to respective integer pixel data of the macroblock data MB(VM5), integer pixel data for generating the above-mentioned nine pixel data have to be read out from the frame memory 113. When the macroblock is of 16 lines×16 pixels, for example, pixel data of at least 18 lines×18 pixels have to be read out from the frame memory 113. Accordingly, the pixel data for generating the half-pel data have to be read out from the frame memory 113 during a limited time period. There is then the problem that a processing speed in motion detection is lowered.

SUMMARY OF THE INVENTION

In view of the aforesaid aspect, it is an object of the present invention to provide a high-efficiency coding method, a high-efficiency coding apparatus, a recording and reproducing apparatus and an information transmission system in which an accuracy in motion compensation and a processing speed can be increased without increasing a circuit scale, an accurate encoding can be carried out, and satisfactory information transmission or recording can be carried out.

According to the present invention, there is provided a high-efficiency coding method which comprises the steps of a block-dividing step for dividing image information extracted from a predetermined area of a preceding frame to provide a plurality of reference blocks of a predetermined unit at every frame, a first motion detection step for obtaining first motion vector data by effecting a motion detection of pixel data located within a plurality of reference blocks corresponding to one of even field and odd field of a plurality of reference blocks and pixel data located within a remarkable block extracted from a present frame, an interpolation pixel data generation step for obtaining a plurality of interpolation reference blocks by generating interpolation pixel data between pixel data and pixel data, a second motion detection step for obtaining second motion vector data by effecting a second motion detection of pixel data located within the interpolation reference blocks and the pixel data located within the remarkable block extracted from the present frame, a motion compensation step for motion-compensating the image information of preceding frame based on the second motion vector data, and an encoding step for effecting encoding by calculating a difference between the image information of present frame and the motion-compensated image information of preceding frame.

According to the present invention, there is provided a high-efficiency coding method which comprises a block-dividing step for dividing image information extracted from a predetermined area of preceding frame to provide a plurality of reference blocks of a predetermined unit at every frame, a motion detection step for carrying out a motion detection by carrying out a motion detection by use of a part of pixel data located within a plurality of reference blocks corresponding to one field within a plurality of reference blocks and a part of pixel data located within the remarkable block extracted from the present frame, a motion compensation step for motion-compensating the image information of preceding frame based on the motion vector data obtained by the above motion detection step, and an encoding step for effecting encoding by calculating a difference between the image information of the present frame and the motion-compensated image information of the preceding frame.

According to the present invention, there is provided a high-efficiency coding apparatus which comprises a first memory means for storing therein image information of present frame to be encoded therein, a second memory means for storing image information of preceding frame therein, a first motion detecting means for obtaining first motion vector data by effecting a motion detection of pixel data located within reference blocks sequentially set within a predetermined range of the image information of the preceding frame stored in the second memory means and pixel data located within a remarkable block in the image information of present frame stored in the first memory means, a second motion detecting means for obtaining second motion vector data by effecting a motion detection of pixel data located within the reference block corresponding to one field located within the reference blocks sequentially set within a predetermined range of the image information of preceding frame stored in the second memory means and pixel data located within the remarkable block in the image information of the present frame stored in the first memory means, a third motion detecting means for generating interpolation pixel data between pixel data and pixel data within a predetermined area including pixel data located in the image information of preceding frame indicated by the first motion vector data supplied thereto from the first motion detecting means, calculating difference absolute value sum of the interpolation pixels data located within a plurality of interpolation reference blocks composed of the interpolation pixel data and the pixel data located within the remarkable block, and obtaining third motion vector data based on first difference absolute value sum data of smallest value located from a plurality of difference absolute value sum data obtained by the above difference absolute value sum calculation, a fourth motion detection step for generating interpolation pixel data between pixel data and pixel data within a predetermined area of one field including pixel data in the image information of preceding frame indicated by the second motion vector data supplied thereto from the second motion detecting means, calculating difference absolute value sum of the interpolation pixel data located within a plurality of interpolation reference blocks composed of interpolation pixel data and the pixel data located within the remarkable block, and obtaining fourth motion vector data based on second difference absolute value sum data of smallest value from a plurality of difference absolute value sum data obtained by the above difference absolute value sum calculation, a selecting means for selecting the third motion vector data supplied thereto from the third motion detecting means and the fourth motion vector data supplied thereto from the fourth motion detecting means on the basis of a compared result of the first difference absolute value sum data supplied thereto from the second motion detecting means and the second difference absolute value sum data supplied thereto from the third motion detecting means, a motion compensating means for motion-compensating the image information of preceding frame based on the third motion vector data or the fourth motion vector data supplied thereto from the selecting means, and an encoding means for effecting encoding based on the motion-compensated image information of preceding frame supplied thereto from the motion compensating means and the image information of present frame stored in the first memory means.

Further, according to the present invention, there is provided a high-efficiency coding apparatus which comprises a first memory means for storing image information of present frame to be encoded therein, a second memory means for storing image information of preceding frame therein, a first motion detecting means for obtaining first motion vector data by effecting a motion detection of pixel data located with reference blocks sequentially set in a predetermined range of the image information of preceding frame stored in the first memory means, and pixel data located within a remarkable block in the image information of present frame stored in the first memory means, an interpolation pixel generating means for generating interpolation pixel data between pixel data and pixel data within a predetermined area including pixel data located in the image information of preceding frame indicated by the first motion vector data supplied thereto from the first motion detecting means, a second motion detecting means for obtaining second motion vector data by effecting a motion detection of the interpolation pixel data located within a plurality of sub-interpolation reference blocks smaller than the reference blocks composed of the interpolation pixel data supplied thereto from the interpolation pixel generating means, and pixel data located within a sub-remarkable block smaller than the remarkable block, a motion compensating means for motion-compensating the image information of preceding frame based on the second motion vector data supplied thereto from the second motion vector data, and an encoding means for effecting encoding based on the motion-compensated image information of preceding frame supplied thereto from the motion compensating means and the image information of present frame stored in the first memory means.

According to the high-efficiency coding method of the present invention, the first motion vector data is obtained from the first motion detection of the pixel data located within a plurality of reference blocks corresponding to one field located within a plurality of reference blocks, a plurality of interpolation reference blocks are obtained by generating interpolation pixel data between pixel data and pixel data within a predetermined area of one field including pixel data located at the position in the preceding frame indicated by the first motion vector data, the second motion vector data is obtained by effecting a second motion detection of pixel data located within the interpolation reference blocks and the pixel data located within the remarkable block extracted from the present frame, the image information of preceding frame is motion-compensated based on the second motion vector data, and an encoding is carried out by calculating the image information of present frame and the motion-compensated image information of preceding frame.

According to the high-efficiency coding apparatus of the present invention, a motion detection is effected on a part of pixel data located within a plurality of reference blocks corresponding to one field in a plurality of reference blocks, and a part of pixel data located within a remarkable block extracted from the present frame, the image information of present frame is motion-compensated based on the motion vector data calculated in the above motion detection, and an encoding is carried out by calculating a difference between the image information of preset frame and the motion-compensated image information of preceding frame.

Further, according to the high-efficiency coding apparatus of the present invention, the first motion detecting means obtains the first motion vector data by carrying out a motion detection of pixel data located within reference blocks sequentially set in a predetermined range of the image information of preceding frame stored in the second memory means and pixel data located within the remarkable block in the image data of present frame stored in the first memory means, the second motion detecting means obtains the second motion vector data by carrying out a motion detection of pixel data located within the reference block corresponding to one field in the reference blocks sequentially set within a predetermined range in the image information of preceding frame stored in the second memory means and the pixel data located within the remarkable block in the image information of present frame stored in the first memory means, the third motion detecting means generates the interpolation pixel data between the pixel data and the pixel data within a predetermined area including the pixel data in the image information of preceding frame indicated by the first motion vector data supplied thereto from the first motion detecting means, calculates the difference absolute value sum of the interpolation pixel data located within a plurality of interpolation reference blocks composed of the interpolation pixel data and the pixel data located within the remarkable block, and obtains the third motion vector data based on the first difference absolute value sum data of smallest value from a plurality of difference absolute value sum data obtained by the difference absolute sum value calculation, the fourth motion detecting means generates the interpolation pixel data between the pixel data and the pixel data within a predetermined area of one field including pixel data in the image information of preceding frame indicated by the second motion vector data supplied thereto from the second motion detecting means, calculates difference absolute value sum of the interpolation pixel data located within a plurality of interpolation reference blocks composed of the interpolation pixel data and the pixel data located within the remarkable block, and obtains the fourth motion vector data based on the second difference absolute value sum data of smallest value from a plurality of difference absolute value sum data obtained by the difference absolute value sum calculation, the selecting means the third motion vector data supplied thereto from the third motion detecting means or the fourth motion vector data supplied thereto from the fourth motion detecting means on the basis of compared result of the first difference absolute value sum data from the second motion detecting means and the second difference absolute value sum data from the third motion detecting means, the motion compensating means motion-compensates the image information of preceding frame on the basis of the third motion vector data or the fourth motion vector data supplied thereto from the selecting means, and the encoding means carries out encoding on the basis of the motion-compensated image information of preceding frame supplied thereto from the motion compensating means and the image information of present frame stored in the first memory means.

Furthermore, according to the high-efficiency coding apparatus of the present invention, the first motion detecting means obtains the first motion vector data by effecting a motion detection of the pixel data located within the reference blocks sequentially set in the predetermined range of the image information of preceding frame stored in the second memory means and the pixel data located within the remarkable block in the image information of present frame stored in the first memory means, the interpolation pixel generating means generates interpolation pixel data between the pixel data and the pixel data within the predetermined area including the pixel data in the image information of preceding frame indicated by the first motion vector data supplied thereto from the first motion detecting means, the second motion detecting means obtains the second motion vector data by effecting a motion detection of the interpolation pixel data located within a plurality of sub-interpolation reference blocks smaller than the reference blocks composed of the interpolation pixel data supplied thereto from the interpolation pixel generating means, and the pixel data located within the sub-remarkable block smaller than the remarkable block, the motion compensating means motion-compensates the image information of the preceding frame based on the second motion vector data supplied thereto from the second motion detecting means, and the encoding means effects encoding based on the motion-compensated image information of preceding frame supplied thereto from the motion compensating means and the image information of present frame stored in the first memory means.

BRIEF DESCRIPTION OF THE DRAWINGS

FIGS. 2A to 2C are schematic diagrams used to explain a method of extracting a macroblock, wherein:

FIG. 2A is a schematic diagram used to explain a concept of raster scanning;

FIG. 2B is a schematic diagram used to explain relationship between a macroblock and a raster scanning; and FIG. 2C is a schematic diagram showing a scanned state for extracting a macroblock;

FIG. 14 is a block diagram showing the frame type/2-field type motion detecting circuit shown in FIG. 13 more in detail;

FIG. 25 is a schematic diagram used to explain a manner in which the half-pel generating circuit 55 shown in FIG. 24 generates half-pel data;

FIGS. 26A through 26M are timing charts used to explain a manner in which the motion detecting circuits shown in FIGS. 23 and 24 generate half-pel data and carry out a motion detection wherein;

FIG. 26A is a timing chart showing half-pel generation block data supplied to an input terminal 63 shown in FIG. 24;

FIG. 26B is a timing chart showing an output from a delay circuit 64 shown in FIG. 24;

FIG. 26C is a timing chart showing an output from an adding circuit 65 shown in FIG. 24;

FIG. 26D is a timing chart showing an output from a delay circuit 66 shown in FIG. 24;

FIG. 26E is a timing chart showing an output from a delay circuit 67 shown in FIG. 24;

FIG. 26F is a timing chart showing an output from an adding circuit 68 shown in FIG. 24;

FIG. 26G is a timing chart showing an output from a delay circuit 69 shown in FIG. 24;

FIG. 26H is a timing chart showing an output from a delay circuit 76 shown in FIG. 24;

FIG. 26I is a timing chart showing an output from an adding circuit 77 shown in FIG. 24;

FIG. 26J is a timing chart showing an output from a delay circuit 78 shown in FIG. 24;

FIG. 26K is a timing chart showing an output from a delay circuit 84 shown in FIG. 24;

FIG. 26L is a timing chart showing an output from an adding circuit 85 shown in FIG. 24; and FIG. 26M is a timing chart showing an output from a delay circuit 86 shown in FIG. 24;

FIGS. 27N through 27X are timing charts used to explain a manner in which the motion detecting circuits shown in FIG. 23 and 24 generate half-pel data and carry out a motion detection wherein;

FIG. 27N is a timing chart showing an output from a multiplying circuit 70 shown in FIG. 24;

FIG. 27O is a timing chart showing an output from a multiplying circuit 71 shown in FIG. 24;

FIG. 27P is a timing chart showing an output from a multiplying circuit 72 shown in FIG. 24;

FIG. 27Q is a timing chart showing an output from a multiplying circuit 79 shown in FIG. 24;

FIG. 27R is a timing chart showing an output from an adding circuit 77 shown in FIG. 24;

FIG. 27S is a timing chart showing an output from a multiplying circuit 80 shown in FIG. 24;

FIG. 27T is a timing chart showing an output from a multiplying circuit 87 shown in FIG. 24;

FIG. 27U is a timing chart showing an output from a multiplying circuit 88 shown in FIG. 24;

FIG. 27V is a timing chart showing an output from a multiplying circuit 89 shown in FIG. 24;

FIG. 27W is a timing chart showing an output (macroblock data of present frame) from a delay circuit 62 shown in FIG. 24; and FIG. 27X is a timing chart showing an evaluation function control signal CON shown in FIG. 24;

DETAILED DESCRIPTION OF THE PREFERRED EMBODIMENTS

A high-efficiency coding method, a high-efficiency coding apparatus, a recording and reproducing apparatus, and an information transmission system according to the present invention will be described in detail with reference to FIGS. 11 to 43.

Figure 11:
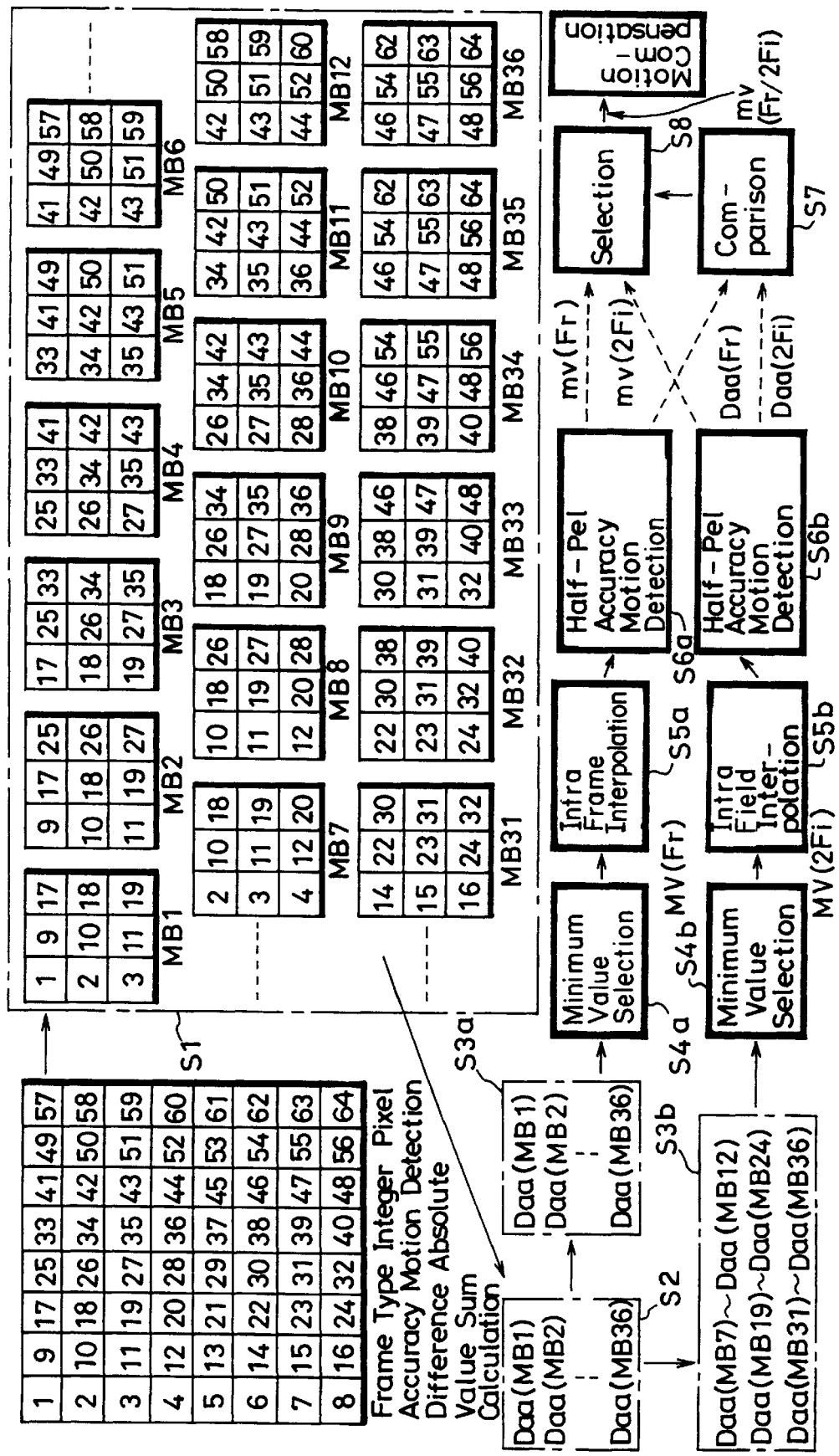
FIG. 11 is a schematic diagram used to explain an outline of a high-efficiency coding method and a high-efficiency coding apparatus according to the present invention.

FIG. 11 is a diagram used to explain a manner in which a frame/2-field type motion detection is carried out and a motion compensation is carried out based on resultant motion vector data, and relates to a first embodiment of the present invention. In this embodiment, "2-field type" means that one motion vector data is obtained by the method below although motion vector data are respectively obtained for macroblocks corresponding to odd field and even field in the field type motion detection.

On the upper left of FIG. 11 are illustrated pixel data of 1st to 64th pixels provided within a search area set in the preceding frame for macroblock data MB(F) of present frame. In this embodiment, a block-scanning is carried out in the horizontal direction to sequentially slice a macroblock of 3×3 pixels within the search area. In FIG. 11, each processing is represented by a combination of "S" and numeral, and this combination of "S" and numeral shows the order of processing (processing step). The processing will be described below in this sequential order, and a block-scanning direction may be either the horizontal or vertical direction.

Initially, at step S1, macroblock data MB1, MB2, ... MB36 are progressively sliced from the search area. As shown in FIG. 11, the macroblock data MB1, for example, includes "1", "2", "3", "9", "10", "11", "17", "18", "19", and these numerals mean that image data with same numerals affixed thereto are sliced from the same search area. If numerals shown on upper left corners of the macroblock data MB1 to MB36 are odd numbers, then macroblocks correspond to odd fields. If on the other hand numerals on upper left corners of the macroblock data MB1 to MB36 correspond to even numbers, then macroblocks correspond to even fields. What macroblocks correspond to even fields means that the processing order in the longitudinal direction within the search area becomes even number.

In the next step S2, difference absolute sum values between pixel data of the macroblock data MB1 to MB36 and pixel data of the remarkable macroblock data MB(F) of present frame are calculated. As shown in FIG. 11, this processing is a difference absolute value sum calculation of frame type integer pixel accuracy motion detection. By this difference absolute value sum calculation, there can be obtained 36 difference absolute value sum data Daa(MB1), Daa(MB2), . . . Daa(MB36) in response to the macroblock data MB1 to MB36.

In the next step S3a, there are received the above 36 difference absolute value sum data Daa(MB1), Daa(MB2), . . . Daa(MB36). Simultaneously, in step S3b, of the above 36 difference absolute value sum data Daa(MB1), Daa(MB2), . . . Daa(MB36), there are received difference absolute value sum data Daa(MB7) to Daa(MB12), Daa (MB19) to Daa(MB24), and Daa(MB31) to Daa(MB36).

In the next step S4a, minimum difference absolute value sum data is selected from the 36 difference absolute value sum data Daa(MB1), Daa(MB2), . . . Daa(MB36), and there is obtained frame motion vector data MB(Fr) with accuracy of integer pixels based on this difference absolute value sum data. Simultaneously, in the next step S4b, minimum difference absolute value sum data is selected from the above difference absolute value sum data Daa(MB7) to Daa (MB12), Daa(MB19) to Daa(MB24), Daa(MB31) to Daa (MB36), and there is selected 2-field motion vector data (2Fi) with an accuracy of integer pixels based on this difference absolute value sum data.

In the next step S5a, there are calculated nine half-pel data including pixel data set on the basis of frame motion vector data MV(Fr) with an accuracy of integer pixels. In step S5a, each half-pel data is obtained by averaging odd field pixel data and even field pixel data with respect to the vertical direction, and obtained by averaging adjacent pixel data in the same field with respect to the horizontal direction. Simultaneously, in the next step S5b, there are calculated nine macroblock data wherein nine half-pel data including pixel data at the positions indicated by 2-field motion vector data MV(2Fi) with an accuracy of integer pixels are data located at upper left corners, respectively. In this embodiment, the minimum values of the difference absolute value sum data calculated with respect to the macroblocks corresponding to the even fields are already calculated, and half-pel data are generated by use of only pixel data of even field.

In the next step S6a, nine half-pel data including pixel data set on the basis of frame motion vector data MV(Fr) with an accuracy of integer pixels calculated at step S4a are assumed to be located on upper left corners of macroblocks, and difference absolute value sum data for nine macroblocks are obtained similarly as described above. Then, frame type motion vector data with an accuracy of half-pel is obtained on the basis of minimum difference absolute value sum data Daa(Fr). Simultaneously, in the next step S6b, nine macroblock data wherein nine half-pel data including pixel data located at the positions shown by 2-field motion vector data MV(2Fi) with an accuracy of integer pixels calculated at step S4b are assumed to be data on the upper left corners are generated from pixel data corresponding to even field, and difference absolute value sum data for nine macroblocks are obtained similarly as described above. Then, 2-field motion vector data mv(2Fi) with an accuracy of half-pel is obtained on the basis of the minimum difference absolute value sum data Daa(Fi).

In the next step S7, the minimum difference absolute value sum data Daa(Fr) obtained at step S6a and the minimum difference absolute value sum data Daa(Fi) obtained at step S6b are compared with each other.

In the next step S8, there is selected the frame motion vector data mv(Fr) or the 2-field motion vector data (2Fi) with an accuracy of half-pel corresponding to the difference absolute value sum data Daa(Fr) or Daa(Fi) of small value calculated at step S7.

Then, a motion compensation is carried out on the basis of the frame motion vector data mv(Fr) with an accuracy of half-pel or the 2-field motion vector data mv(Fi) with an accuracy of half-pel selected at step S8.

According to a second embodiment, a motion detection with an accuracy of half-pel is not effected on all pixel data provided within the macroblock, but a motion detection with an accuracy of half-pel is effected on a part of macroblock, e.g., pixel data provided within a macroblock smaller than the original macroblock. Further, a third embodiment is a combination of the above first and second embodiments.

As is clear from the above description, a frame type motion detection with an accuracy of half-pel is carried out at step S2, and a motion detection with an accuracy of half-pel is carried out at steps S5a and S5b, thereby making it possible to lessen the motion detection processes most.

All difference absolute value sum data Daa(MB1) to Daa(MB36) obtained by the frame type motion detection with an accuracy of integer pixels at step S2 are compared with each other, and the frame motion vector data MV(Fr) with an accuracy of integer pixels is obtained on the basis of the minimum difference absolute value sum data. At the same time, only corresponding difference absolute value sum data Daa(MB7) to Daa(MB12), Daa(MB19) to Daa (MB24), Daa(MB31) to Daa(MB36) of the even fields are compared, and 2-field motion vector data MV(2Fi) with an accuracy of integer pixels is obtained on the basis of the minimum difference absolute value sum data. The nine macroblock data wherein nine half-pel data including pixel data set on the basis of the frame motion vector data MV(Fr) with an accuracy of integer pixels are located at the upper left corners are generated from the pixel data provided within the frame. Simultaneously, nine macroblock data wherein nine half-pel data including pixel data set on the basis of the 2-field motion vector data MV(2Fi) with an accuracy of integer pixels are located at upper left corners are generated from pixel data corresponding to the even fields. A motion detection with an accuracy of half-pel is effected on each of the nine macroblock data, and resultant minimum absolute value sum data Daa(Fr) and Daa(Fi) are compared with each other. Then, motion vector data of smaller value is selected, and a motion compensation is carried out on the basis of the selected motion vector data. Therefore, the frame type motion detection can be used as both the frame type motion detection and the field type motion detection, and the number of field motion vector data can be reduced by half. In addition, half-pel data is generated from pixel data of the same field, and a field type motion detection is carried out by use of such half-pel data. Thus, when a motion is detected between the odd field and the even field, if the field type motion detection with an accuracy of half-pel is carried out, then errors are eliminated from the field motion vector data, and hence accurate and efficient coding can be carried out.

In the above embodiments, the minimum difference absolute value sum data is selected from only the difference absolute value sum data of the pixel data provided within the macroblock corresponding to the even field, and the 2-field motion vector data with an accuracy of integer pixels is obtained on the basis of the selected difference absolute value sum data. Then, the nine macroblock data wherein the nine half-pel data including pixel data set on the basis of the 2-field motion vector data are located at the upper left corners are generated from the pixel data of even field by interpolation as described above. However, the present invention is not limited thereto, and the following variant is also possible. That is, minimum difference absolute value sum data may be selected from only difference absolute sum value data of pixel data provided within a macroblock corresponding to the odd field, and field motion vector data with an accuracy of integer pixels may be obtained on the basis of the selected difference absolute value sum data. Then, macroblock data wherein nine half-pel data including pixels located at the positions indicated by the field motion vector data are located at the upper left corners may be generated from pixel data of odd field by interpolation. In that case, an interpolation is carried out by use of pixel data of odd field which becomes a preceding field on the time base, and hence the number of motion vector data can be lessened although an accuracy of motion detection is not so high as compared with that provided when an interpolation is carried out by use of pixel data of even field.

Figure 1:
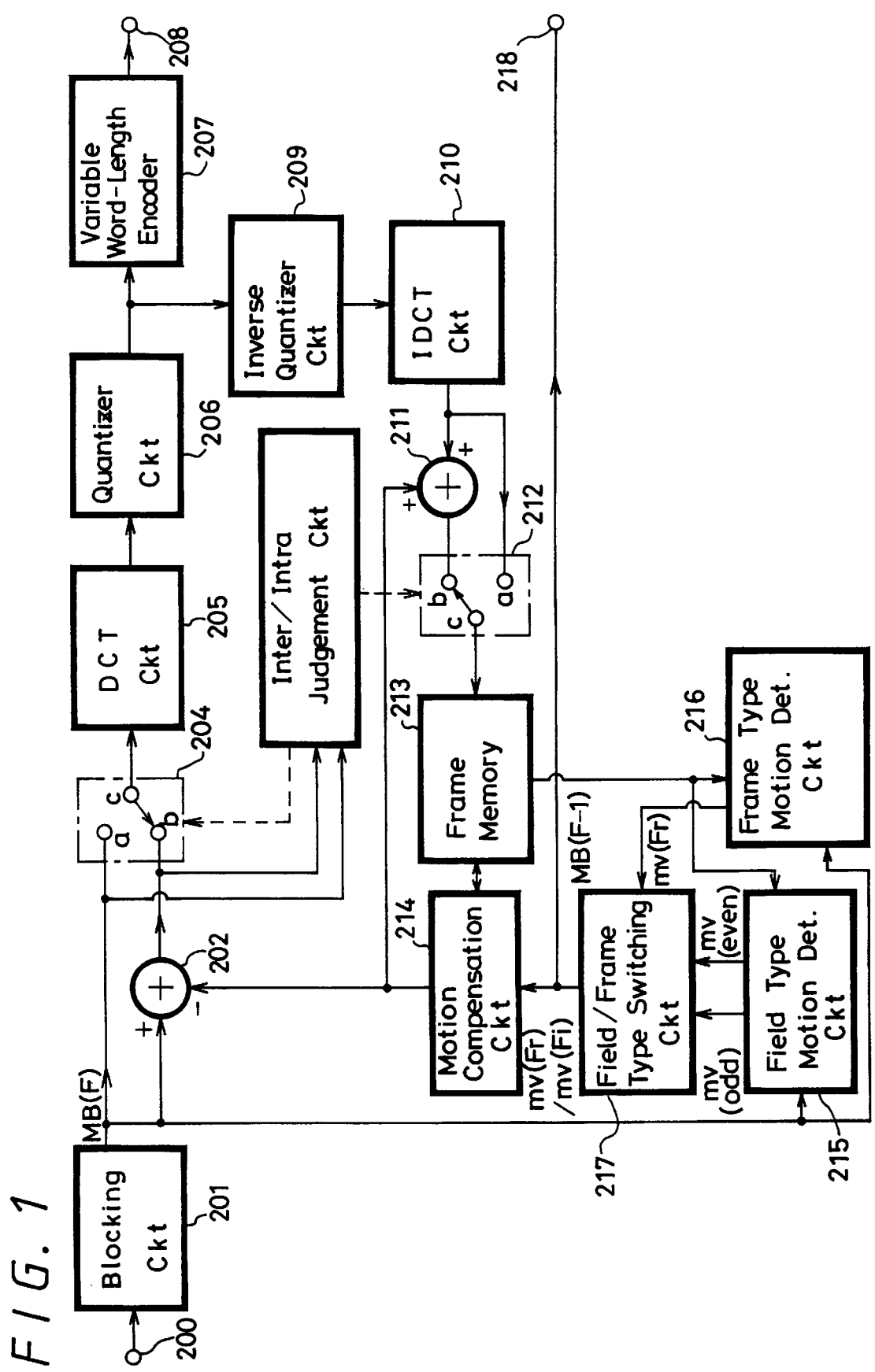
FIG. 1 is a block diagram showing an encoding apparatus.
Figure 2A:
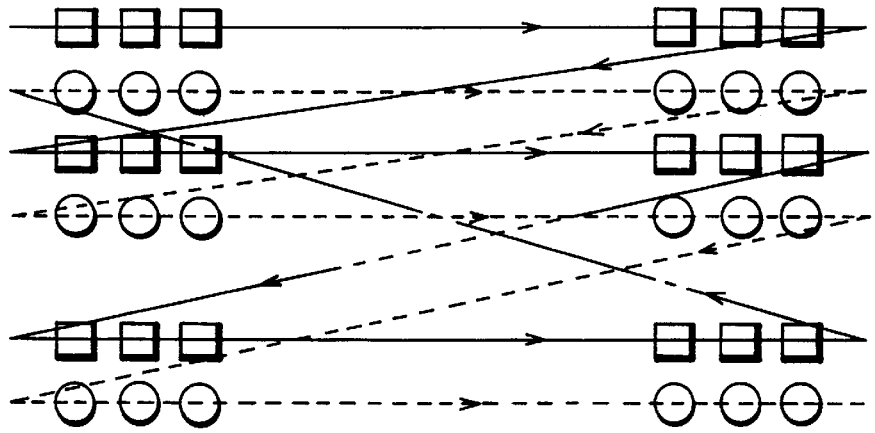
Figure 2B:
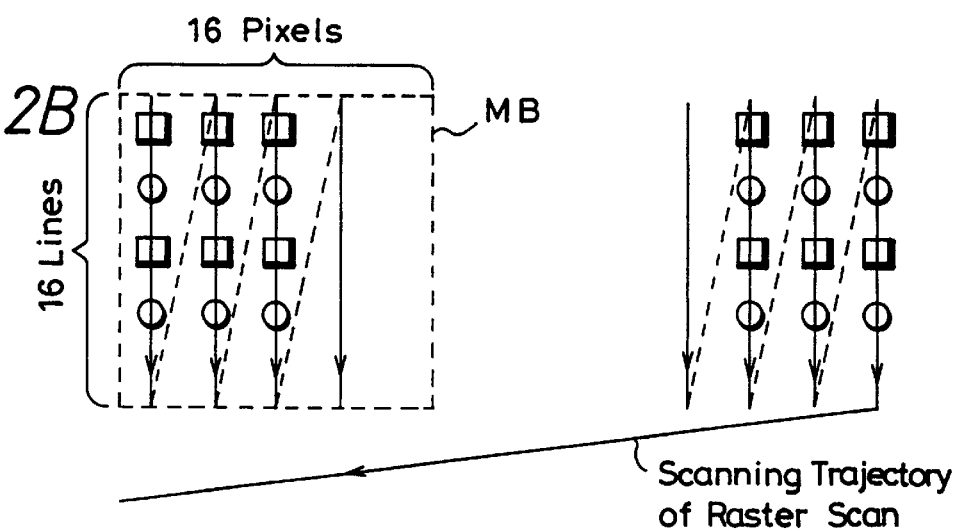
Figure 2C:
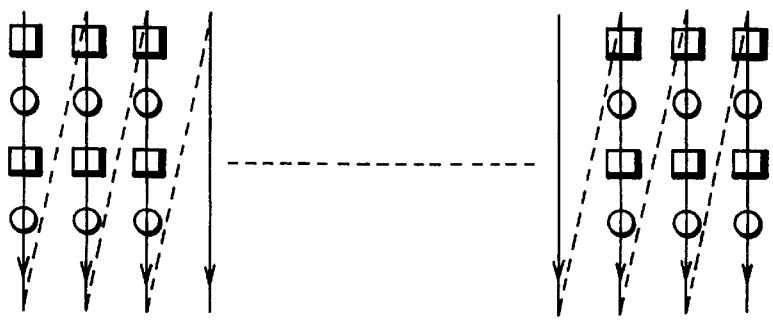
Figure 3:
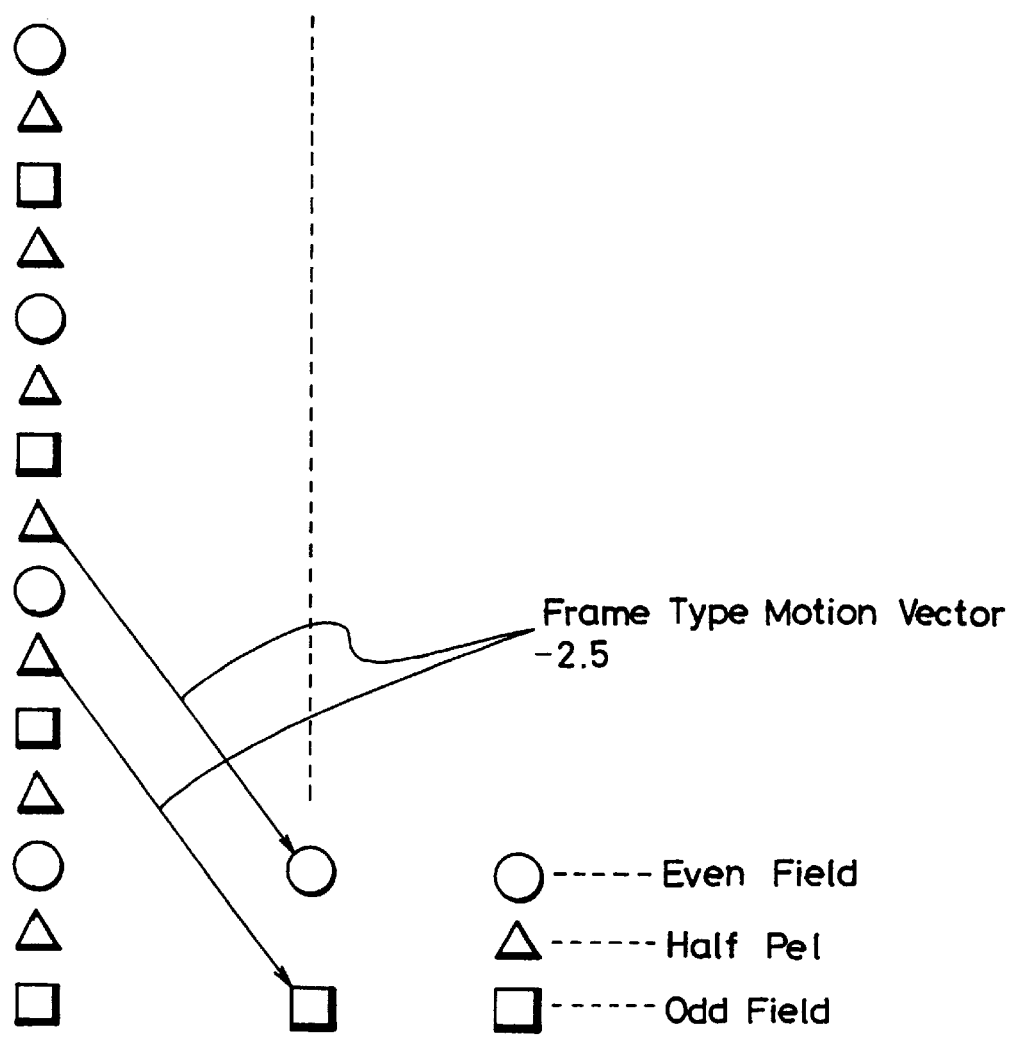
FIG. 3 is a schematic diagram used to explain a concept of frame type motion detection.
Figure 4:
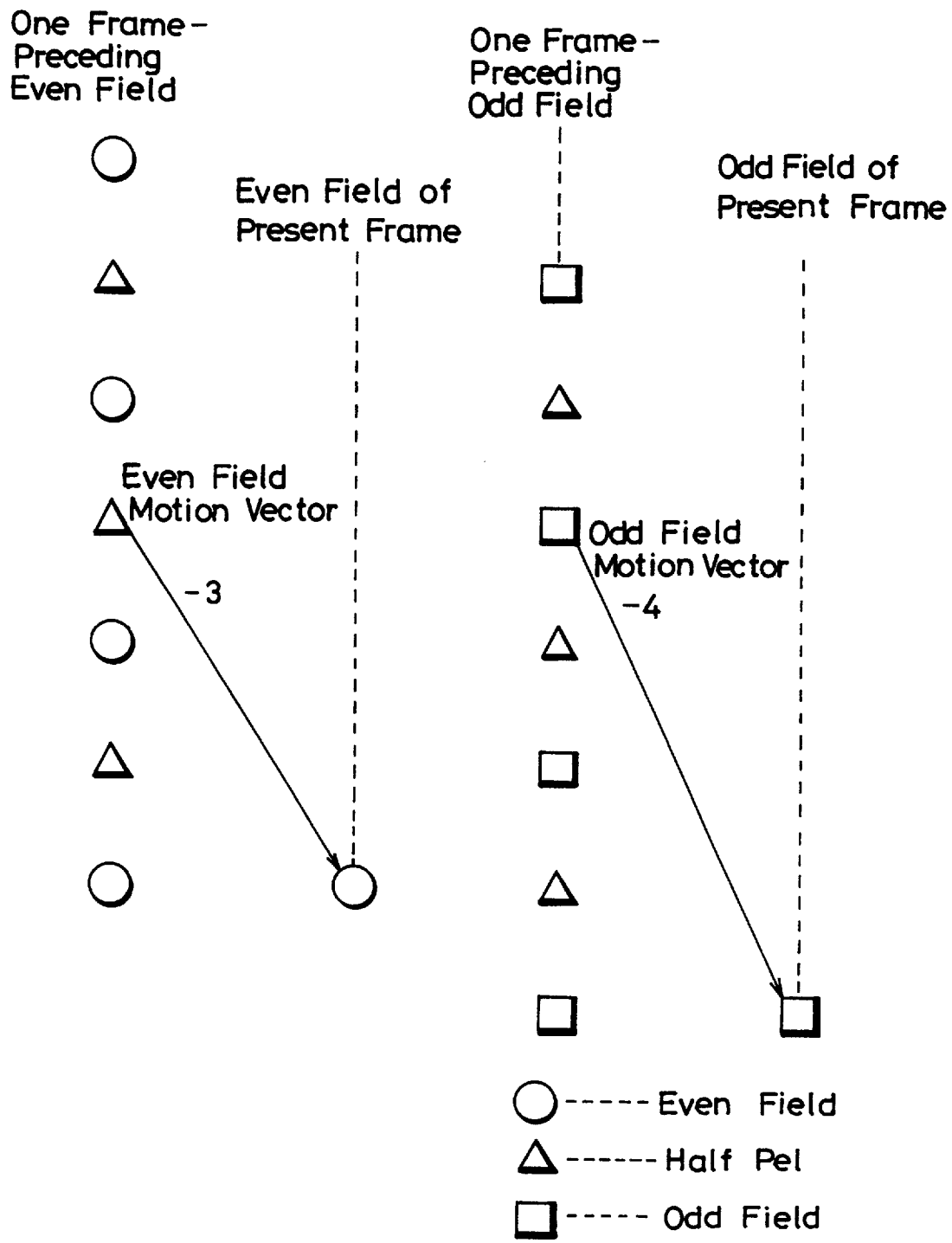
FIG. 4 is a schematic diagram used to explain a concept of field type motion detection.
Figure 5:
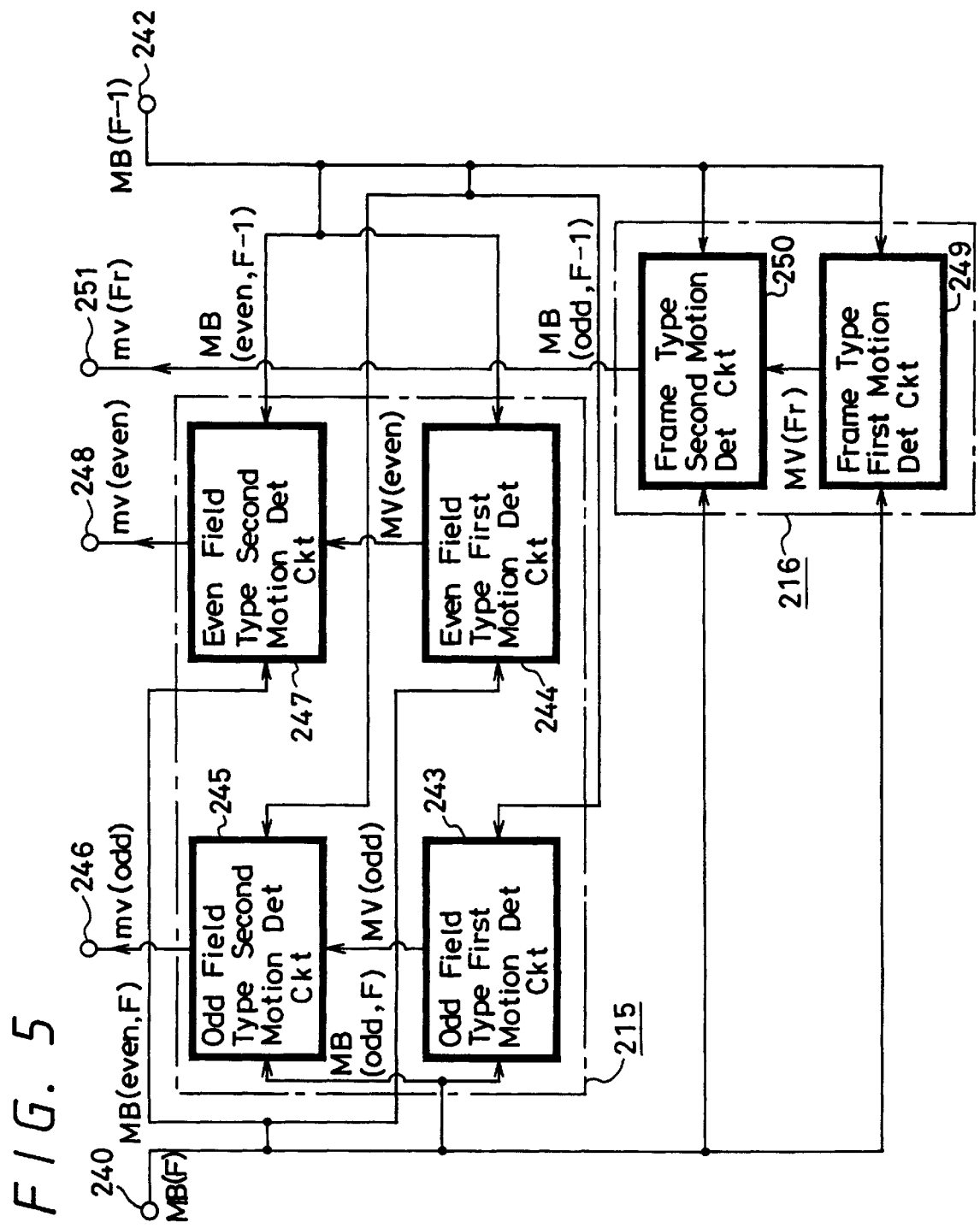
FIG. 5 is a block diagram showing a main portion of the encoding apparatus shown in FIG. 1.
Figure 6:
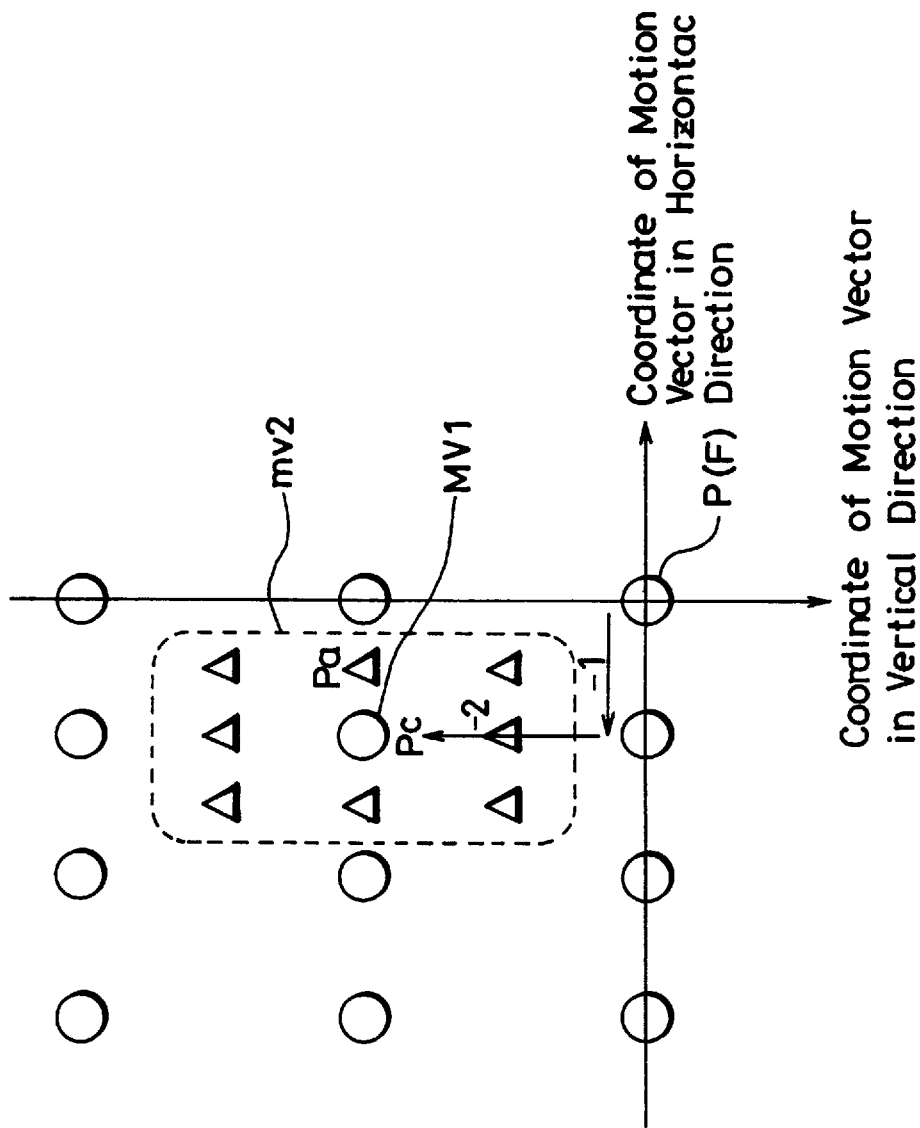
FIG. 6 is a schematic diagram used to explain a concept of how to detect motion based on a field two-step method.
Figure 7:
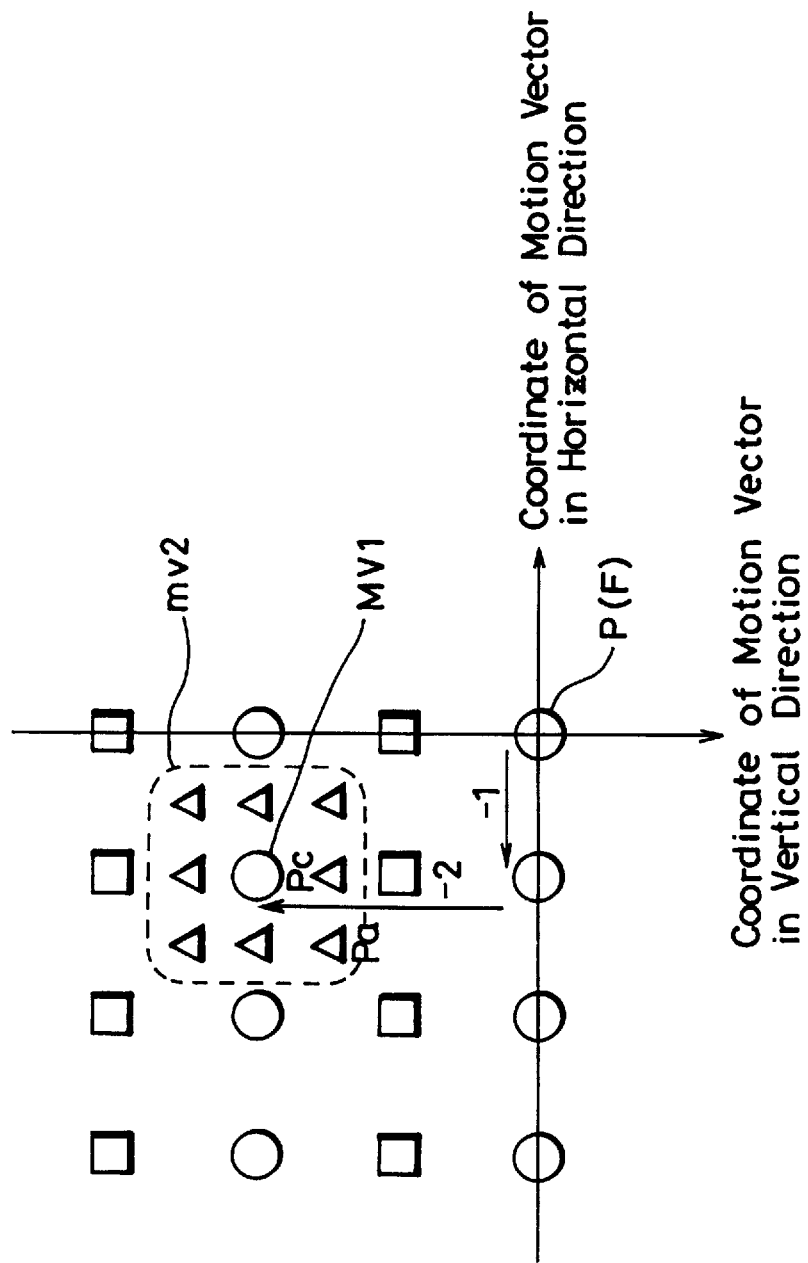
FIG. 7 is a schematic diagram used to explain a concept of how to detect motion based on a frame two-step method.
Figure 8:
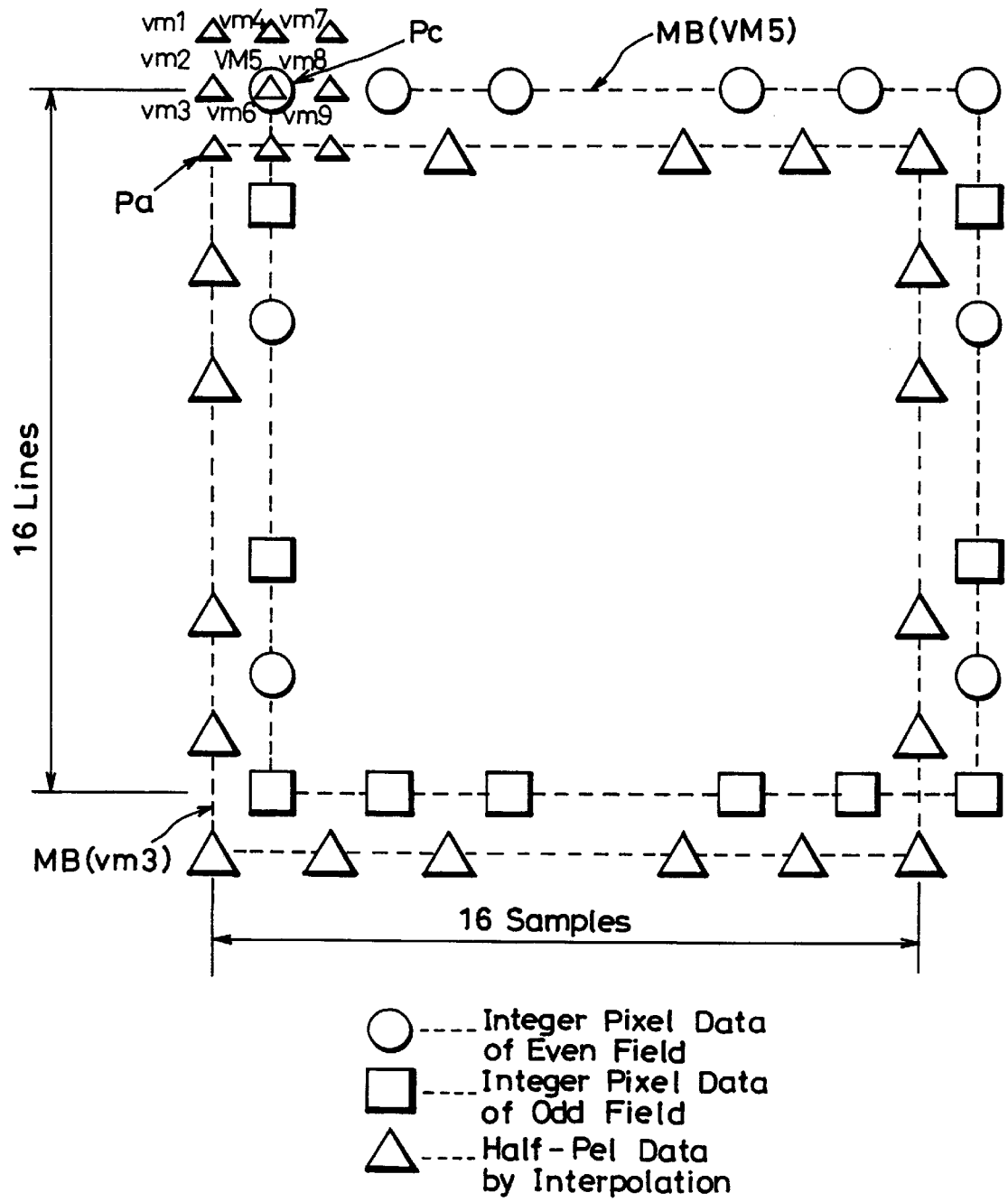
FIG. 8 is a schematic diagram used to explain a concept of how to interpolate half-pel data.
Figure 9:
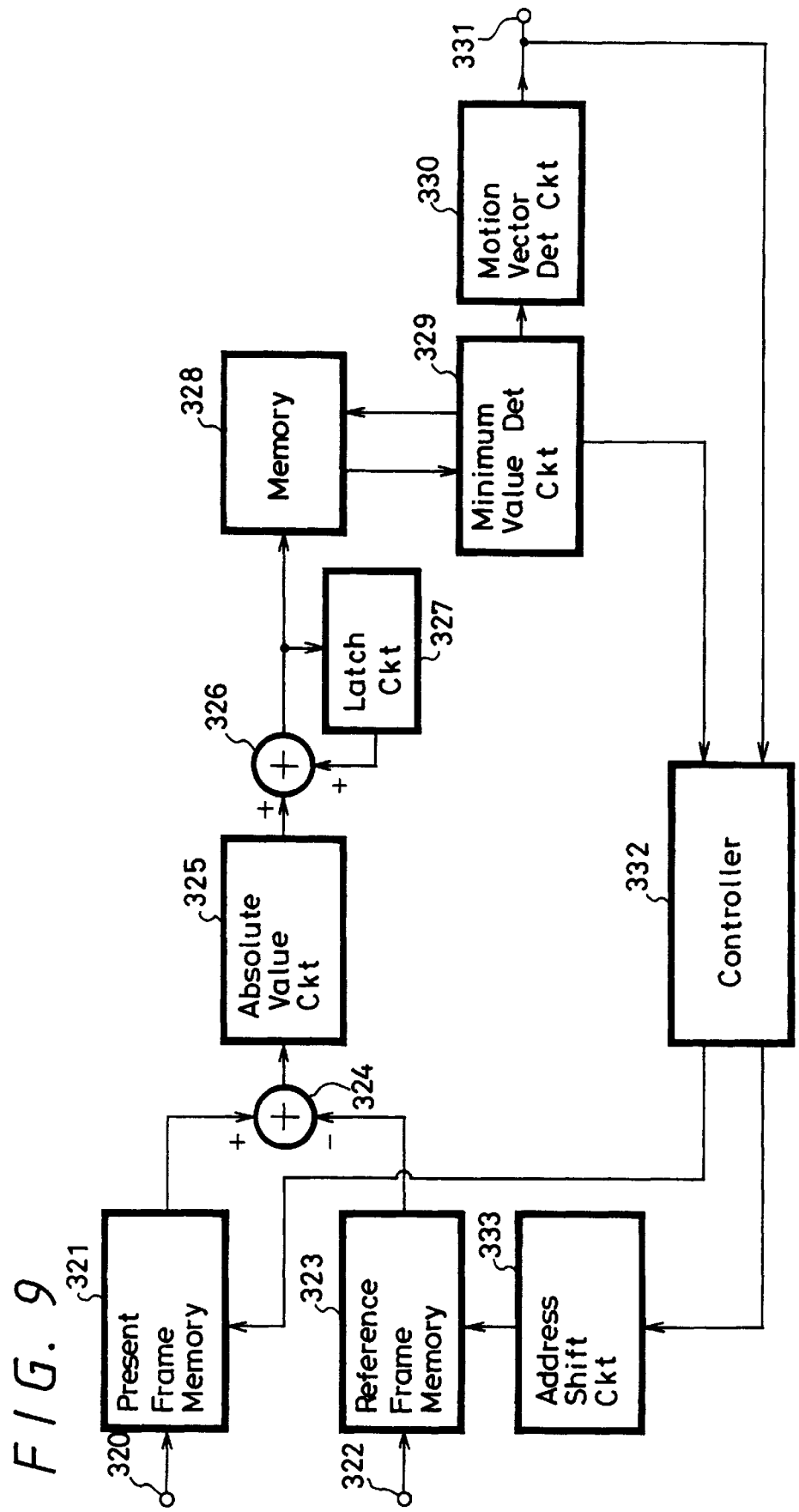
FIG. 9 is a block diagram showing an inside of a motion detecting circuit shown in FIG. 5.
Figure 10:
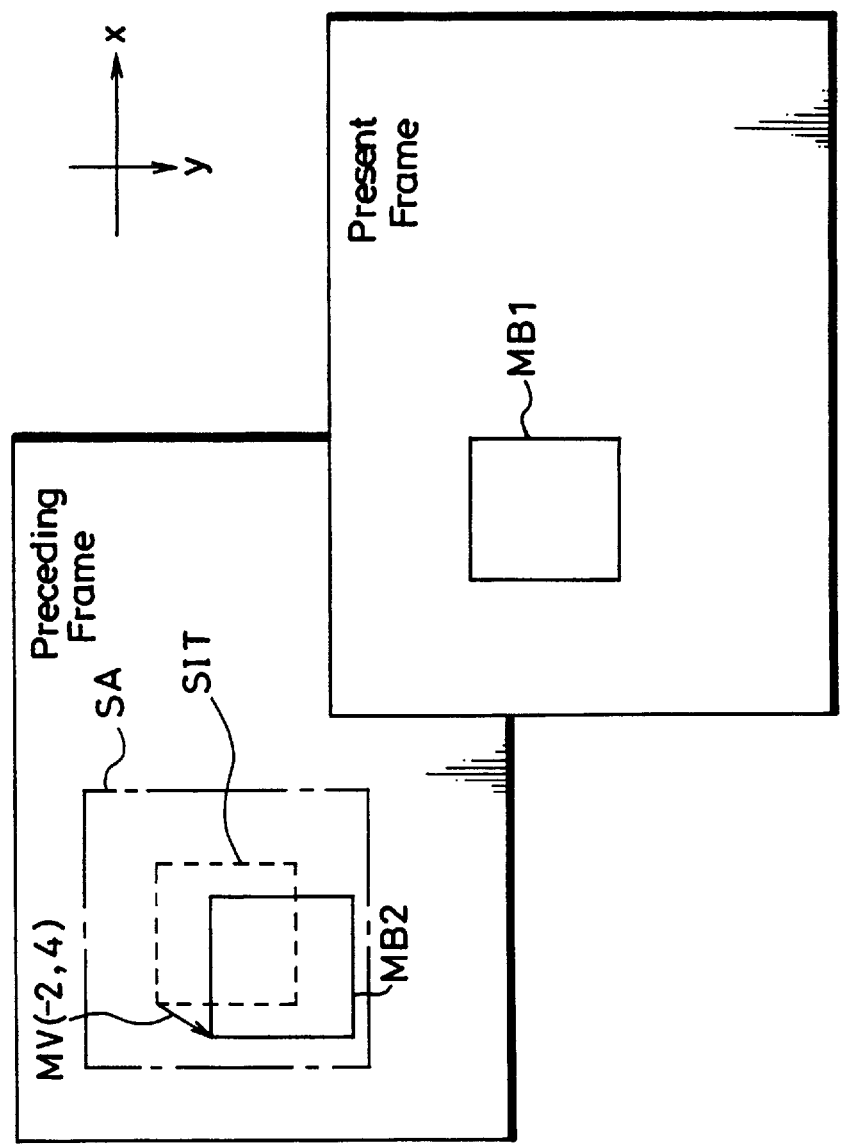
FIG. 10 is a schematic diagram used to explain a concept of block-matching method.
Figure 12:
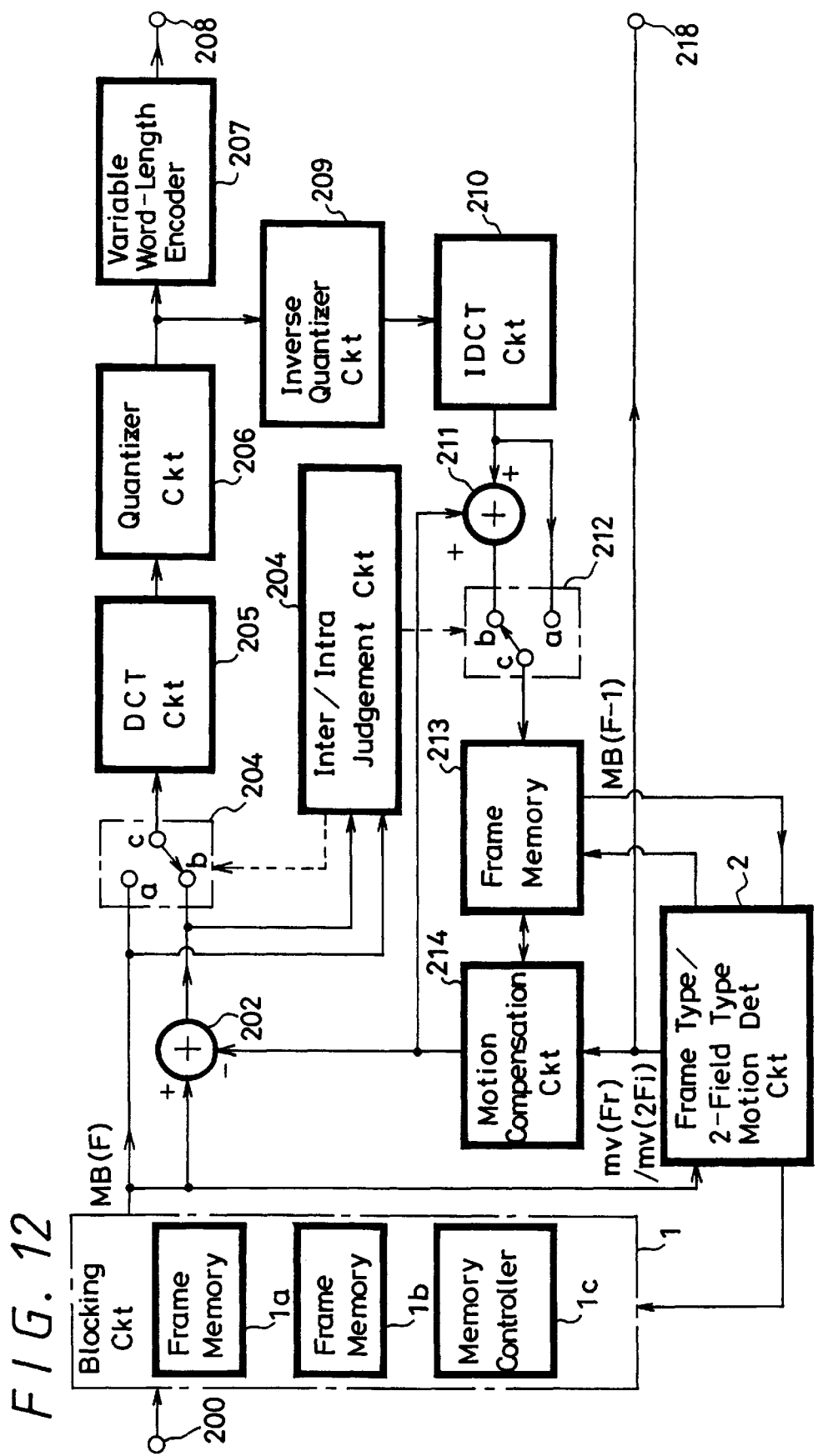
FIG. 12 is a block diagram showing an encoding circuit according to a first embodiment to which the high-efficiency coding method and the high-efficiency coding apparatus of the present invention are applied.

FIG. 12 is a block diagram showing a coding circuit according to an embodiment of the present invention. In FIG. 12, elements and parts identical to those of FIG. 1 are marked with same reference numerals, and therefore need not be described in detail.

As shown in FIG. 12, the input terminal 200 to which an interlace video signal is supplied from a signal source (not shown) is connected to an input terminal of a blocking circuit 1, and an output terminal of the blocking circuit 1 is connected to one fixed contact of the switch 204 and a positive input terminal of the adding circuit 202 and an input terminal of a frame type/2-field type motion detecting circuit 2.

The blocking circuit 1 comprises a frame memory 1a, a frame memory 1b, and a memory controller 1c. The memory controller 1c supplies a write control signal and a read control signal to the frame memories 1a, 1b sequentially. Therefore, during the video signal supplied from the input terminal 200 is written in the frame memory 1a, a video signal is read out from the frame memory 1b under control of the memory controller 1c. During the video signal supplied from the input terminal 200 is written in the frame memory 1b, a video signal is read out from the frame memory 1a under control of the memory controller 1c.

The frame type/2-field type motion detecting circuit 2 selects, as already noted with reference to FIG. 11, the minimum difference absolute value sum data from the difference absolute value sum data of the pixel data provided within all macroblocks in the search area, and obtains the frame motion vector data with an accuracy of integer pixels on the basis of the selected difference absolute value sum data. Then, the frame type/2-field type motion detecting circuit 2 generates macroblock data wherein nine half-pel data including pixel data set based on the frame motion vector data are data located at upper left corners from pixel data of odd fields and even fields with respect to the vertical direction and pixel data of odd-numbered or even fields with respect to the horizontal direction by interpolation, and obtains difference absolute value sum data with respect to the half-pel data.

Simultaneously, the frame type/2-field type motion detecting circuit 2 selects minimum difference absolute value sum data from only difference absolute value sum data of pixel data provided within the macroblocks corresponding to the even fields, and obtains field motion vector data with an accuracy of integer pixels on the basis of the selected difference absolute value sum data. The frame type/2-field type motion detecting circuit 2 generates macroblock data wherein nine half-pel data including pixel data set based on the field motion vector data are data located at upper left corners from pixel data of even field by interpolation, obtains difference absolute value sum data with respect to half-pel data, compares the thus obtained difference absolute value sum data with difference absolute value sum data obtained by the frame type motion detection with an accuracy of integer pixel data, and selects motion vector data of difference absolute value sum data of smaller value. The frame type/2-field type motion detecting circuit 2 supplies the thus selected frame motion vector data or 2-field motion vector data to the motion compensating circuit 214.

This frame type/2-field type motion detecting circuit 2 supplies a control signal to the memory controller 1c so that macroblock data of present frame is read out from the frame memory 1a or 1b under control of the memory controller 1c. Also, the frame type/2-field type motion detecting circuit 2 supplies a read control signal to the frame memory 213 so that all pixel data in the search area necessary for the processing are read out from the frame memory 213.

The interlace image data of present frame is supplied through the input terminal 200 to the blocking circuit 1. The interlace image data of present frame is divided by the blocking circuit 1 into a macroblock of 16 pixels×16 pixels, for example, and supplied to the switch 204, the adding circuit 202 and the frame type/2-field type motion detecting circuit 2.

The macroblock data MB(F) of present frame supplied to the adding circuit 202 is subtracted by the motion-compensated macroblock data MB(F-1) of preceding frame supplied from the motion compensating circuit 214 and thereby converted to difference data. This difference data is supplied to the switch 204. The macroblock data MB(F) of present frame supplied to the switch 204 and the difference data from the adding circuit 202 are selectively supplied to the DCT circuit 205 in response to the switching control signal from the inter/intra judgement circuit 203.

The macroblock data MB(F) of present frame or the difference data supplied to the DCT circuit 205 is converted into coefficient data in the form of a DC component to a high-order AC component, and supplied to the quantizer circuit 206, in which it is quantized at a predetermined quantization step. The coefficient data thus quantized is supplied to the variable word-length encoding circuit 207 and the inverse quantizer circuit 209. The quantized coefficient data supplied to the variable word-length encoding circuit 207 is variable-word-length-encoded in a suitable manner such as run-length coding or Huffman coding, and the outputted through the output terminal 208.

On the other hand, the quantized coefficient data supplied to the inverse quantizer circuit 209 is converted into original coefficient data, which is before being quantized, and supplied to the IDCT circuit 210. The coefficient data supplied to the IDCT circuit 210 is decoded by the IDCT circuit 210 into the original macroblock data MB(F) or difference data, and supplied to the adding circuit 211 and the switch 212.

The difference data of present frame supplied to the adding circuit 211 is added to the motion-compensated macroblock data MB(F-1) of preceding frame from the motion compensating circuit 214, and supplied to the switch 212. The added output and the macroblock data MB(F) of present frame supplied to the switch 212 from the adding circuit 211 are selectively supplied to the frame memory 213 in response to the switching control signal from the inter/intra judgement circuit 203, and memorized in the memory space on the frame memory 213.

On the other hand, the macroblock data MB(F-1) of preceding frame read out from the frame memory 213 is supplied to the frame type/2-field type motion detecting circuit 2. The frame type/2-field type motion detecting circuit 2 is supplied with the macroblock data MB(F-1) of preceding frame read out from the frame memory 213 and the macroblock data MB(F) of present frame from the blocking circuit 201.

The frame type/2-field type motion detecting circuit 2 initially executes a frame-type motion detection with an accuracy of integer pixels by use of the macroblock data MB(F) of present frame and the macroblock data MB(F-1) of preceding frame thereby to select motion vector data of minimum value from the motion vector data of all macroblocks as frame motion vector data with an accuracy of integer pixels. Simultaneously, the frame type/2-field type motion detecting circuit 2 selects motion vector data of minimum value from motion vector data of all macroblocks with even fields located in the longitudinal direction as 2-field motion vector data with an accuracy of integer pixels.

Pixel data located at the center of search area for effecting a motion detection with an accuracy of half-pel is set by the detected frame motion vector data with an accuracy of integer pixels, and macroblock data wherein nine half-pel data including such pixel data are data located at upper left corners are generated from pixel data of odd fields and pixel data of even fields. Then, difference absolute values between nine macroblock data including the thus generated nine half-pels and the remarkable macroblock data are sequentially calculated, and the thus calculated difference absolute value data are added to every macroblock, thereby generating nine difference absolute value sum data. Then, frame motion vector data with an accuracy of half-pel is obtained on the basis of the difference absolute sum value data of minimum value is obtained from the nine difference absolute value sum data.

On the other hand, pixel data at the center of the search area for detecting a motion with an accuracy of half-pel are set by the detected 2-field motion vector data with an accuracy of integer pixels, and macroblock data wherein nine half-pel data including the above pixel data are data located at upper left corners are generated from only pixel data of even fields. Then, difference absolute values between the nine macroblock data including the thus generated nine half-pel data and the remarkable macroblock data are calculated sequentially, and the difference absolute value data are added to every macroblock data, thereby obtaining nine difference absolute value sum data. Then, 2-field motion vector data with an accuracy of half-pel is obtained on the basis of minimum difference absolute value sum data within the nine difference absolute value sum data.

Subsequently, the minimum value of the difference absolute value sum data obtained by the frame type motion detection with an accuracy of half-pel and the minimum value of the difference absolute value sum data obtained by the 2-field type motion detection with an accuracy of half-pel are compared with each other, and motion vector data obtained based on the difference absolute value sum data of smaller value is selected. The thus selected frame motion vector data or 2-field motion vector data mv(Fr)/mv(2Fi) is supplied to the motion compensating circuit 214.

The motion compensating circuit 214 carries out motion compensation. Specifically, when the motion compensating circuit 214 supplies address data (or control signal for controlling a memory controller, not shown) generated based on the frame motion vector data or the 2-field motion vector data mv(Fr)/mv(Fi) supplied thereto from the frame type/2-field type motion detecting circuit 2 to the frame memory 213, the macroblock data MB(F-1) of preceding frame is read out from the frame memory 213. This macroblock data MB(F-1) is data located at the original position of the macroblock data MB(F) of present frame supplied thereto from the blocking circuit 1.

The motion-compensated macroblock data of preceding frame from the motion compensating circuit 214 is supplied to the adding circuit 202, whereby the macroblock data MB(F-1) of preceding frame is subtracted from the macroblock data MB(F) supplied from the blocking circuit 1.

Figure 13:
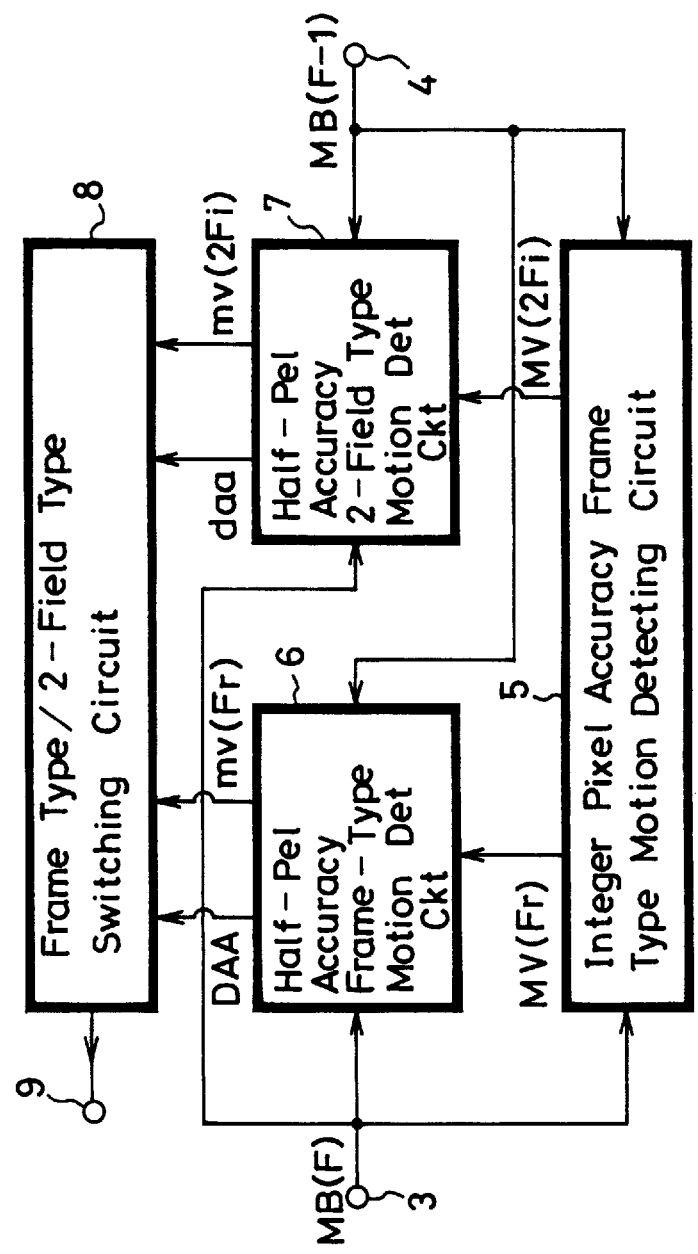
FIG. 13 is a block diagram showing the inside of a frame type/2-field type motion detecting circuit according to a first embodiment of the present invention.

FIG. 13 is a block diagram showing the frame type/2-field type motion detecting circuit 2 shown in FIG. 12 more in detail As shown in FIG. 13, the frame type/2-field type motion detecting circuit 2 comprises an integer-pixel accuracy frame type motion detecting circuit 5 for detecting a motion with an accuracy of integer pixels, a half-pel accuracy frame type motion detecting circuit 6 for effecting a half-pel accuracy frame type motion detection on the basis of frame motion vector data MV(Fr) with an accuracy of integer pixels supplied thereto from the integer-pixel accuracy frame type motion detecting circuit 5, a half-pel accuracy 2-field type motion detecting circuit 7 for effecting 2-field type motion detection with an accuracy of half-pel on the basis of 2-field motion vector data MV(2Fi) with an accuracy of integer pixels supplied thereto from the integer-pixel accuracy frame type motion detecting circuit 5, and a frame type/2-field type switching circuit 8 for switching the half-pel accuracy frame motion vector data mv(Fr) supplied thereto from the integer-pixel accuracy frame type motion detecting circuit 6 and the 2-field motion vector data mv(2Fi) supplied thereto from the half-pel accuracy 2-field type motion detecting circuit 7.

The half-pel accuracy 2-field type motion detecting circuit 7 detects 2-field motion vector data MV(2Fi) on the basis of minimum difference absolute sum data from difference absolute value sum data of even-numbered macroblocks in the longitudinal direction of all macroblocks provided within the search area obtained in the integer-pixel accuracy frame type motion detecting circuit 5.

The frame type/2-field type switching circuit 8 compares minimum difference absolute value sum data DAA detected by the half-pel accuracy frame type motion detecting circuit 6 and minimum difference absolute value sum data daa detected by the half-pel accuracy 2-field type detecting circuit 7, selects motion vector data generated based on the minimum difference absolute value sum data DAA or daa, i.e., frame motion vector mv(Fr) supplied thereto from the half-pel accuracy frame type motion detecting circuit 6 or 2-field motion vector data mv(2Fi) supplied thereto from the half-pel accuracy 2-field type motion detecting circuit 7, and supplies selected frame motion vector data mv(Fr) or 2-field motion vector data mv(2Fi) through an output terminal 9 to the motion compensating circuit 214.

The macroblock data MB(F) of the present frame is supplied from the blocking circuit 1 shown in FIG. 12 through an input terminal 3 to the integer-pixel accuracy frame type motion detecting circuit 5. On the other hand, the macroblock data MB(F-1) of preceding frame is supplied to the integer-pixel accuracy frame type motion detecting circuit 5 from the frame memory 213 shown in FIG. 12 through an input terminal 4.

The integer-pixel accuracy frame type motion detecting circuit 5 calculates difference absolute value sum between the macroblock data MB of present frame supplied thereto through the input terminal 3 and the macroblock data MB(F-1) of preceding frame supplied thereto through the input terminal 4 to obtain difference absolute value sum data of all macroblocks provided within the search area set on the memory space of the frame memory 213. Then, this integer-pixel accuracy frame type motion detecting circuit 5 detects motion vector data with an accuracy of integer pixels on the basis of minimum difference absolute value sum data provided within the whole difference absolute value sum data, and outputs this motion vector data as the frame motion vector data MV(Fr). Simultaneously, this integer-pixel accuracy frame type motion detecting circuit 5 detects motion vector data on the basis of minimum difference absolute value sum data provided within the difference absolute value sum data of all even-numbered macroblocks in the longitudinal direction within the search area.

The frame motion vector data MV(Fr) from the integer pixel accuracy frame type motion detecting circuit 5 is supplied to the half-pel accuracy frame type motion detecting circuit 6. The half-pel accuracy frame type motion detecting circuit 6 generates pixel data located at the position shown by the frame motion vector data MV(Fr) and nine macroblock data wherein eight half-pel data are data located at the upper left corners of macroblocks by interpolation using pixel data located within the frame, sequentially effects difference absolute value sum calculation of macroblock data MB(F-1) of nine macroblock data and macroblock data MB(F) of present frame, and supplies the minimum difference absolute value sum data of the resultant difference absolute value sum data and motion vector data obtained on this difference absolute value sum data to the frame type/2-field type switching circuit 8 as frame motion vector data mv(Fr) with an accuracy of half-pel.

On the other hand, the 2-field motion vector data MV(2Fi) from the integer-pixel accuracy frame type motion detecting circuit 5 is supplied to the half-pel accuracy 2-field type motion detecting circuit 7. The half-pel accuracy 2-field type motion detecting circuit 7 generates pixel data located at the position shown by 2-field motion vector data MV(2Fi) and nine macroblock data wherein eight half-pel data are located at the upper left corners of macroblocks by interpolation using pixel data of even field, effects difference absolute value sum calculation of macroblock data MB(F-1) of nine macroblock data and the macroblock data MB(F) of present frame, and supplies the minimum difference absolute value sum data of the resultant nine difference absolute value sum data and motion vector data obtained based on this difference absolute value sum data to the frame type/2-field type switching circuit 8 as 2-field motion vector data mv(2Fi) with an accuracy of half-pel.

The frame type/2-field type switching circuit 8 compares the difference absolute value sum data supplied thereto from the half-pel accuracy frame type motion detecting circuit 6 and the difference absolute value sum data from the half-pel accuracy 2-field type motion detecting circuit 7, and selectively outputs motion vector data obtained based on difference absolute value sum data of smaller value. Specifically, the frame type/2-field type switching circuit 8 selectively outputs the half-pel accuracy frame motion vector data mv(Fr) supplied thereto from the half-pel accuracy frame type motion detecting circuit 6 or the 2-field motion vector data mv(2Fi) with an accuracy of half-pel supplied thereto from the half-pel accuracy 2-field type motion detecting circuit 7 based on the compared result.

The frame motion vector data mv(Fr) with a half-pel accuracy or the 2-field motion vector data mv(2Fi) with an accuracy of half-pel outputted from the output terminal 8 is supplied to the motion compensation circuit 214 shown in FIG. 12. Thus, the motion compensation circuit 214 effects motion compensation on the pixel data stored in the frame memory 213, and hence can output data that should be subtracted from the macroblock data MB(F) of present data, i.e., macroblock data MB(F-1) of preceding frame located at the original position of the macroblock data MB(F) of present frame.

FIG. 14 is a block diagram showing more fully respective portions shown in FIG. 13, i.e., the integer-pixel unit frame type motion detecting circuit 5, the half-pel unit frame type motion detecting circuit 6, the half-pel unit 2-field type motion detecting circuit 7, and the frame type/2-field type switching circuit 8.

As shown in FIG. 14, the integer-pixel accuracy frame type motion detecting circuit 5 shown in FIG. 13 comprises a difference absolute value sum calculating circuit 21 for effecting difference absolute value sum calculation of the macroblock data MB(F) of present frame supplied thereto from the blocking circuit 1 shown in FIG. 13 through the input terminal 20 and the macroblock data MB(F-1) of preceding frame, a frame type minimum value selecting circuit 23 for selecting frame motion vector-nominated difference absolute value sum data of smallest value from difference absolute value sum data ACC with an integer-pixel accuracy supplied thereto from the difference absolute value sum calculating circuit 21 and obtaining frame motion vector data MV(Fr) from the difference absolute value sum data, and a 2-field type minimum value selecting circuit 30 for selecting difference absolute value sum data of smaller from difference absolute value sum data of all macroblocks which become even-numbered macroblocks in the longitudinal direction of the search area in the frame motion vector nominated difference absolute value sum data ACC with integer-pixel accuracy supplied thereto from the difference absolute value sum calculating circuit 21 and obtaining 2-field motion vector data MV(2Fi) from the difference absolute value sum data.

The half-pel accuracy frame type motion detecting circuit 6 shown in FIG. 13 comprises a half-pel generating circuit 26 for generating half-pel data based on pixel data of search area, which becomes a processing area, supplied thereto from the frame memory 213 shown in FIG. 12 through the input terminal 22 from the frame type minimum value selecting circuit 23 based on the frame motion vector data MV(Fr), a search area memory 24 for storing pixel data within the search area supplied thereto through the input terminal 22 under control of the controller 32, a macroblock memory 27 for storing macroblock data MB(F) of present frame supplied thereto from the blocking circuit 1 through the input terminal 20, a difference absolute value sum calculating circuit 28 for effecting a difference absolute value sum calculation between the macroblock data MB(F-1) of nine macroblocks sequentially supplied thereto from the search area memory 24 and the macroblock data MB(F) supplied thereto from the macroblock memory 27, and a minimum value selecting circuit 29 for selecting minimum value difference absolute value sum data DAA (1, 2, . . . or 9) from nine difference absolute value sum data DAA1 to DAA9 obtained by the difference absolute value sum calculating circuit 28.

The half-pel accuracy 2-field type motion detecting circuit 7 comprises a half-pel generating circuit 33 for generating half-pel data based on pixel data of search area, which becomes a processing area, supplied thereto from the frame memory 213 shown in FIG. 12 on the basis of the 2-field motion vector data MV(2Fi) from the 2-field type minimum value selecting circuit 30 through the input terminal 22, a search area memory 31 for storing therein pixel data within the search area supplied thereto through the input terminal 22, the macroblock memory 27 (commonly used by the half-frame accuracy frame type motion detecting circuit 5) for storing therein the macroblock data MB(F) of present frame supplied thereto from the blocking circuit 1 shown in FIG. 12 through the input terminal 20, a difference absolute value sum calculating circuit 34 for effecting a difference absolute value sum calculation between the macroblock data MB(F-1) of nine macroblocks sequentially supplied thereto from the search area memory 31 and the macroblock data MB(F) supplied thereto from the macroblock memory 27, and a minimum value selecting circuit 35 for selecting minimum value difference absolute value sum data Daa(1, 2, . . . or 9) from the nine difference absolute value sum data Daa 1 to Daa9 obtained in the difference absolute value sum calculating circuit 34.

The frame type/2-field type switching circuit 8 shown in FIG. 13 comprises a comparing circuit 36 for outputting a selection control signal SEL indicating motion vector data corresponding to difference absolute value sum data of smaller value by comparing the difference absolute value sum data DAA (1, 2, . . . or 9) supplied thereto from the minimum value selecting circuit 29 and the difference absolute value sum data daa(1, 2, . . . or 9) supplied thereto from the minimum value selecting circuit 35, and a vector selecting circuit 37 for selecting half-pel accuracy frame motion vector data mv(Fr) supplied thereto from the minimum value selecting circuit 29 or half-pel accuracy 2-field motion vector data mv(2Fi) supplied thereto from the minimum value selecting circuit 35 on the basis of the selection control signal SEL supplied thereto from the comparing circuit 36.

The controller 32 supplies a read control signal to the memory controller 1c shown in FIG. 12 through an output terminal 32a, and supplies a read/write control signal to the frame memory 213 through an output terminal 3b. Moreover, the controller 32 supplies read/write control signals to the search area memories 24, 31 and the macroblock memory 27 shown in FIG. 14.

Figure 15:
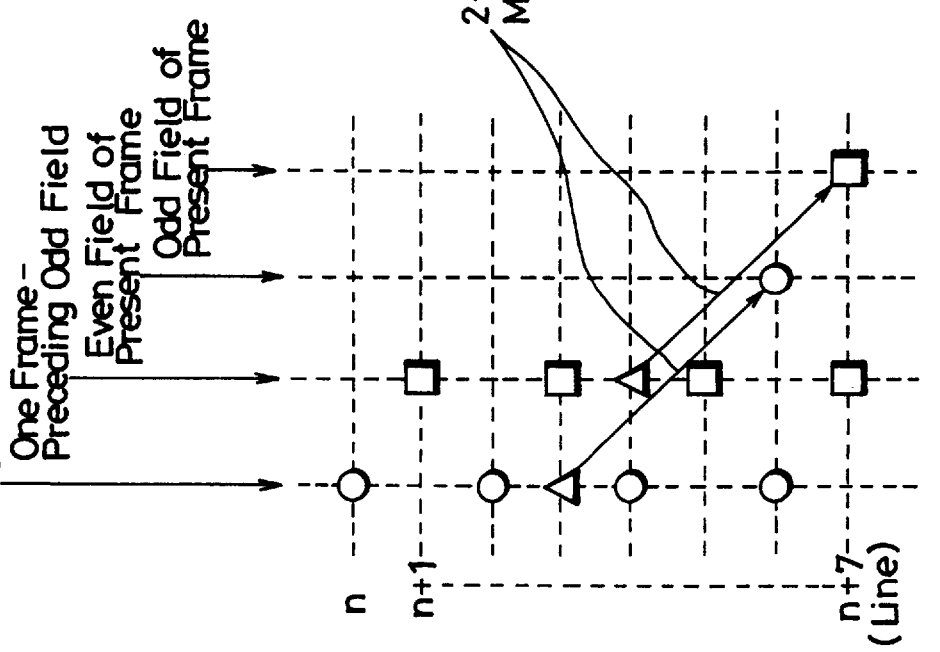
FIG. 15 is a schematic diagram used to explain a motion detection in the frame type/2-field type motion detecting circuit shown in FIG. 14.

FIG. 15 is a schematic diagram used to explain 2-field type motion detection. In FIG. 15, "open square" represents pixel data of odd field, "open circle" represents pixel data of even field, and "open triangle" represents average value data of upper and lower pixel data of corresponding field. FIG. 15 shows even field of one-frame preceding, odd field of one-frame preceding, even field of present frame, and odd field of present frame from left to right, in that order.

A half-pel in the 2-field type motion detection corresponds to "1.0" because it becomes pixel data of even field or odd field obtained when coordinates of vector in the longitudinal direction are seen from the frame. In the 2-field type motion detection, motion vector data of odd field and motion vector data of even field are common so that any of motion vector data becomes (0, −3) as seen from the frame in the embodiment shown in FIG. 15, for example. In FIG. 15, "0" represents the horizontal direction and "−3" represents the vertical direction. "− (minus)" in the horizontal direction means that the motion direction is the left-hand direction on the picture screen and that "− (minus)" in the vertical direction means that the motion direction is the lower to upper direction on the picture screen.

The reason that any of the motion vector data of the vertical direction between the even field pixel data of the present frame and even field pixel data of one frame preceding frame and motion vector data between the odd field pixel data of present frame and the odd field pixel data of one frame preceding becomes "0" is that the pixel data of present frame and one frame preceding frame has no motion in the horizontal direction. Further, the reason that motion vector data in the vertical direction becomes "−3" is that motion vector data between two half pels adjacent in the longitudinal direction becomes "1". This can be understood by counting frames shown by broken lines in FIG. 15 from lower to upper direction.

The reason that motion vector data of two fields are made common is that even fields and odd fields are arranged on the time base. In addition, if the even field and the odd field have no motion therebetween, then totally two motion vector data of the even field macroblock and the odd field macroblock can be considered as one frame motion vector data of macroblock of frame.

Accordingly, if the motion vector of even field is taken as a reference, when a motion vector with an accuracy of integer pixel is considered, the motion vector data in the 2-field type motion detection becomes the same as motion vector data of even field pixel data in the frame type motion detection. Therefore, if the motion vector in the odd field is taken as a reference, when only the motion vector with an accuracy of integer pixel is considered, motion vector data in the 2-field type motion detection becomes the same as the motion vector data of odd field pixel data in the frame type motion detection. Accordingly, in this embodiment, paying an attention to this point, as shown in FIG. 14, the difference absolute value sum calculation circuit 21 used in the frame type motion detection is commonly used in the integer-pixel accuracy frame type motion detection and the integer-pixel accuracy 2-field type motion detection.

Figure 16:
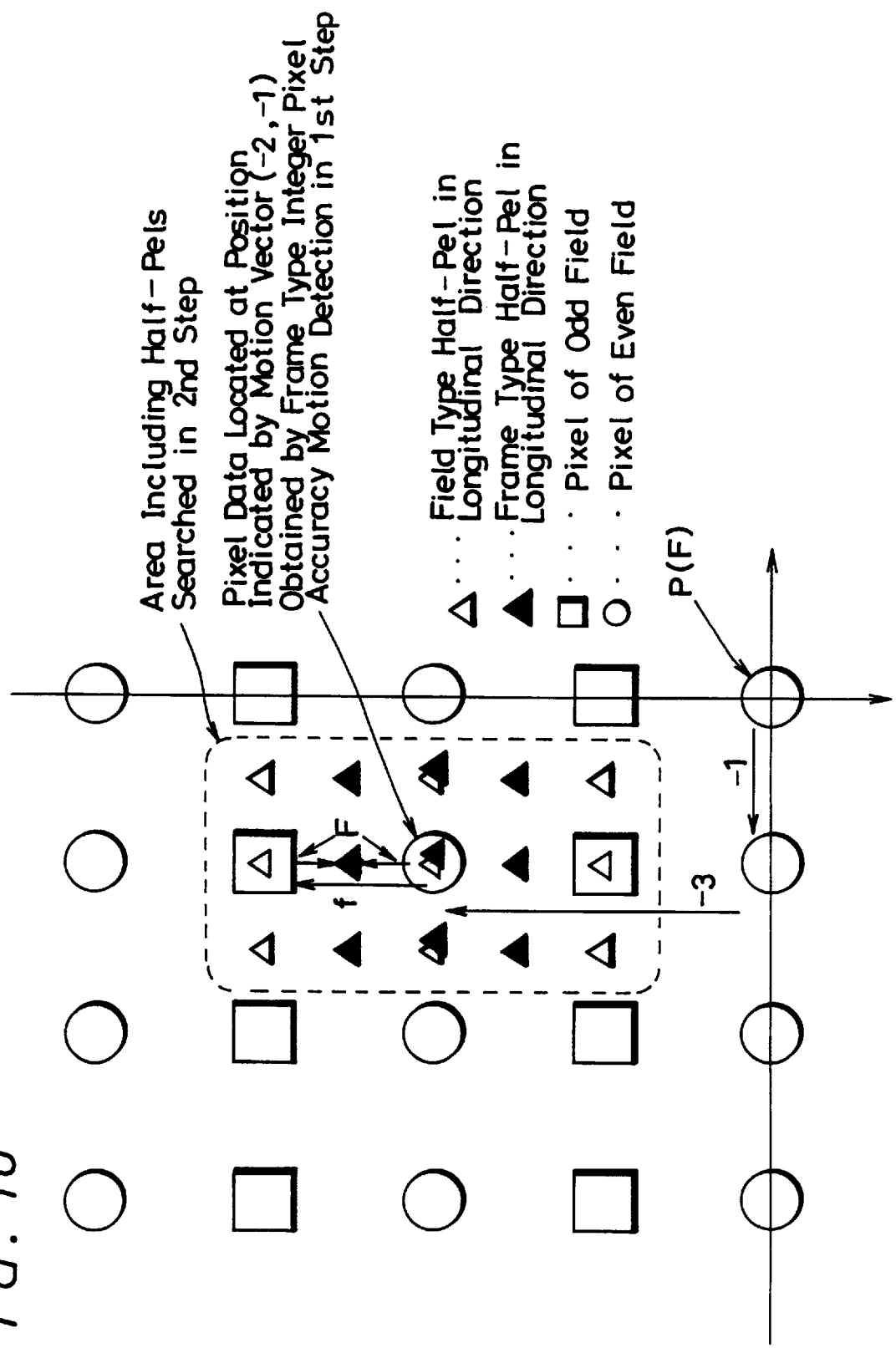
FIG. 16 is a schematic diagram used to explain a concept of how to generate half-pels in the frame type/2-field type motion detecting circuit shown in FIG. 14.

FIG. 16 is a schematic diagram used to explain the motion vector detection. A manner in which the integer-pixel accuracy frame type motion detection is carried out and the field type motion detection and the frame type motion detection are carried out by use of detected result will be described with reference to FIG. 16. In FIG. 16, "open square" represents pixel of odd field, "open circle" represents pixel of even field, "open triangle" represents half-pel generated in the field type motion detection in the longitudinal direction, "solid triangle" represents half-pel generated in the frame type motion detection in the longitudinal direction, and P(F) represents pixel of remarkable block in the present frame. For the sake of simplicity, FIG. 16 illustrates pixels of present frame and pixels of preceding frame in an overlapping state.

In the first step, motion vector (−1, −3) with integer-pixel accuracy is obtained by carrying out the frame type motion detection. In the next second step, half-pel data located within an area shown by a broken line are respectively generated about pixel data located at the position shown by this motion vector data. Specifically, half-pel data of longitudinal and lateral direction shown by "solid triangles" in FIG. 16 and which are used in the frame type motion detection are generated by interpolation of pixel data of odd-numbered and even fields as shown by arrows F, and half-pel data of longitudinal and lateral directions shown by "open triangles" in FIG. 16 and which are used in the 2-field type motion detection are generated by interpolation of even field pixel data as shown by arrows f.

In the half-pel accuracy frame type motion detection, macroblock data including nine "solid triangles" about the position shown by the above vector data are sequentially generated, and the above-mentioned processing is carried out by the thus generated macroblock data and the macroblock data of present frame, thereby sequentially carrying out the motion detection. On the other hand, in the half-pel accuracy 2-field type motion detection, macroblock data including nine "open triangle" about the position shown by the above motion vector data are sequentially generated, and the above processing is carried out by the thus generated macroblock data and the macroblock data of present frame, thereby sequentially carrying out the motion detection.

The motion vector data obtained by the half-pel accuracy frame type motion detection or the motion vector data obtained by the half-pel accuracy 2-field type motion detection is adaptively obtained by the motion compensation.

An operation of the frame type/2-field type motion detecting circuit 2 shown in FIG. 14 will be described below.

The macroblock data MB(F) of present frame supplied from the blocking circuit 1 shown in FIG. 12 is supplied through the input terminal 20 to the difference absolute value calculating circuit 21, and the macroblock data MB(F-1) of preceding frame from the frame memory 213 shown in FIG. 12 is supplied through the input terminal 22 to the difference absolute value sum calculating circuit 21.

The macroblock data MB(F) of present frame supplied through the input terminal 20 is stored in the macroblock memory 27 under control of the controller 32. The memory controller 32 controls the memory controller 1c shown in FIG. 12 such that the memory controller 1c repetitively outputs remarkable macroblock data of present frame through the output terminal 32a. The difference absolute value sum calculating circuit 21 obtains difference absolute value sum data ACC of every macroblock by effecting difference absolute value sum calculation between the macroblock data MB(F) of present frame supplied thereto through the input terminal 20 and the macroblock data MB(F-1) of preceding frame sequentially supplied thereto through the input terminal 22.

The frame type minimum value selecting circuit 23 selects smallest difference absolute value sum data from difference absolute value sum data of all macroblocks from the difference absolute value sum calculating circuit 21, obtains the frame motion vector data MV(Fr) with an accuracy of integer pixel on the basis of difference absolute value sum data, and supplies the frame motion vector data MV(Fr) to the controller 32. Simultaneously, the 2-field type minimum value selecting circuit 30 selects the minimum difference absolute value sum data from difference absolute value sum data of all macroblocks which become even-numbered macroblocks in the longitudinal direction of all macroblocks from the difference absolute value sum calculating circuit 21, obtains 2-field motion vector data MV(2Fi) with an accuracy of integer pixel on the basis of the resultant absolute value sum data, and supplies the 2-field motion vector data MV(2Fi) to the controller 32.

The controller 32 supplies the read control signal to the frame memory 214 shown in FIG. 12 through the output terminal 32b based on the frame motion vector data MV(Fr) with an accuracy of integer pixel supplied thereto from the frame type minimum value selecting circuit 32 so that all pixel data on the search area are read out from the frame memory 213 together with pixel data located at the position shown by the frame motion vector data MV(Fr) and pixel data necessary for generating nine macroblock data including eight half-pel data. The pixel data read out from the frame memory 214 are supplied through the input terminal 22 to the search area memory 24, and the controller 32 supplies the write control signal to the search area memory 24, whereby pixel data on the search area including pixel data necessary for generating the above half-pel data are stored in the search memory area 24.

The controller 32 supplies the read control signal to the frame memory 213 shown in FIG. 12 through the output terminal 32b on the basis of the 2-field motion vector data MV(2Fi) with an accuracy of integer pixel supplied thereto from the 2-field type minimum value selecting circuit 30 so that all pixel data on the search area are read out from the frame memory 213 together with the pixel data located at the position indicated by the 2-field motion vector data MV(2Fi) and pixel data necessary for generating macroblock data including eight half-pel data around the above pixel data. The pixel data read out from the frame memory 213 are supplied through the input terminal 22 to the search area memory 31, and the controller 32 supplies the write control signal to the search area memory 31, whereby pixel data on the search area including pixel data necessary for generating the above half-pel data are stored in the search area memory 31.

Subsequently, the controller 32 supplies the read control signal to the search area memory 24 to read pixel data from the search area memory 24. At that time, the controller 32 reads out pixel data necessary for sequentially generating nine half-pel accuracy macroblocks in such a manner that the half-pel data at the nine points become pixel data located at the upper left corners of the macroblocks each having half-pel accuracy. The pixel data thus read out are supplied to the half-pel generating circuit 26. The half-pel generating circuit 26 generates half-pel data composing macroblocks each having a half-pel accuracy sequentially on the basis of the pixel data supplied from the search area memory 24, and supplies the thus generated half-pel data to the difference absolute value sum calculating circuit 28.

On the other hand, the controller 32 supplies the read control signal to the search area memory 31 to read out pixel data from the search area memory 31. At that time, the controller 32 reads out pixel data necessary for sequentially generating nine half-pel accuracy macroblocks in such a manner that the half-pel data at the above nine points become pixel data located at the upper left corners of the macroblocks each having a half-pel accuracy. The pixel data thus generated are supplied to the half-pel generating circuit 33. The half-pel generating circuit 33 generates half-pel data sequentially composing macroblocks each having a half-pel accuracy on the basis of pixel data supplied thereto from the search area memory 31.

The difference absolute value sum calculating circuit 28 is sequentially supplied with the macroblock data MB(F-1) of nine half-pel accuracy macroblocks from the half-pel generating circuit 26 and macroblock data MB(F) of present frame read out from the macroblock memory 27 under control of the controller 32. The difference absolute value sum calculating circuit 28 effects a difference absolute value sum calculation between the macroblock data MB(F-1) of half-pel accuracy macroblocks sequentially supplied thereto and the macroblock data MB(F) of present frame, and supplies nine resultant difference absolute value sum data DAA1 to DAA9 to the minimum value selecting circuit 29. The minimum value selecting circuit 29 selects smallest difference absolute value sum data DAA(1, 2, . . . or 9) from the nine difference absolute value sum data DAA1 to DAA9 supplied thereto from the difference absolute value sum calculating circuit 28, and supplies the difference absolute value sum data DAA(1, 2, . . . , or 9) to the comparing circuit 36. Also, the minimum value selecting circuit 29 obtains half-pel accuracy frame motion vector data mv(Fr) corresponding to the difference absolute value sum data DAA (1, 2, . . . or 9), and supplies the thus obtained half-pel accuracy frame motion vector data mv(Fr) to the vector selecting circuit 37.

On the other hand, the difference absolute value sum calculating circuit 34 is sequentially supplied with the macroblock data MB(F-1) of the nine half-pel accuracy macroblocks from the half-pel generating circuit 33 and the macroblock data MB(F) of present frame that has been read out from the macroblock memory 27 under control of the controller 32. The difference absolute value sum calculating circuit 34 effects a difference absolute value sum calculation between the macroblock data MB(F-1) of the half-pel accuracy macroblocks sequentially supplied thereto and the macroblock data MB(F) of present frame, and supplies resultant nine difference absolute value sum data daa1 to daa9 to the minimum value selecting circuit 35. The minimum value selecting circuit 35 selects the smallest difference absolute value sum data daa (1, 2, . . . or 9) from the nine difference absolute value sum data daa1 to daa9 supplied thereto from the difference absolute value sum calculating circuit 34, and supplies the thus selected difference absolute value sum data daa(1, 2, . . . or 9) to the comparing circuit 36. Also, the minimum value selecting circuit 35 obtains half-pel accuracy 2-field motion vector data mv(2Fi) corresponding to the difference absolute value sum data daa (1, 2, . . . or 9), and supplies the half-pel accuracy 2-field motion vector data mv(2Fi) to the vector selecting circuit 37.

The comparing circuit 36 compares the difference absolute value sum data DAA(1, 2, . . . or 9) supplied thereto from the minimum value selecting circuit 29 and the difference absolute value sum data daa(1, 2, . . . or 9) supplied thereto from the minimum value selecting circuit 35 as follows:

Specifically, if DAA(1, 2, . . . or 9)>daa(1, 2, . . . or 9), then the comparing circuit 36 generates a selection control signal SEL indicating that the 2-field motion vector data mv(2Fi) should be selected.

If DAA(1, 2, . . . or 9)<daa(1, 2, . . . or 9), then the comparing circuit 36 generates a selection control signal SEL indicating that the frame motion vector data mv(Fr) should be selected.

The vector selecting circuit 37 selects the frame motion vector data mv(Fr) supplied thereto from the minimum selecting circuit 29 or the 2-field motion vector data mv(2Fi) supplied thereto from the minimum value selecting circuit 35 on the basis of the contents shown by the above selection control signal. The frame motion vector data or 2-field motion vector data mv(Fr)/mv(2Fi) selected is supplied through the output terminal 38 to the motion compensation circuit 214.

FIGS. 17 through 22 are flowcharts to which reference will be made in explaining motion detecting operation according to this embodiment. In the description below, let it be assumed that a microcomputer comprising a CPU (central processing unit), a ROM (read-only memory) and a RAM (random access memory) is used and that this microcomputer has a function substantially equal to that of the circuit shown in FIG. 14 when program data stored in the ROM is loaded onto a main memory of the CPU. Also in this case, the circuit arrangement becomes substantially equal to the circuit arrangement shown in FIG. 14, and circuit names shown on FIG. 14 are therefore used as they are.

Operation in the main routine will be described with reference to FIGS. 17 and 18.

Figure 17:
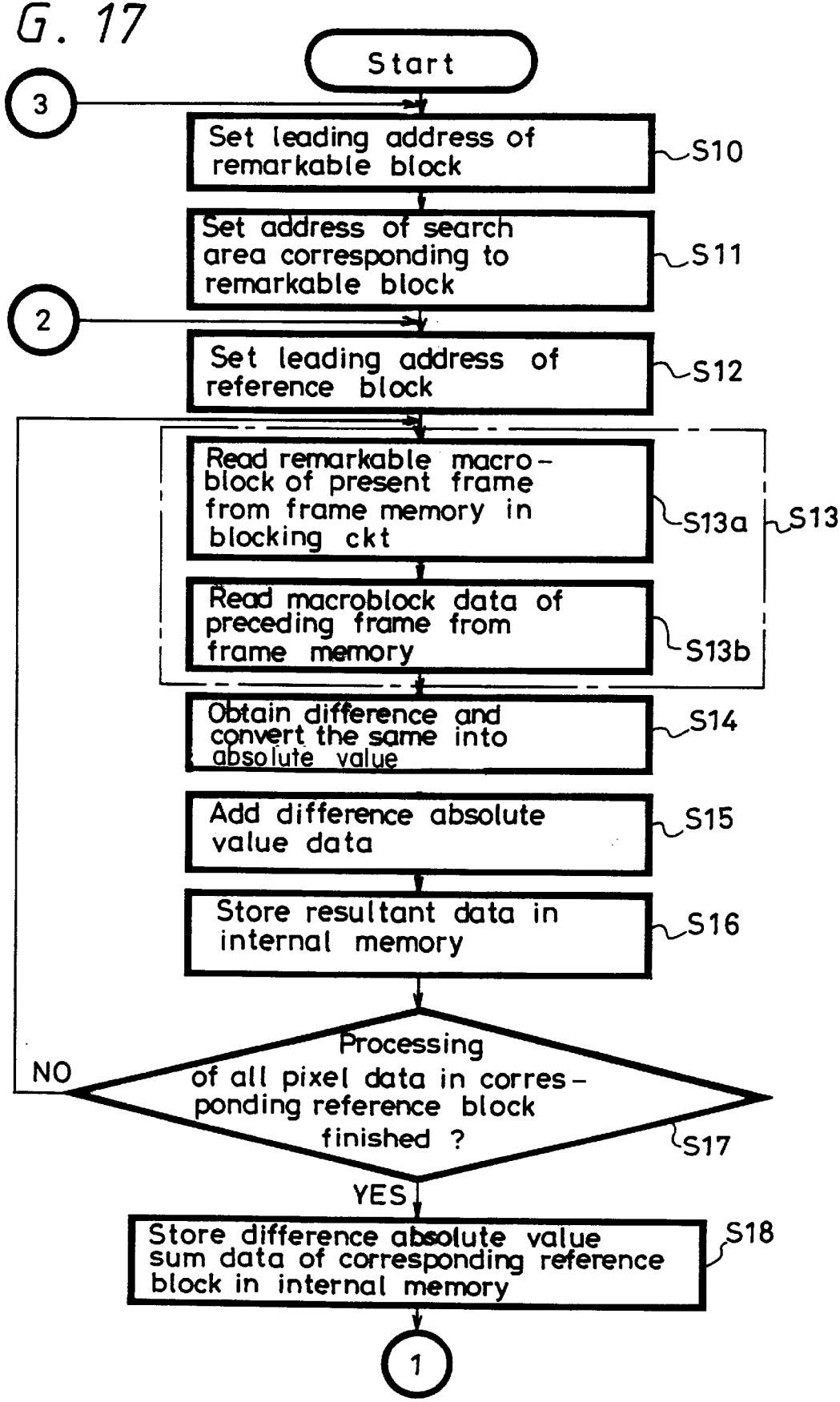
FIG. 17 is a flowchart showing a main routine, and to which reference will be made in explaining the frame type/2-field type motion detection operation according to the first embodiment.

Referring to FIG. 17, following the start of operation, at step S10, the controller 32 shown in FIG. 14 supplies the control signal to the memory controller 1c of the blocking circuit 1 shown in FIG. 12, and sets a starting address of remarkable block on the memory space of the frame memory 1a or 1b of the blocking circuit 1. Then, the processing proceeds to the next step S11.

In step S11, the controller 32 shown in FIG. 14 sets search area address on the memory space of the frame memory 213 by setting address data supplied to the frame memory 213 shown in FIG. 12. Then, the processing proceeds to the next step S12.

In step S12, the controller 32 shown in FIG. 14 sets leading address of reference block on the memory space of the frame memory 213 by setting address data supplied to the frame memory 213 shown in FIG. 12. Then, the processing proceeds to step S13.

In step S13, two steps S13a and S13b shown by a one-dot chain line in FIG. 17 are executed in parallel to each other. In one step S13a, the controller 32 shown in FIG. 14 supplies the read control signal to the memory controller 1c of the blocking circuit 1 shown in FIG. 12 so that the memory controller 1c reads out pixel data of the remarkable macroblock from the frame memory 213 shown in FIG. 12.

In step S13b, the controller 32 shown in FIG. 14 supplies the read control signal to the frame memory 213 shown in FIG. 12 so that the macroblock data MB(F-1) of preceding frame is read out from the frame memory 213. At the completion of the steps S13a and S13b, the processing proceeds to the next step S14.

In step S14, the difference absolute value sum calculating circuit 21 shown in FIG. 14 calculates a difference between the macroblock data MB(F) serving as remarkable macroblock supplied thereto through the input terminal 20 and the macroblock data MB(F-1) serving as reference macroblock supplied thereto through the input terminal 22, and converts the resultant difference into an absolute value. Then, the processing proceeds to the next step S15.

In step S15, the difference absolute value sum calculating circuit 21 shown in FIG. 14 adds difference absolute value data of pixel unit sequentially obtained. Then, the processing proceeds to step S16.

In step S16, the difference absolute value sum calculating circuit 21 shown in FIG. 14 stores difference absolute value sum data sequentially obtained in an internal memory (not shown). Then, the processing proceeds to the next decision step S17.

It is determined in decision step S17 whether or not the difference absolute value sum calculating circuit 21 shown in FIG. 14 finishes processing all pixel data of the reference macroblock. If a YES is outputted at decision step S17, then the processing proceeds to step S18. If a NO is outputted at decision step S17, then the processing returns to step S13.

In step S18, the difference absolute value sum calculating circuit 21 shown in FIG. 14 stores the difference absolute value sum data of the reference macroblock in the internal memory (not shown). Then, the processing proceeds to the next decision step S19 shown in FIG. 18.

Figure 18:
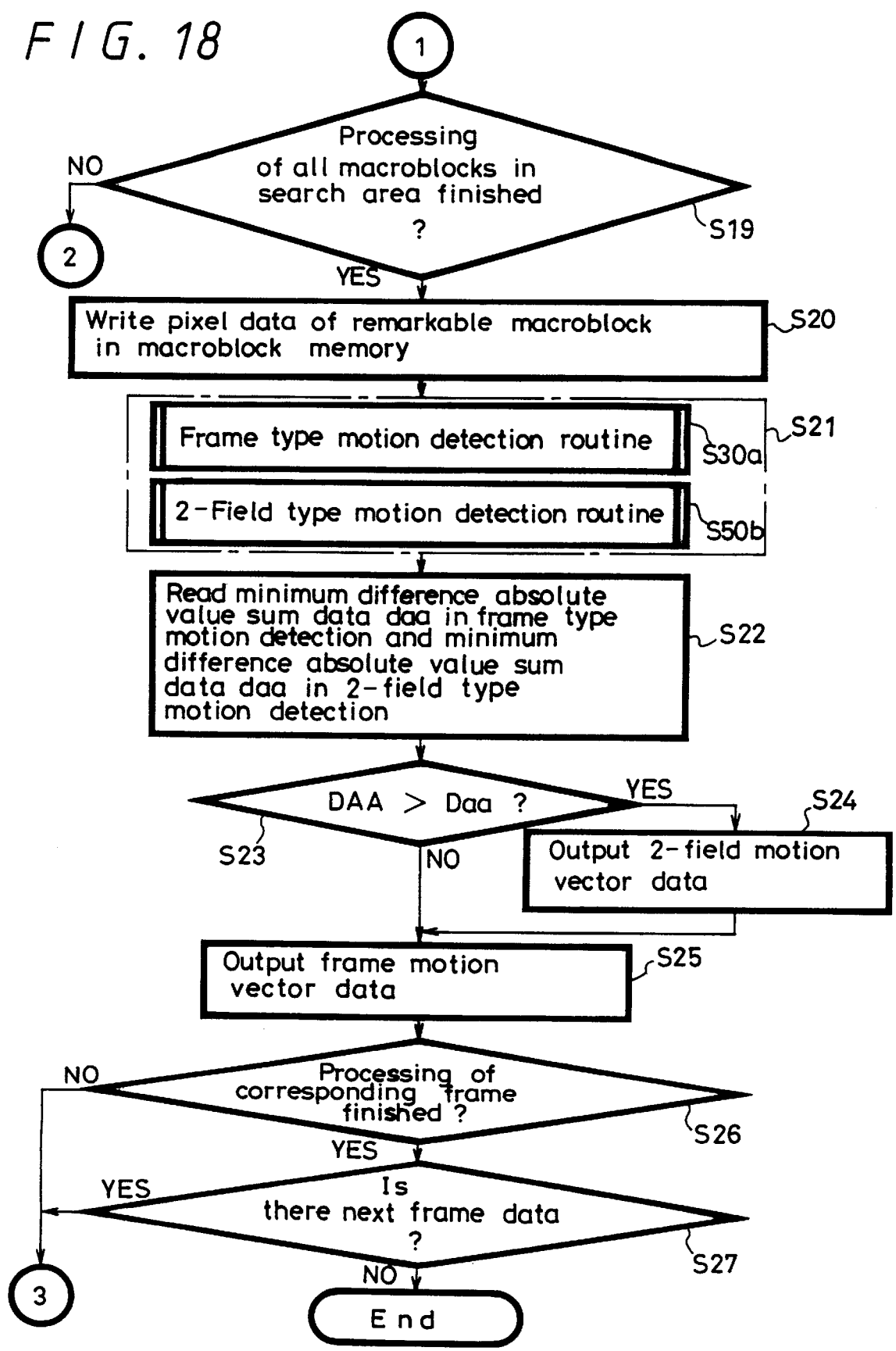
FIG. 18 is a flowchart showing a main routine, and to which reference will be made in explaining the frame type/2-field type motion detection operation according to the first embodiment.

It is determined in decision step S19 in the flowchart of FIG. 18 by the controller 32 shown in FIG. 14 whether or not the processing of all macroblocks located within the search area is finished. If a YES is outputted at decision step S19, then the processing proceeds to step S20. If on the other hand a NO is outputted at decision step S19, then the processing returns to the step S12 of the flowchart shown in FIG. 17.

In step S20, the controller 32 shown in FIG. 14 supplies the control signal to the memory controller 1c of the blocking circuit 1 shown in FIG. 12 so that the memory controller 1c reads out the macroblock data MB(F) serving as the remarkable block from the frame memory 1a or 1c. Further, the controller 32 supplies the write control signal to the macroblock memory 27 shown in FIG. 14 so that the macroblock data MB(F) supplied through the input terminal 20 is stored in the macroblock memory 27. Then, the processing proceeds to step S21.

In step S21, two steps S30a, S50b as subroutines shown by a one-dot chain line in FIG. 18 are executed in parallel to each other. In one frame type motion detection routine (step S30a), processings are executed by the frame type minimum value selecting circuit 23, the half-pel generating circuit 26, the difference absolute value sum calculating circuit 28 and the minimum value detecting circuit 29. In the other 2-field type motion detection routine (step S50b), processings are executed by the 2-field type minimum value selecting circuit 30, the half-pel generating circuit 33, the difference absolute value sum calculating circuit 34, and the minimum value selecting circuit 35. At the completion of two subroutines S30a and S50b, then the processing proceeds to the next step S22.

In step S22, the comparing circuit 36 reads out the minimum difference absolute value sum data DAA, obtained by the frame type motion detection, from the minimum value selecting circuit 29, and the minimum difference absolute value sum data daa, obtained by the 2-field type motion detection, from the minimum value selecting circuit 35. Then, the processing proceeds to the next decision step S23.

It is determined in decision step S23 by the comparing circuit 36 shown in FIG. 14 whether or not the minimum absolute value sum data DAA obtained by the frame type motion detection is larger than the minimum difference absolute value sum data daa obtained by the 2-field type motion detection. If a YES is outputted at decision step S23, then the processing proceeds to step S24. If on the other hand a NO is outputted at decision step S23, then the processing proceeds to step S25.

In step S24, under control of the comparing circuit 36 shown in FIG. 14, the vector selecting circuit 37 selects the 2-field motion vector data mv(2Fi) from the minimum value selecting circuit 35, and outputs the thus selected 2-field motion vector data mv(2Fi) as motion vector data for motion compensation in the motion compensating circuit 214 shown in FIG. 12. Then, the processing proceeds to step S25.

In step S25, under control of the comparing circuit 36 shown in FIG. 14, the vector selecting circuit 37 selects frame motion vector data mv(Fr) from the minimum value selecting circuit 29, and outputs the thus selected frame motion vector data mv(Fr) as motion vector data for motion compensation in the motion compensating circuit 214 shown in FIG. 12. Then, the processing proceeds to the next decision step S26.

It is determined in decision step S26 by the controller 32 shown in FIG. 14 whether or not the processing of the corresponding frame is ended. If a YES is outputted at decision step S26, then the processing proceeds to the next decision step S27. If on the other hand a NO is outputted at decision step S26, then the processing returns to step S10 of the flowchart shown in FIG. 17.

It is determined in decision step S27 by the controller 32 shown in FIG. 14 whether or not there is next frame data. If a YES is outputted at decision step S27, then the processing returns to step S10 of the flowchart shown in FIG. 17. If on the other hand a NO is outputted at decision step S27, then the processing is ended.

Decisions made by circuits other than the controller 32 may be made by the controller 32, and information indicative of judge result may be supplied from the controller 32 to the respective circuits, thereby controlling the respective circuits.

Operation in the frame type motion detection routine will be described with reference to FIGS. 19 and 20.

Figure 19:
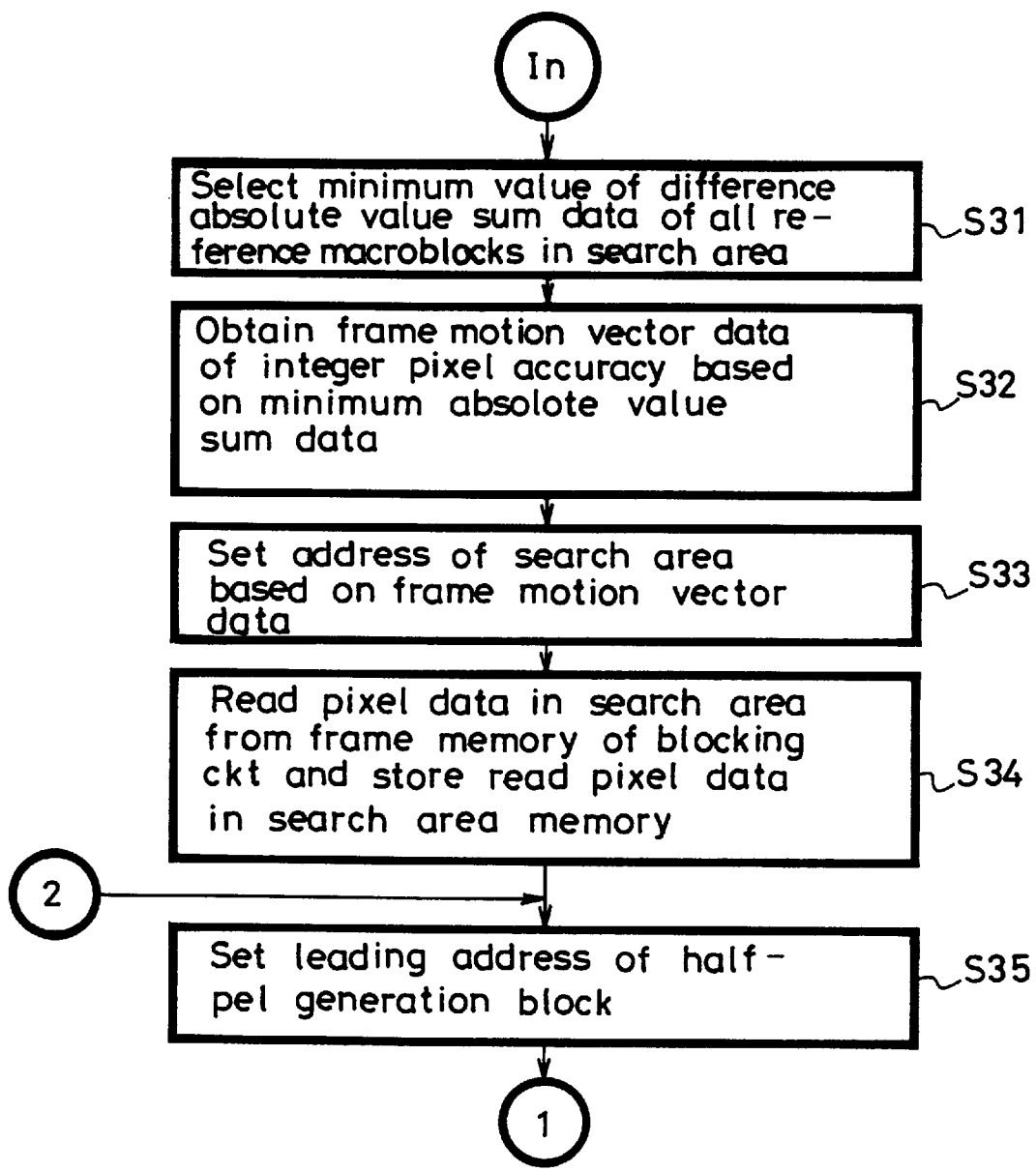
FIG. 19 is a flowchart showing a frame type motion detection routine, and to which reference will be made in explaining the frame type/2-field type motion detection operation according to the first embodiment.

As shown in FIG. 19, at step S31, the frame type minimum value selecting circuit 23 shown in FIG. 14 selects minimum difference absolute value sum data from difference absolute value sum data of all reference macroblocks located within the search area supplied thereto from the difference absolute value sum calculating circuit 21. Then, the processing proceeds to step S32.

In step S32, the frame type minimum value selecting circuit 23 shown in FIG. 14 obtains the frame motion vector data MV(Fr) on the basis of the difference absolute value sum data obtained at step S31. Then, the processing proceeds to step S33.

In step S33, the controller 32 sets setting search address on the memory space of the frame memory 213 shown in FIG. 12 on the basis of the frame motion vector data supplied thereto from the frame type minimum value selecting circuit 23. Then, the processing proceeds to step S34.

In step S34, the controller 32 shown in FIG. 14 supplies the read control signal to the frame memory 213 shown in FIG. 13 such that pixel data in the search area set at step S33 is read out from the frame memory 213. Subsequently, the controller 32 supplies the write control signal to the search area memory 24 such that pixel data read out to the search area from the frame memory 213 is stored in the search area memory 24. Then, the processing proceeds to step S35.

In step S35, the controller 32 shown in FIG. 14 sets leading address of half-pel generating block on the memory space serving as search area of the search area memory 24 shown in FIG. 14. Then, the processing proceeds to step S36 of the flowchart shown in FIG. 20.

Figure 20:
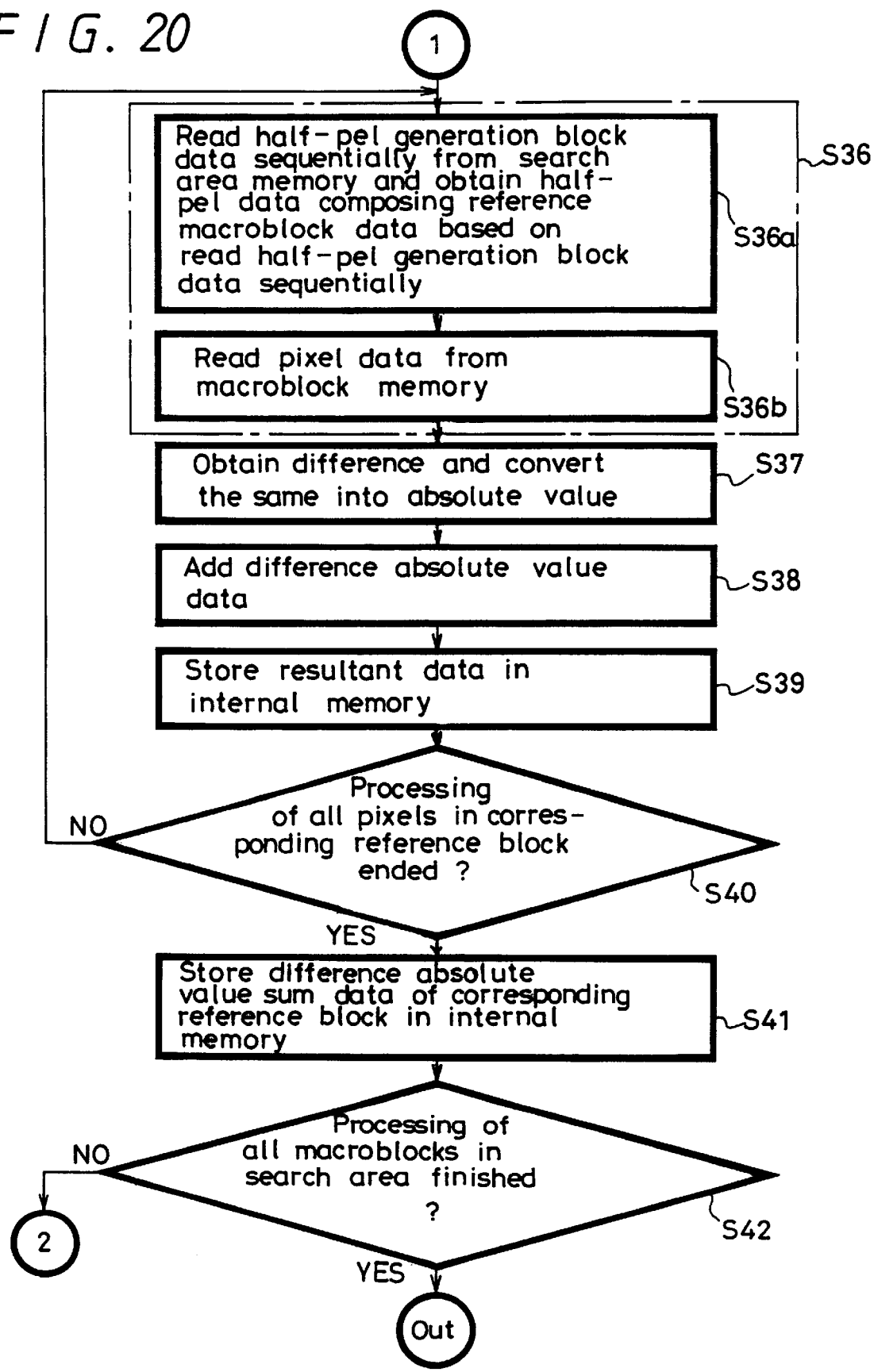
FIG. 20 is a flowchart showing a frame type motion detection routine, and to which reference will be made in explaining the frame type/2-field type motion detection operation according to the first embodiment.

As shown in FIG. 20, at step S36, two steps S36a, S36b serving as subroutines shown by a one-dot chain line are executed in parallel to each other. In one step S36a, the controller 32 shown in FIG. 14 supplies the read control signal to the search area memory 24 so that block data for generating half-pels is read out from the search area memory 24. Then, the half-pel generating circuit 26 sequentially generates half-pel data composing reference macroblocks on the basis of half-pel generating block data supplied thereto from the search area memory 24.

In the other step S36b, the controller 32 shown in FIG. 14 supplies the read control signal to the macroblock memory 27 such that the macroblock data MB(F) located at the remarkable block from the macroblock memory 27. At the completion of these two steps S36a and S36b, the processing proceeds to step S37.

In step S37, the difference absolute value sum calculating circuit 28 shown in FIG. 14 calculates a difference between the macroblock data MB(F-1) supplied thereto from the half-pel generating circuit 26 and the macroblock data MB(F) supplied thereto from the macroblock memory 27, and converts the resultant difference into an absolute value. Then, the processing proceeds to step S38.

In step S38, the difference absolute value sum calculating circuit 28 shown in FIG. 14 adds the difference absolute value data obtained at step S37. Then, the processing proceeds to step S39.

In step S39, the difference absolute value sum calculating circuit 28 shown in FIG. 14 stores the difference absolute value sum data obtained at step S38 in the internal memory (not shown). Then, the processing proceeds to the next decision step S40.

It is determined in decision step S40 whether or not the difference absolute value sum calculating circuit 28 shown in FIG. 14 finishes processing all pixel data located within the corresponding macroblock. If a YES is outputted at decision step S40, then the processing proceeds to step S41. If on the other hand a NO is outputted at decision step S40, then the processing returns to step S36.

In step S41, the difference absolute value sum calculating circuit 28 shown in FIG. 14 stores the difference absolute value sum data of the corresponding block in the internal memory. Then, the processing proceeds to the next decision step S42.

It is determined in decision step S42 by the controller 32 shown in FIG. 14 whether or not the processing all macroblocks within the search area is finished. If a YES is outputted at decision step S42, then the processing proceeds from the frame type motion detection routine to step S22 of the flowchart shown in FIG. 18. If a NO is outputted at a decision step S42, then the processing returns to step S35 of the flowchart shown in FIG. 19.

Operation in the 2-field type motion detection routine will be described with reference to FIGS. 21 and 22.

Figure 21:
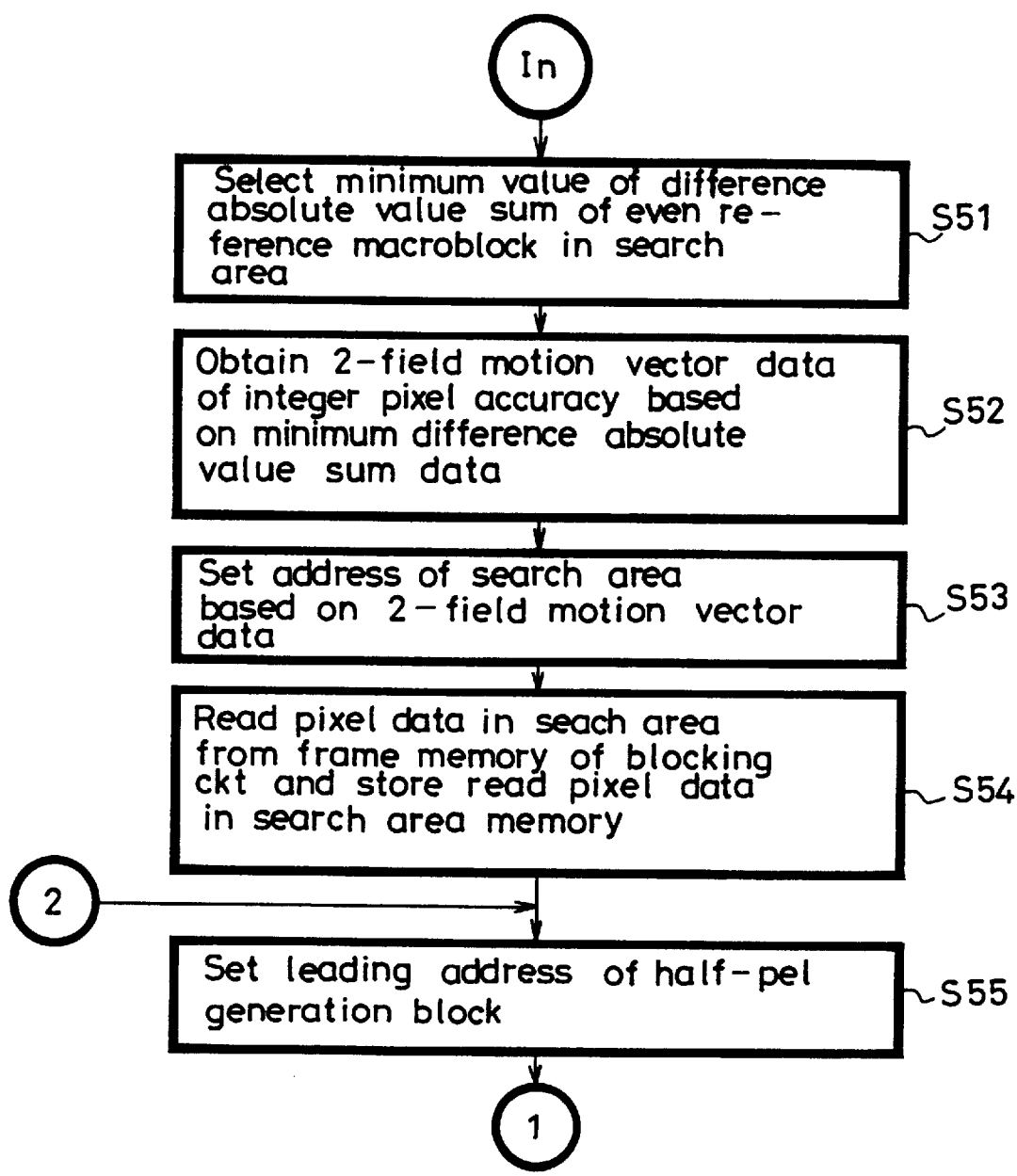
FIG. 21 is a flowchart showing a 2-field type motion detection routine, and to which reference will be made in explaining the frame type/2-field type motion detection operation according to the first embodiment.

As shown in FIG. 21, at step S51, the 2-field type minimum value selecting circuit 30 shown in FIG. 14 selects the minimum difference value sum data from the difference absolute value sum data of even-numbered macroblocks within the search area supplied thereto from the difference absolute value sum calculating circuit 21. Then, the processing proceeds to step S52.

In step S52, the 2-field type minimum value selecting circuit 30 shown in FIG. 14 obtains 2-field motion vector data MV(2Fi) on the basis of the difference absolute value sum data obtained at step S51. Then, the processing proceeds to step S53.

In step S53, the controller 32 shown in FIG. 14 sets setting search area address on the memory space of the frame memory 213 shown in FIG. 12 on the basis of the difference absolute value sum data supplied thereto from the frame type minimum value selecting circuit 30. Then, the processing proceeds to step S54.

In step S54, the controller 32 shown in FIG. 14 supplies the read control signal to the frame memory 213 shown in FIG. 12 so that pixel data within the search area set at step S53 are read out from the frame memory 213. Subsequently, the controller 32 supplies the write control signal to the search area memory 31 so that the pixel data read out to the search area from the frame memory 213 are stored in the search area memory 31. Then, the processing proceeds to step S55.

In step S55, the controller 32 shown in FIG. 14 sets leading address of half-pel generating block on the memory space serving as the search area of the search area memory 31 shown in FIG. 12. Then, the processing proceeds to step S56 of the flowchart shown in FIG. 22.

Figure 22:
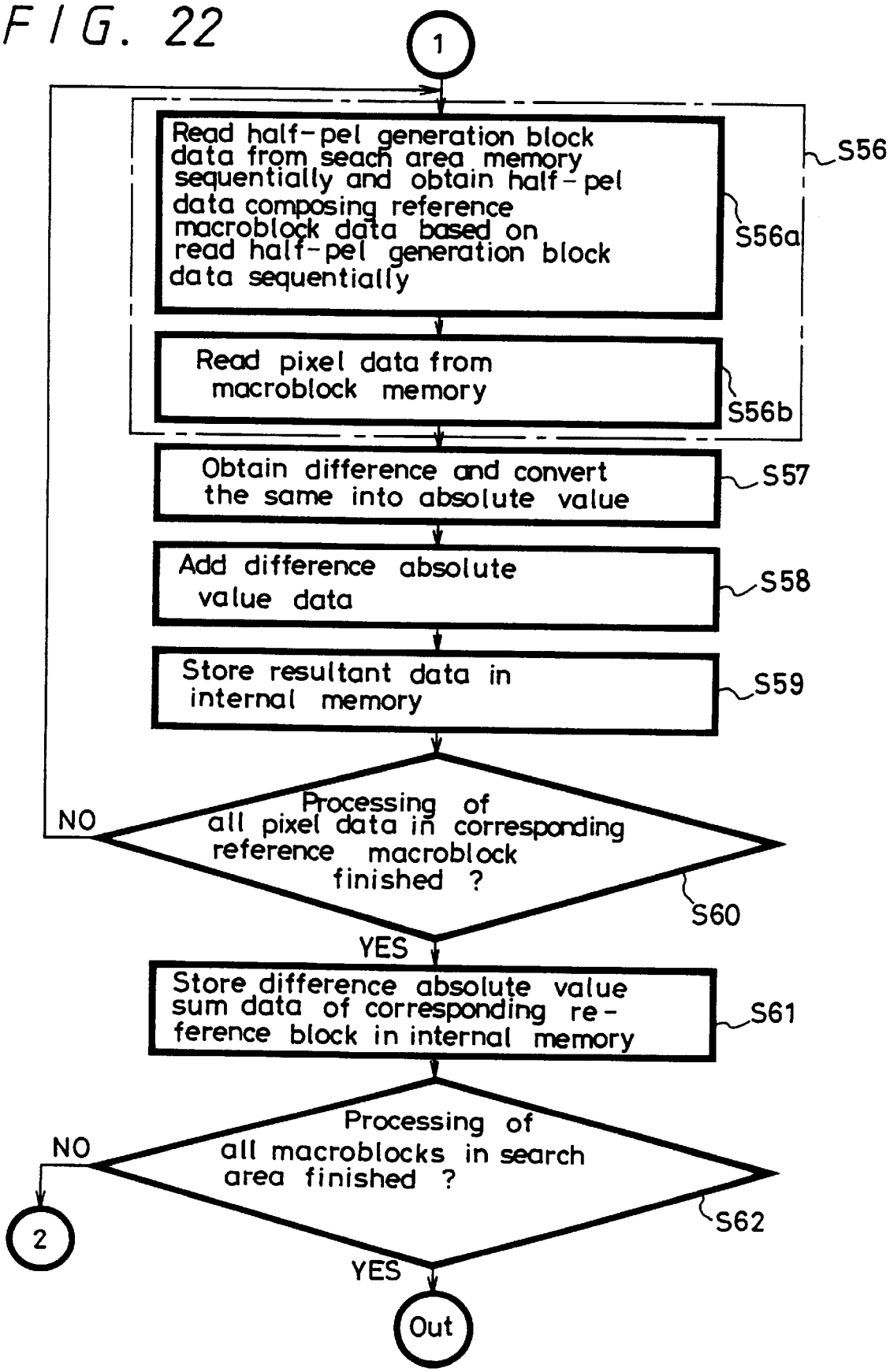
FIG. 22 is a flowchart showing a 2-field type motion detection routine, and to which reference will be made in explaining the frame type/2-field type motion detection operation according to the first embodiment.

In step S56, two steps S56a, S56b serving as subroutines shown by a one-dot chain line in FIG. 22 are executed in parallel to each other. In one step S56a, the controller 32 shown in FIG. 14 supplies the read control signal to the search area memory 31 so that half-pel generating block data is read out from the search area memory 31. Then, the half-pel generating circuit 33 sequentially generates half-pel data composing reference macroblock on the basis of half-pel generating block data supplied thereto from the search area memory 31.

In the other step S56b, the controller 32 shown in FIG. 14 supplies the read control signal to the macroblock memory 27 so that the macroblock data MB(F) of remarkable macroblock from the macroblock memory 27. At the completion of these steps S56a, S56b, the processing proceeds to step S57.

In step S57, the difference absolute value sum calculating circuit 34 shown in FIG. 14 calculates a difference between the macroblock data MB(F-1) supplied thereto from the half-pel generating circuit 33 and the macroblock data MB(F) supplied thereto from the macroblock memory 27, and converts the resultant difference data into an absolute value. Then, the processing proceeds to step S58.

In step S58, the difference absolute value sum calculating circuit 34 shown in FIG. 14 adds difference absolute value data obtained at step S57. Then, the processing proceeds to step S59.

In step S59, the difference absolute value sum calculating circuit 34 shown in FIG. 14 stores the difference absolute value sum data obtained at step S58 in the internal memory (not shown). Then, the processing proceeds to the next decision step S60.

It is determined in decision step S61 whether or not the difference absolute value sum calculating circuit 34 finishes processing all pixel data located within the corresponding macroblock. If a YES is outputted at decision step S60, then the processing proceeds to step S61. If on the other hand a NO is outputted at decision step S60, then the processing returns to step S56.

In step S61, the difference absolute value sum calculating circuit 34 shown in FIG. 14 stores difference absolute value sum data of the corresponding reference block in the internal memory. Then, the processing proceeds to the next decision step S62.

It is determined at decision step S62 by the controller 32 shown in FIG. 14 whether or not the processing of all macroblocks located within the search area is finished. If a YES is outputted at decision step S62, then the processing proceeds from this 2-field type motion detection routine to step S22 in the flowchart of FIG. 18. If a NO is outputted at decision step S62, then the processing returns to step S55 in the flowchart of FIG. 21.

As described above, according to this embodiment, the integer pixel accuracy frame motion vector data MV(Fr) is obtained from all difference absolute value sum data obtained in the difference absolute value sum calculation in the frame type motion detection on the basis of the minimum difference absolute value sum data, and the half-pel accuracy frame motion vector data mv(Fr) is obtained by effecting the half-pel accuracy frame type motion detection based on the frame motion vector data MV(Fr). Then, the integer pixel accuracy 2-field motion vector data MV(2Fi) is obtained from the all difference absolute value sum data obtained by the difference absolute value sum calculation in the integer pixel accuracy frame type motion detection on the basis of the minimum difference absolute value sum data of difference absolute value sum data corresponding to all even-numbered macroblocks in the longitudinal direction of the search area, and the half-pel accuracy 2-field motion vector data mv(2Fi) is obtained by effecting the half-pel accuracy 2-field type motion detection on the basis of the resultant 2-field motion vector data MV(2Fi). Then, one of the 2-field motion vector data mv(2Fi) and the frame motion vector data (Fr) of smaller minimum absolute value sum data is selected, and the motion compensation is carried out by use of the selected vector data.

Therefore, in the integer pixel accuracy motion detection, the two field type motion detecting circuit and frame type motion detecting circuit need not be provided, and one motion detecting circuit is sufficient. Thus, the motion detecting circuits whose circuit scale becomes largest in the encoder can be lessened to the minimum, and the circuit scale can be reduced to the minimum. Moreover, if the field type motion detection and the frame type motion detection are carried out adaptively, then accurate and satisfactory encoding can be carried out.

Figure 23:
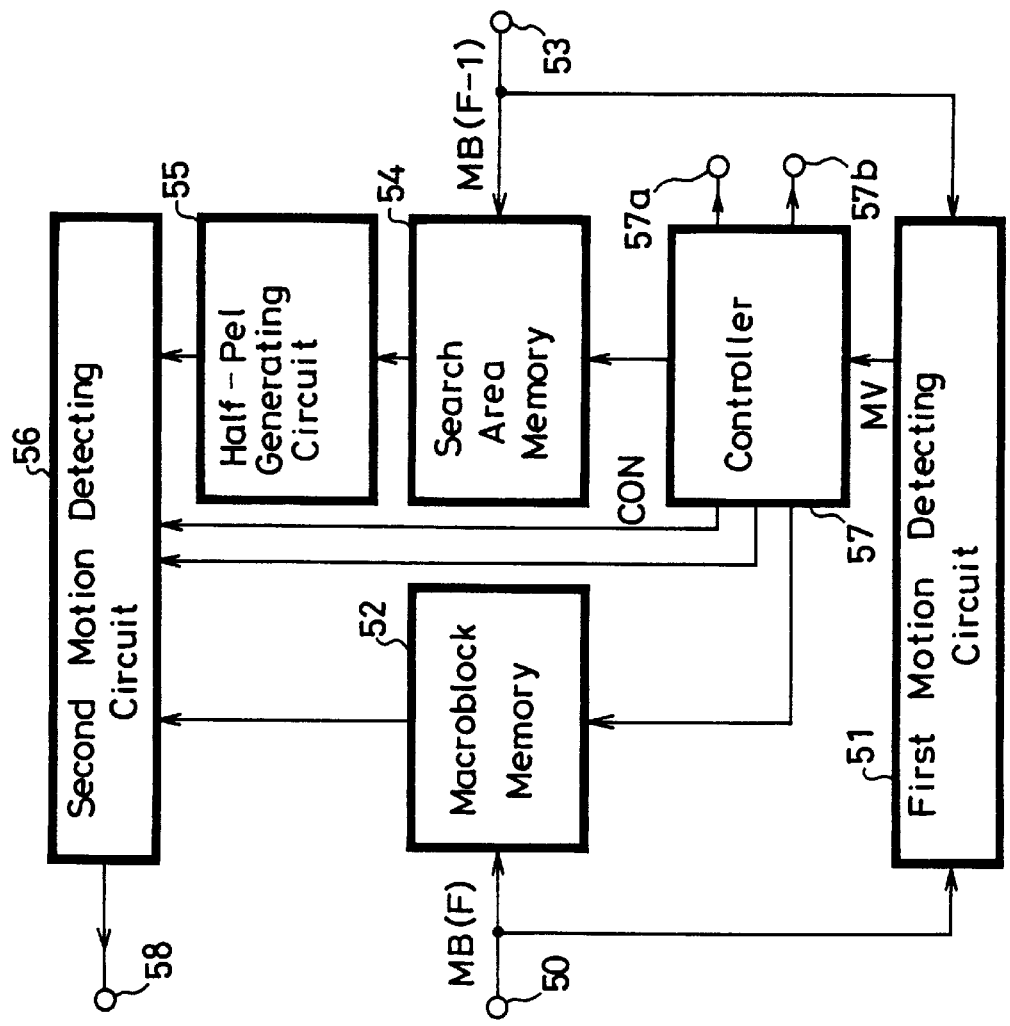
FIG. 23 is a block diagram showing a motion detecting circuit in the high-efficiency coding method and the high-efficiency coding apparatus according to a second embodiment of the present invention.

FIG. 23 is a block diagram showing a motion detecting circuit for an encoding circuit according to a second embodiment of the present invention. The motion detecting circuit according to this embodiment can be applied to the frame type/2-field type motion detecting circuit 2, and intends to simplify motion detecting operation by reading only pixel data located within the macroblock unlike the prior art in which not only pixel data located within the macroblock but also pixel data around the macroblock have to be read out in order to effect a half-pel accuracy motion detection. For the sake of simplicity, the motion detecting circuit according to the present invention will be described simply as a motion detecting circuit not as the frame type/2-field type motion detecting circuit.

As shown in FIG. 23, the motion detecting circuit comprises a first motion detecting circuit 51 for effecting a motion detection with an integer pixel unit on the basis of the macroblock data MB(F) of the present frame supplied thereto from the blocking circuit 1 shown in FIG. 12 through an input terminal 50 and the macroblock data MB(F-1) of the preceding frame supplied thereto from the frame memory 213 shown in FIG. 12 through an input terminal 53, a macroblock memory 52 for storing the macroblock data MB(F) of the present frame, supplied thereto from the blocking circuit 1 shown in FIG. 12 through the input terminal 50, as remarkable block data, a search area memory 54 for storing pixel data supplied to the search area of preceding frame from the frame memory 213 shown in FIG. 12 through the input terminal 53, a half-pel generating circuit 55 for generating half-pel data on the basis of the macroblock data MB(F-1) read out from the search area memory 54, a second motion detecting circuit 56 for calculating difference absolute value sum between a part of the macroblock data MB(F) from the macroblock memory 52 and a part of the macroblock data MB(F-1) composed of half-pel data generated by the pixel data read out from the search area memory 54 and obtaining half-pel accuracy motion vector data on the basis of the minimum difference absolute value sum data of resultant difference absolute value sum data, and a controller 57 for controlling the macroblock memory 52, the search area memory 54 and the blocking circuit 1 and the frame memory 213 shown in FIG. 12.

The reason that data to be calculated in difference absolute value sum by the second motion detecting circuit 56 is used as a part of the macroblock data MB(F) and the macroblock data MB(F-1) composed of half-pel data will be described below. The word "part" means that the above macroblock is smaller than the original macroblock. When the size of the original macroblock is 16 pixels×16 pixels, for example, a difference absolute value sum calculation is carried out with respect to pixel data located in a range of 14 pixels×14 pixels on the memory space wherein the macroblock of 16 pixels× 16 pixels is stored.

The half-pel generating circuit 55 generates macroblock data MB(F-1) on the basis of the macroblock data MB(F-1) read out from the search area memory 54.

The controller 57 supplies a control signal to the memory controller 1c of the blocking circuit 1 shown in FIG. 12 through the output terminal 57a such that the macroblock data MB(F) of present frame is outputted from the frame memory 1a or 1b as remarkable macroblock data. The controller 57 supplies a read control signal to the frame memory 213 shown in FIG. 12 through the output terminal 57b such that macroblock data MB(F-1) of preceding frame within the search area is read out from the frame memory 213 as reference macroblock data. The controller 57 writes the macroblock data MB(F) of present frame supplied thereto through the input terminal 50 shown in FIG. 23 in the macroblock memory 52, and reads out the macroblock data MB(F) of present frame from this macroblock memory 52. The controller 57 writes macroblock data MB(F-1) within the search area supplied thereto through the input terminal 53 in the search area memory 54, and reads out the macroblock data MB(F-1) of preceding frame from the search area memory 54. Further, the controller 57 controls the second motion detecting circuit 56 such that the second motion detecting circuit 56 effects a difference absolute value sum calculation on pixel data of 14 pixels×14 pixels on the basis of motion vector data MV supplied thereto from the first motion detecting circuit 51.

A manner in which the second motion detecting circuit 55 effects a half-pel accuracy motion detecting processing on pixel data in the range of 14 pixels×14 pixels of the macroblock of 16 pixels×16 pixels will be described below.

The macroblock data MB(F) of 16 pixels×16 pixels of present frame supplied through the input terminal 50 is supplied to the first motion detecting circuit 51, and also supplied to the macroblock memory 52, thereby stored in the macroblock memory 52. Also, the macroblock data MB(F-1) of preceding frame supplied to the search area through the input terminal 53 is supplied to the first motion detecting circuit 51, and also supplied to the search area memory 54, thereby stored in the search area memory 54.

The first motion detecting circuit 51 calculate a difference absolute value sum between the macroblock data MB(F) of present frame of 16 pixels×16 pixels and the macroblock data MB(F-1) of preceding frame of 16 pixels×16 pixels sequentially supplied thereto, and obtains motion vector data MV from the difference absolute value sum data of every macroblock on the basis of the minimum difference absolute value sum data.

The controller 57 sequentially supplies a read address signal for reading pixel data of 16 pixels×16 pixels to the search area memory 54 in order to generate pixel data at the positions within the search area indicated by the motion vector data MV from the first motion detecting circuit 51 and nine macroblock data composed of half-pel data wherein eight half-pel data around the above pixel data are located at upper left corners of the macroblocks each composed of 16 pixels×16 pixels.

Thus, pixel data of 16 pixels×16 pixels are sequentially read out nine times. The pixel data of 16 pixels×16 pixels are supplied to the half-pel generating circuit 55. Then, such pixel data are converted by the half-pel generating circuit 55 into the macroblock data MB(F-1) composed of half-pel data, and supplied to the second motion detecting circuit 56.

On the other hand, under control of the controller 57, the macroblock data MB(F) of present frame is read out from the macroblock memory 52, and supplied to the second motion detecting circuit 56.

In order to generate half-pel data of macroblock of 16 pixels×16 pixels, there are required integer pixel data of at least 18 pixels×18 pixels (larger macroblock). However, it should be noted that, according to this embodiment, only data of integer pixel data of 16 pixels×16 pixels are required so that, of data of 16 pixels×16 pixels generated by the half-pel generating circuit 55, true half-pel data become data of 14 pixels×14 pixels.

The second motion detecting circuit 56 effects a difference absolute value sum calculation between the macroblock data MB(F) of 14 pixels×14 pixels of the macroblock data of present frame supplied thereto from the macroblock memory 52 and the macroblock data MB(F-1) of 14 pixels× 14 pixels of the macroblock data MB(F-1) of 16 pixels×16 pixels sequentially supplied thereto from the half-pel generating circuit 55 on the basis of an evaluation function control signal supplied thereto from the controller 57. Then, the second motion detecting circuit 56 obtains the half-pel accuracy motion vector data mv from the nine difference absolute value sum data on the basis of the minimum difference absolute value sum data. This half-pel accuracy motion vector data mv is supplied through the output terminal 58 to the motion compensation circuit 2 shown in FIG. 12.

Figure 24:
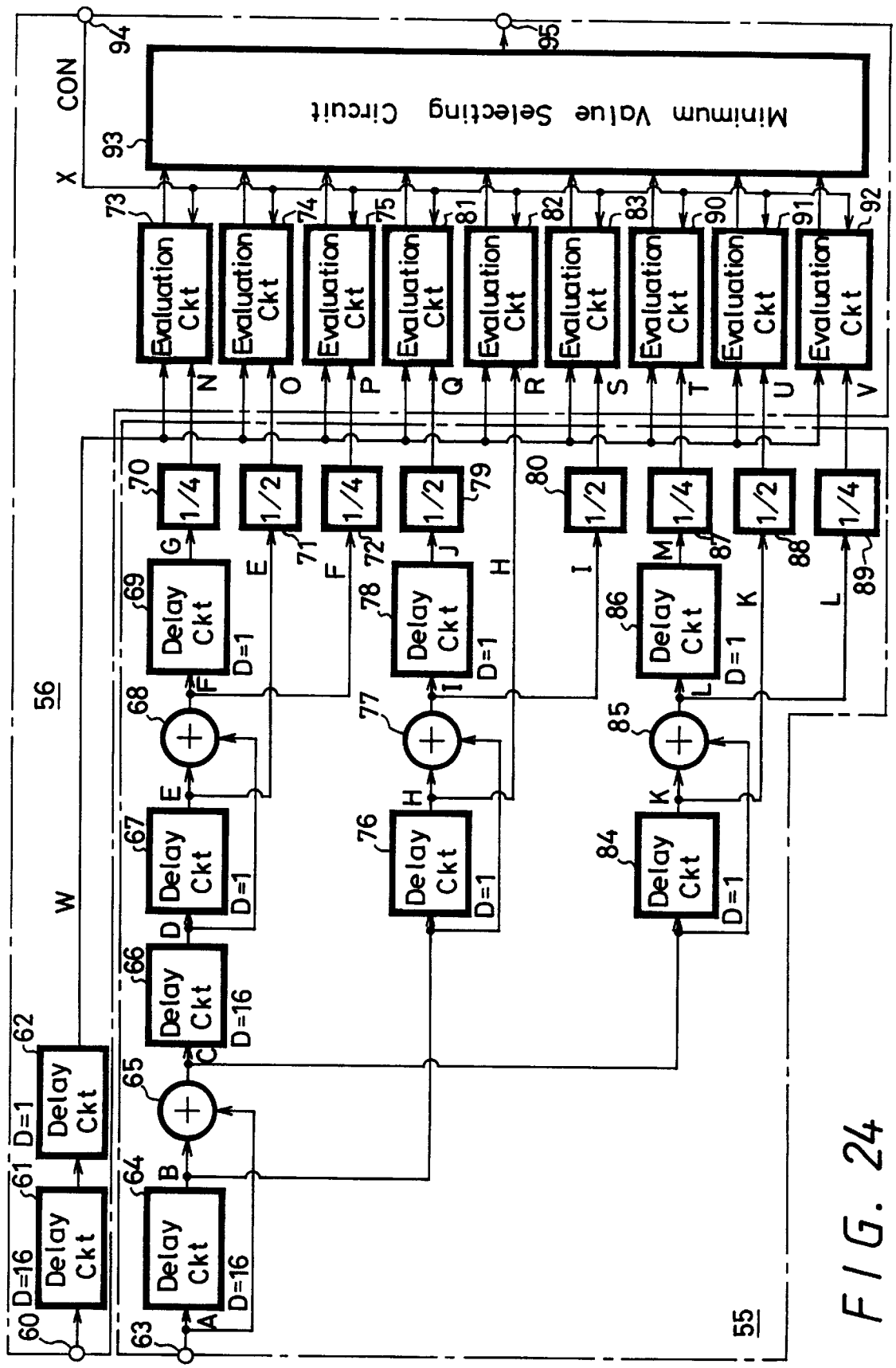
FIG. 24 is a block diagram showing a second motion detecting circuit 56 and a half-pel generating circuit 55 shown in FIG. 23 more specifically.

FIG. 24 is a block diagram showing specifically the half-pel generating circuit 55 and the second motion detecting circuit 56 of the motion detecting circuit shown in FIG. 23.

As shown in FIG. 24, the half-pel generating circuit 55 shown in FIG. 23 comprises delay circuits 64, 66, 67, 69, 76, 78, 84 and 86, adding circuits 65, 68, 77 and 85, and multiplying circuits 70, 71, 72, 79, 80, 87, 88 and 89. In the half-pel generating circuit 55 shown in FIG. 24, an input terminal 63 is connected through the delay circuit 64 to an input terminal of the adding circuit 65, and one output terminal of the adding circuit 65 is connected through the delay circuits 66 and 67 to one input terminal of the adding circuit 68. An output terminal of the adding circuit 68 is connected through the delay circuit 69 to an input terminal of the multiplying circuit 70, and an output terminal of the multiplying circuit 70 is connected to the other input terminal of an evaluation circuit 73. The input terminal 63 is connected to the other input terminal of the adding circuit 65, and an output terminal of the delay circuit 66 is connected to the other input terminal of the adding circuit 68. The output terminal of the multiplying circuit 71 is connected to the other input terminal of an evaluation circuit 74, and the output terminal of the adding circuit 68 is connected to an input terminal of the multiplying circuit 72. An output terminal of the multiplying circuit 72 is connected to the other input terminal of an evaluation circuit 75, and the output terminal of the delay circuit 64 is connected through the delay circuit 76 to one input terminal of an adding circuit 77. An output terminal of the adding circuit 77 is connected through the delay circuit 78 to one input terminal of the multiplying circuit 79. The output terminal of the multiplying circuit 79 is connected to the other input terminal of an evaluation circuit 81. The output terminal of the delay circuit 76 is connected to the other input terminal of an evaluation circuit 82, and the output terminal of the adding circuit 77 is connected to the input terminal of the multiplying circuit 80. The output terminal of the multiplying circuit 80 is connected to the other input terminal of an evaluation circuit 83, and the output terminal of the delay circuit 64 is connected to the other input terminal of the adding circuit 77. The output terminal of the adding circuit 65 is connected through the delay circuit 84 to one input terminal of the adding circuit 885, and the output terminal of the adding circuit 85 is connected through the delay circuit 86 to the input terminal of the multiplying circuit 87. The output terminal of the multiplying circuit 87 is connected to the other input terminal of an evaluation circuit 90, and the output terminal of the delay circuit 84 is connected to the input terminal of the multiplying circuit 88. The output terminal of the multiplying circuit 88 is connected to the other input terminal of an evaluation circuit 91, and the output terminal of the adding circuit 85 is connected to the input terminal of the multiplying circuit 89. The output terminal of the multiplying circuit 89 is connected to the other input terminal of the evaluation circuit 92, and the output terminal of the adding circuit 65 is connected to the other input terminal of the adding circuit 85.

Pixel data of 16 pixels×16 pixels for generating macroblock data MB(F-1) composed of half-pel data supplied from the search area memory 54 shown in FIG. 17 are supplied to the input terminal 63.

The second motion detecting circuit 56 shown in FIG. 23 comprises the delay circuits 61, 62, the evaluation circuits 73, 74, 75, 81, 82, 83, 90, 91, 92, and a minimum value selecting circuit 93. In the second motion detecting circuit 56 shown in FIG. 24, the input terminal 60 is connected through the delay circuits 61 and 62 to one input terminals of the evaluation circuits 73, 74, 75, 81, 82, 83, 90, 91, and 92. An input terminal 94 is connected to control input terminals of these evaluation circuits 73, 74, 75, 81, 82, 83, 90, 91 and 92. Output terminals of these evaluation circuits 73, 74, 75, 81, 82, 83, 90, 91 and 92 are connected to input terminals of the minimum value selecting circuit 93, and the output terminal of the minimum value selecting circuit 93 is connected to an output terminal 95.

The macroblock data MB(F) of present frame from the macroblock memory 52 shown in FIG. 23 is supplied to the input terminal 60, and the evaluation function control signal CON from the controller 57 shown in FIG. 23 is supplied to the input terminal 94. The above output terminal 95 corresponds to the output terminal 58 of the second motion detecting circuit 56 shown in FIG. 23.

The multiplying circuits 70, 71, 87 and 89 generate half-pel data by multiplying inputted interpolation pixel data with coefficients "¼", and the multiplying circuits 71, 72, 79, 80 and 88 generate half-pel data by multiplying inputted interpolation data with coefficients "½". The evaluation circuits 73, 74, 75, 81, 82, 83, 90, 91 and 92 effect difference absolute value sum calculation of pixel data of 14 pixels×14 pixels of the macroblock data MB(F) of present frame inputted thereto through the input terminal 60 and pixel data of 14 pixels×14 pixels of macroblock data of 16 pixels×16 pixels composed of half-pel data on the basis of the evaluation function control signal CON supplied thereto through the input terminal 94.

The minimum value selecting circuit 93 detects the minimum difference absolute value sum data from the difference absolute value sum data supplied thereto from the evaluation circuits 73, 74, 75, 81, 82, 83, 90, 91 and 92, and obtains half-pel accuracy motion vector data corresponding to the difference absolute value sum data.

FIG. 25 is a schematic diagram used to explain a manner in which the half-pel generating circuit 55 shown in FIG. 24 generates half-pels and the second motion detecting circuit 56 shown in FIG. 24 detects a motion.

In FIG. 25, "open circle" represents integer pixel data (pixel data of odd-numbered or even field), and large "open triangle" represents half-pel data generated by interpolation. Small "open triangles" with P1 to P9 affixed thereto represent half-pel data P5 located at the same position as that of integer pixel data shown by each integer pixel accuracy motion vector data, half-pel data P1 to P4 and P6 to P9 generated around the half-pel data P5, and half-pel data P1 to P9 located at the positions of upper left corners of nine macroblocks composed of half-pel data. The present invention will be described below with reference to the half-pel data P5 and the half-pel data P3.

The macroblock data MB(P5) composed of half-pel data wherein the half-pel data P5 is data located at the upper left corner is obtained by processing integer pixel data of half-pel generating block data of corresponding 16 pixels×16 pixels, and the half-pel data P3 is data located at the upper left corner. Similarly, the macroblock data MB(P3) composed of half-pel data is obtained by processing each integer pixel data of half-pel generating block data of corresponding 16 pixels×16 pixels. Specifically, macroblock data MB(P1) to MB(P9) composed of half-pel data wherein the half-pel data P1 to P9 are data located at the upper left corners are obtained by processing integer pixel data of corresponding 16 pixels×16 pixels. In this case, true half-pel data become 14 pixels×14 pixels in any of the macroblock data MB(P1) to MB(P9).

Then, in the second motion detecting processing, of the macroblock data MB(P5) and MB(P3) composed of half-pel data of 16 pixels×16 pixels, a difference absolute value sum of the macroblock data mb(P5) and mb(P3) composed of half-pel data of 14 pixels×14 pixels is calculated. Though not shown, this is also true for other macroblock data MB(P1), MB(P2), MB(P4), MB(P6) to MB(P9).

As already described above, half-pel block data of 16 pixels×16 pixels composed of true half-pel data have to be generated in order to effect a difference absolute value sum calculation of half-pel block data of 16 pixels×16 pixels. Also, integer pixel data of 18 pixels×18 pixels have to be read out in order to generate the half-pel block data of 16 pixels×16 pixels.

However, as already described above, when the integer pixel data of 18 pixels×18 pixels are read out in order to effect a difference absolute value sum calculation of the true half-pel data of 16 pixels×16 pixels at every macroblock, integer pixel data of 18 pixels×18 pixels have to be read out during a time period in which the integer pixel data of 16 pixels×16 pixels have to be read out, thereby causing a clock frequency or a timing of peripheral circuit to be varied.

In this embodiment, the macroblock data MB composed of half-pel data of 16 pixels×16 pixels is generated by reading out the half-pel generating block data of 16 pixels×16 pixels. In this case, since the integer pixel data of 18 pixels×18 pixels is not read out, data of one pixel outside of the macroblock data MB composed of 16 pixels×16 pixels is not accurate half-pel data.

Therefore, a difference absolute value sum calculation is effected only on the macroblock data mb composed of half-pel data of 14 pixels×14 pixels of the macroblock data MB composed of the thus generated half-pel data of 16 pixels×16 pixels. Specifically, a difference absolute value sum calculation is carried out by use of pixel data of macroblock smaller than the macroblock by n (n=1, 2, 3, . . . ).

FIGS. 26A through 26M and FIGS. 27N through 27X are timing charts used to explain a detection operation of the motion detecting circuit shown in FIG. 24. In FIGS. 26A through 26M and FIGS. 27N through 27X, pixel data (shown by "Da" with numerals affixed thereto) of one block composed of 16 pixels×16 pixels in the preceding frame to be processed are serial data Da1 to Da16 of 16 units wherein serial data of 1 pixel×16 pixels or 16 pixels×1 pixel are taken as the unit. Only serial data Da1 to Da6 are shown in the figures for the sake of brevity.

The serial data of 1 pixel×16 pixels means serial data whose vertical address is incremented by "1" (=1 pixel) when a horizontal address thereof is incremented by "16" (=16 pixels). The serial data of 16 pixels×1 pixel means serial data whose horizontal address is incremented by "1" (=1 pixel) when a horizontal address thereof is fixed and a vertical address is incremented by "16" (=16 pixels).

Figure 26:
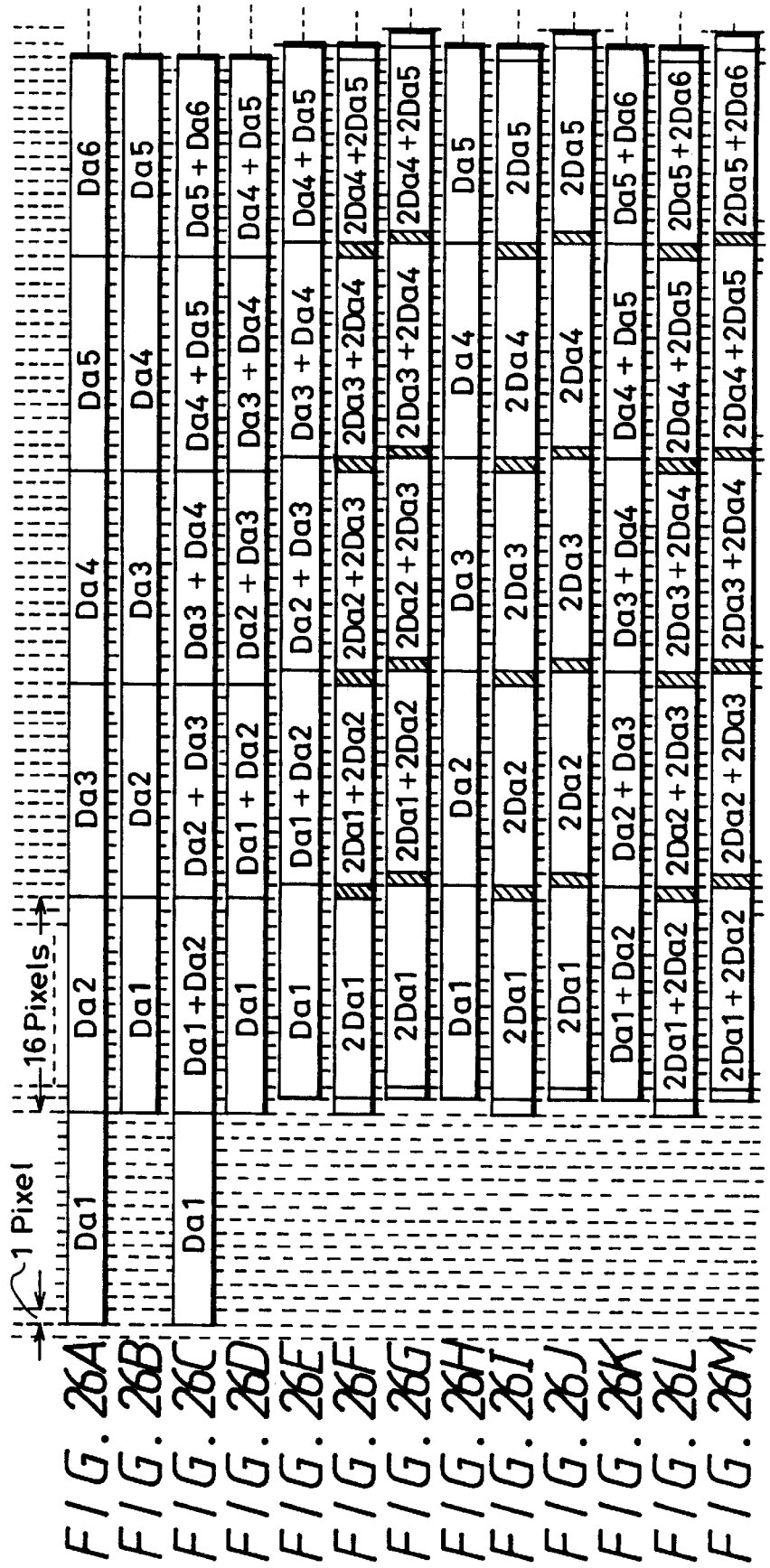
Figure 27:
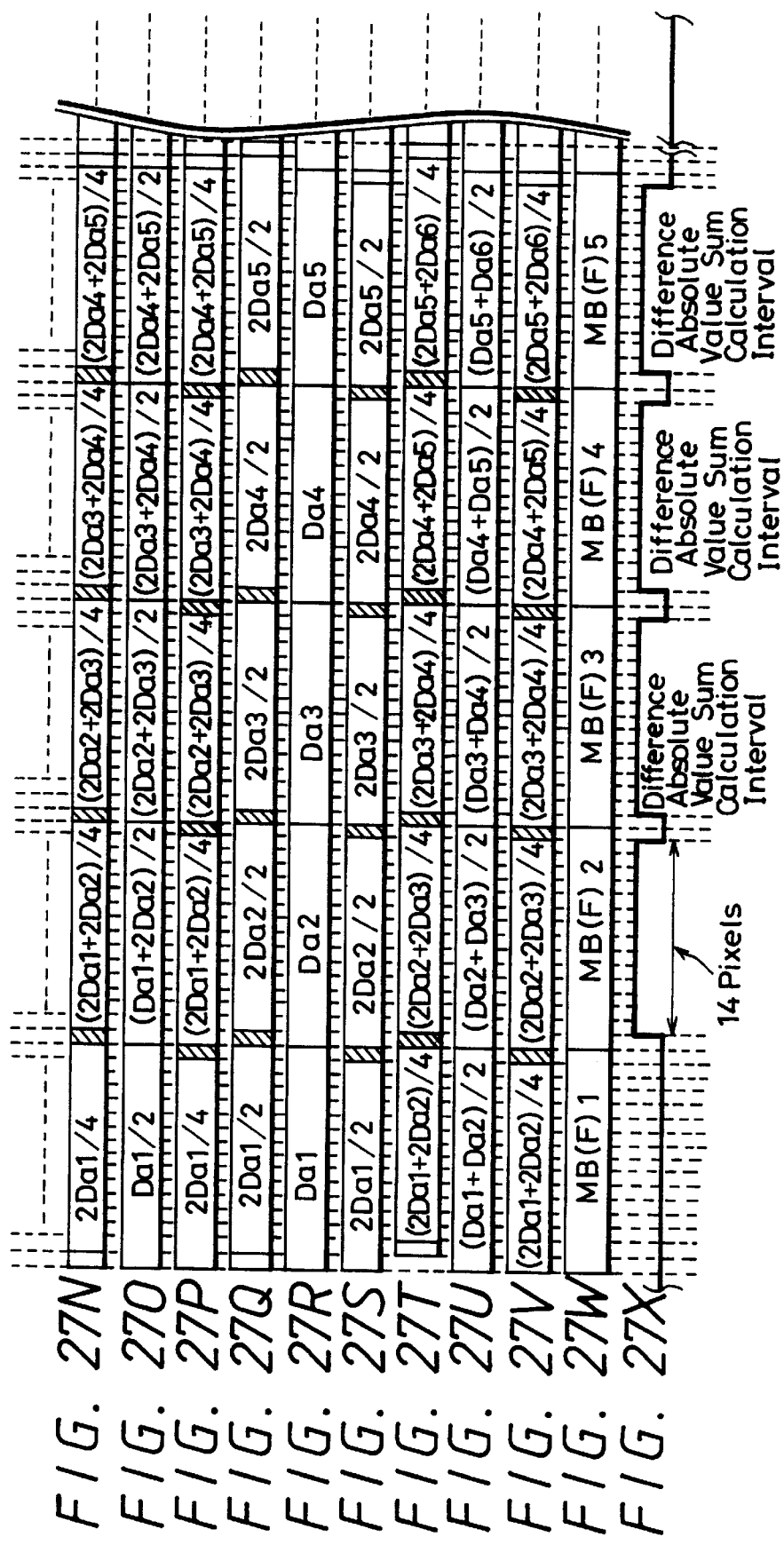

Reference letters A through X shown in FIGS. 26 and 27 are also illustrated in FIG. 24 in order to visually confirm that data shown in FIGS. 26 and 27 are outputs or inputs in FIG. 24.

The macroblock data MB(F) of the present frame read out from the macroblock memory 52 shown in FIG. 23 is supplied through the input terminal 60 shown in FIG. 24 to the delay circuit 61. Then, the macroblock data MB(F) of the present frame is delayed by the delay circuit 61 by a delay time of 16 pixels (D=16), and further supplied to the delay circuit 62, in which it is delayed by a delay time of 1 pixel (D=1), and fed to the evaluation circuits 73, 74, 75, 81, 82, 83, 90, 91 and 92. In other words, the macroblock data MB(F) of the present frame is delayed by a delay time of 17 pixels.

Pixel data (hereinafter referred to as half-pel generating block data) Da1, Da2, . . . , Da16 (see FIG. 26A) of 16 pixels×16 pixels in the search area of preceding frame read out from the search area memory shown in FIG. 23 are delayed by the delay circuit 64 by a delay time of 16 pixels (D=16) as shown in FIG. 26A, and supplied to the adding circuit 65. Then, the adding circuit 65 adds the half-pel generating block data Da2 to Da16 shown in FIG. 26A and the half-pel generating block data Da1 to Da16 shown in FIG. 26B as shown in FIG. 26C.

The added result (see FIG. 26C) of the adding circuit 65 is supplied to the delay circuit 67 and thereby delayed by a delay time of 16 pixels (D=16) as shown in FIG. 26D. Then, the delayed data is further supplied to and delayed by the delay circuit 67 by a delay time of 1 pixel (D=1) as shown in FIG. 26E, and supplied to the adding circuit 68. The adding circuit 68 adds the output (see FIG. 26D) of the delay circuit 66 and the output(see FIG. 26E) of the delay circuit 67 as shown in FIG. 26F.

In FIG. 26F, a leading area of two open small areas indicates original pixel data of leading one pixel of the half-pel generating block data Da1, and an end area indicates an added result of ending pixel data of the half-pel generating block data Da4 and Da5. In FIG. 26F, areas shown hatched are an added result of an added result of leading pixel data of the half-pel generating block data Da1 and Da2 and the ending pixel data of the half-pel generating block data Da1, an added result of an added result of leading pixel data of the half-pel generating block data Da2 and Da3 and an added result of ending pixel data of the half-pel generating block data Da1 and Da2, an added result of an added result of leading pixel data of the half-pel generating block data Da3 and Da4 and an added result of ending pixel data of the half-pel generating block data Da2 and Da3, and an added result of an added result of leading pixel data of the half-pel generating block data Da4 and Da5 and an added result of ending pixel data of the half-pel generating block data Da3 and Da4, in that order from the beginning.

As shown in FIG. 26F, in areas other than the above-mentioned areas, as shown by reference letters and numerals affixed to respective areas, pixel data from second pixel data to ending pixel data of added result Da1+Da2 of the half-pel generating block data are added to pixel data from the starting pixel data to pixel data immediately-preceding ending pixel data of added result Da1+Da2 of the half-pel generating block data, pixel data from second to ending pixel data of added result Da2+Da3 of the half-pel generating block data are added to pixel data from starting pixel data to pixel data immediately-preceding ending pixel data of added result Da2+Da3 of the half-pel generating block data, pixel data from second to ending pixel data of added result Da3+Da4 of the half-pel generating block data are added to pixel data from starting pixel data to pixel data immediately-preceding pixel data of added result Da3+Da4 of the half-pel generating block data, and pixel data from second to ending pixel data of added result Da4+Da5 of the half-pel generating block data are added to pixel data from starting pixel data to pixel data immediately-preceding pixel data of added result Da4+Da5 of the half-pel generating block data, respectively.

The added result shown in FIG. 26F is supplied to the delay circuit 69, in which it is delayed by a delay time of 1 pixel (D=1) as shown in FIG. 26G, and supplied to the multiplying circuits 70 and 72. Also, the added result shown in FIG. 26F is supplied to the multiplying circuit 71.

The multiplying circuit 70 multiplies the added result shown in FIG. 26G with coefficients at the pixel unit, and values of respective pixel data are decreased to ¼, respectively. An output of the multiplying circuit 70 is supplied to the evaluation circuit 73 as the macroblock data MB(F-1) wherein the half-pel data P1 shown in FIG. 25 is pixel data located at the upper left corner. The multiplying circuit 71 multiplies the added result shown in FIG. 26F with coefficients at the pixel unit, and values of respective pixel data are decreased to ½, respectively. An output of the multiplying circuit 71 is supplied to the evaluation circuit 74 as the macroblock data MB(F-1) wherein the half-pel data P2 shown in FIG. 25 is data located at the upper left corner. Further, the multiplying circuit 72 multiplies the added result shown in FIG. 26G with coefficients at the pixel unit, and values of respective pixel data are decreased to ¼, respectively. An output of the multiplying circuit 72 is supplied to the evaluation circuit 75 as the macroblock data MB(F-1) wherein the half-pel data P3 shown in FIG. 25 is pixel data located at the upper left corner.

On the other hand, the half-pel generating block data Da1 through Da16 (see FIG. 26B) from the delay circuit 64 are supplied to the delay circuit 76, in which they are delayed by a delay time of 1 pixel (D=1) as shown in FIG. 26H, and supplied to the adding circuit 77. The adding circuit 77 adds the half-pel generating block data Da1 to Da16 shown in FIG. 26B and the half-pel generating block data Da1 to Da16 (see FIG. 26H) which result from delaying the half-pel generating block data Da1 to Da16 by the delay circuit 76 by a delay time of 1 pixel. Added results are illustrated in FIG. 26I.

In FIG. 26I, leading area of two small open areas shows original pixel data of leading one pixel of the half-pel generating block data Da1, and ending area shows ending pixel data of the half-pel generating block data Da5. Area shown hatched in FIG. 26I shows an added result of leading pixel data of the half-pel generating block data Da2 and ending pixel data of the half-pel generating block data Da1, an added result of leading pixel data of the half-pel generating block data Da3 and ending pixel data of the half-pel generating block data Da2, an added result of leading pixel data of the half-pel generating block data Da4 and ending pixel data of the half-pel generating block data Da3, and added result of leading pixel data of the half-pel generating block data Da5 and ending pixel data of the half-pel generating block data Da4, respectively, in that order from the beginning.

Further, as shown in FIG. 26I, in other areas than the above-mentioned areas, as shown by reference letters and reference numerals, pixel data from second to ending pixel data of the half-pel generating block data Da1 are respectively added to pixel data from starting pixel data to pixel data immediately-preceding ending pixel data of the half-pel generating block data Da1, pixel data from second to ending pixel data of the half-pel generating block data are respectively added to pixel data from starting pixel data to pixel data immediately-preceding the ending pixel data of the half-pel generating block data, pixel data from second to ending pixel data of the half-pel generating block data Da3 are respectively added to pixel data from stating pixel data to pixel data immediately-preceding the ending pixel data of the half-pel generating block data Da3, pixel data from second to ending pixel data of the half-pel generating block data Da4 are respectively added to pixel data from stating pixel data to pixel data immediately-preceding the ending pixel data of the half-pel generating block data Da4, and pixel data from second to ending pixel data of the half-pel generating block data Da5 are respectively added to pixel data from starting pixel data to pixel data immediately-preceding the ending pixel data of the half-pel generating block data.

An added result (see FIG. 26I) from the adding circuit 77 is delayed by the delay circuit 78 by a delay time of 1 pixel (D=1) as shown in FIG. 26J, and supplied to the multiplying circuits 79, 80 and the evaluation circuit 82.

An added result (see FIG. 26C) from the adding circuit 65 is supplied to the delay circuit 84, in which it is delayed by a delay time (D=1) of 1 pixel as shown in FIG. 26K, and supplied to the adding circuit 85. The adding circuit 85 adds the added result (see FIG. 26C) from the adding circuit 65 and the output (see FIG. 26K) of the delay circuit 84. FIG. 26L shows an added result obtained from the adding circuit 85.

In FIG. 26L, leading area of two open areas shows original pixel data of leading 1 pixel of the half-pel generating block data Da1, and ending area shows an added result of ending pixel data of the half-pel generating block data Da5 and Da6. Small areas shown hatched in FIG. 26L show an added result of an added result of leading pixel data of the half-pel generating block data Da2 and Da3 and an added result of ending pixel data of the half-pel generating block data Da1 and Da2, an added result of an added result of leading pixel data of the half-pel generating block data Da3 and Da4 and an added result of ending pixel data of the half-pel generating block data Da2 and Da3, an added result of an added result of leading pixel data of the half-pel generating block data Da4 and Da5 and an added result of ending pixel data of the half-pel generating block data Da3 and Da4, and an added result of an added result of leading pixel data off the half-pel generating block data Da5 and Da6 and an added result of ending pixel data of the half-pel generating block data Da4 and Da5, respectively.

Further, as shown in FIG. 26L, in other areas than the above-mentioned areas, as shown by reference letters and reference numerals, pixel data from second to ending pixel data of the added result Da1+Da2 of the half-pel generating block data are respectively added to pixel data from ending pixel data to pixel data immediately-preceding the ending pixel data of the added result Da1+Da2 of the half-pel generating block data, pixel data from second pixel data to ending pixel data of the added result Da2+Da of the half-pel generating block data are respectively added to pixel data from leading pixel data to pixel data immediately-preceding ending pixel data of the added result Da2+Da3 of the half-pel generating block data, pixel data from second pixel data to ending pixel data of the added result Da3+Da4 of the half-pel generating block data are respectively added to pixel data from leading pixel data to pixel data immediately-preceding ending data of the added result Da3+Da4 of the half-pel generating block data, and pixel data from second pixel data to ending pixel data of the added result Da4+Da5 of the half-pel generating block data are respectively added to pixel data from ending pixel data to pixel data immediately-preceding ending pixel data of the added result Da4+Da5 of the half-pel generating block data.

The added result (see FIG. 26L) from the adding circuit 85 is supplied to the delay circuit 86, in which it is delayed by a delay time (D=1) of 1 pixel as shown in FIG. 26M, and supplied to the multiplying circuits 87 and 89. An added result (see FIG. 26L) from the adding circuit 85 also is supplied to the multiplying circuits 87 and 88.

According to the aforesaid processings, data composed of half-pel data generated by the half-pel data generating block data Da1 to Da6 is supplied to the evaluation circuits 73, 74, 75, 81, 82, 83, 90, 91 and 92 as the macroblock data MB(F).

The macroblock data MB(F) composed of the half-pel data supplied to the evaluation circuits 73, 74, 75, 81, 82, 83, 90, 91 and 92 is illustrated in FIG. 27.

If FIGS. 27N to 27X are checked with FIG. 24, then the second embodiment can be understood more easily.

FIG. 27N shows the input to the evaluation circuit 73 shown in FIG. 24, FIG. 27O shows the input to the evaluation circuit 74 shown in FIG. 24, FIG. 27P shows the input to the evaluation circuit 75 shown in FIG. 24, FIG. 27Q shows the input to the evaluation circuit 81 shown in FIG. 24, FIG. 27R shows the input to the evaluation circuit 82 shown in FIG. 24, FIG. 27S shows the input to the evaluation circuit 83 shown in FIG. 24, FIG. 27T shows the input to the evaluation circuit 90 shown in FIG. 24, FIG. 27U shows the input to the evaluation circuit 91 shown in FIG. 24, FIG. 27V shows the input to the evaluation circuit 92 shown in FIG. 24, FIG. 27w shows serial data MB(F)1 to MB(F)2 of 1 pixel×16 pixels (or 16 pixels×1 pixel) of the macroblock data MB(F) of present frame delayed by the delay circuit 62 shown in FIG. 24 by a delay time of 17 pixels, and FIG. 27X shows the evaluation function control signal CON supplied through the input terminal 94 from the controller 57 shown in FIG. 23.

As shown in FIG. 27N, when the output (see FIG. 26G) of the delay circuit 69 is multiplied with coefficient data by the multiplying circuit 70, this output is decreased to ¼ and thereby converted into the macroblock data MB(P1) composed of half-pel data. Reference symbol "P1" in the MB(P1) means a macroblock wherein the pixel data P1 shown in FIG. 25 is the pixel data located at the upper left corner. The evaluation circuit 73 effects a difference absolute value sum calculation on serial data of 14 pixels×14 pixels, i.e., 196 pixels provided within the macroblock data MB(P1) and serial data of 14 pixels×14 pixels, i.e., 196 pixels provided within the macroblock data MB(F) of the present frame shown in FIG. 27W in response to the evaluation function control signal CON shown in FIG. 27X, and an evaluated result is supplied to the minimum value selecting circuit 93.

As shown in FIG. 27X, the evaluation function control signal CON becomes inactive (e.g., held at low "0" level) in the first interval corresponding to the first serial data Da1 of 1 pixel×16 pixels and in the last interval corresponding to the last serial data Da16 of 1 pixel×16 pixels, and becomes active (e.g., held at high "1" level) in the interval corresponding to second to fifteenth pixel data of the serial data Da2 to Da15 of 1 pixel×16 pixels, and this interval becomes the difference absolute value sum interval wherein the difference absolute value sum calculation is carried out as shown in FIG. 27X.

As shown in FIG. 27O, when the output (see FIG. 26E) from the delay circuit 67 is multiplied with coefficient data by the multiplying circuit 71, such output is decreased to ½ and thereby converted into macroblock data MB(P2) composed of half-pel data. A reference symbol "P2" in MB(P2) means a macroblock wherein the pixel data P2 shown in FIG. 25 is pixel data located at the upper left corner. The evaluation circuit 74 effects a difference absolute value sum calculation of serial data of 14 pixels×14 pixels, i.e., 196 pixels of the macroblock data MB(P2) and serial data of 14 pixels×14 pixels, i.e., 196 pixels of the macroblock data MB(F) of present frame shown in FIG. 27W, and an evaluated result is supplied to the minimum value selecting circuit 93.

As shown in FIG. 27P, when the output (see FIG. 26F) from the adding circuit 68 is multiplied with coefficient data by the multiplying circuit 72, it is decreased to ¼ and thereby converted into macroblock data MB(P3) composed of half-pel data. A reference symbol "P3" in the MB(P3) means macroblock data wherein the pixel data P3 shown in FIG. 25 is pixel data located at the upper left corner. The evaluation circuit 75 effects a difference absolute value sum calculation on serial data of 14 pixels×14 pixels, i.e., 196 pixels of the macroblock data MB(P3) and serial data of 14 pixels×14 pixels, i.e., 196 pixels of the macroblock data MB(F) of present frame shown in FIG. 27W in response to the evaluation control signal CON shown in FIG. 27X.

As shown in FIG. 27Q, the output (see FIG. 26J) from the delay circuit 76 is multiplied with coefficient data by the multiplying circuit 79, it is decreased to ½ and thereby converted into macroblock data MB(P4) composed of half-pel data. A reference symbol "P4" in the MB(P4) means macroblock data wherein the pixel P4 shown in FIG. 25 is pixel data located at the upper left corner. The evaluation circuit 81 effects a difference absolute value sum calculation of serial data of 14 pixels×14 pixels, i.e., 196 pixels of the macroblock data MB(P4) and serial data of 14 pixels×14 pixels, i.e., 196 pixels of macroblock data MB(F) of present frame shown in FIG. 27W in response to the evaluation function control signal CON shown in FIG. 27X, and an evaluated result is supplied to the minimum value selecting circuit 93.

As shown in FIG. 27R, the output (see FIG. 26H) of the delay circuit 76 is macroblock data MB(P5) composed of half-pel data. A reference symbol "P5" in the MB(P5) means macroblock data wherein the pixel data P5 shown in FIG. 25 is pixel data located at the upper left corner. The evaluation circuit 82 effects a difference absolute value sum calculation of serial data of 14 pixels×14 pixels, i.e., 196 pixels of the macroblock data MB(P5) and serial data of 14 pixels×14 pixels, i.e., 196 pixels of the macroblock data MB(F) of present frame shown in FIG. 27W, and an evaluated result is supplied to the minimum value selecting circuit 93.

As shown in FIG. 27S, the output (see FIG. 26I) from the adding circuit 77 is multiplied with coefficient data by the multiplying circuit 80, it is decreased to ½ and thereby converted into macroblock data MB(P6) composed of half-pel data. A reference symbol "P6" in the MB(P6) means a macroblock wherein the pixel data P6 shown in FIG. 25 is pixel data located at the upper left corner. The evaluation circuit 83 effects a difference absolute value sum calculation of serial data of 14 pixels×14 pixels, i.e., 196 pixels of macroblock data MB(P6) and serial data of 14 pixels×14 pixels, i.e., 196 pixels of macroblock data MB(FF) of present frame shown in FIG. 27W, and an evaluated result is supplied to the minimum value selecting circuit 93.

As shown in FIG. 27T, the output (see FIG. 26M) from the delay circuit 86 is multiplied with coefficient data by the multiplying circuit 87, it is decreased to ¼ and thereby converted into macroblock data MB(P7) composed of half-pel data. A reference symbol "P7" in the MB(P7) means a macroblock wherein the pixel data P7 shown in FIG. 25 is pixel data located at the upper left corner. The evaluation circuit 90 effects a difference absolute value sum calculation of serial data of 14 pixels×14 pixels, i.e., 196 pixels of the macroblock data MB(P7) and serial data of 14 pixels×14 pixels, i.e., 196 pixel of the macroblock data MB(F) of the present frame shown in FIG. 27W, and an evaluated result is supplied to the minimum value selecting circuit 93.

As shown in FIG. 27U, the output (see FIG. 26K) from the delay circuit 84 is multiplied with coefficient data by the multiplying circuit 87, it is decreased to ½ and thereby converted into macroblock data MB(P8) composed of half-pel data. A reference symbol "P8" in the MB(P8) means a macroblock wherein the pixel data P8 shown in FIG. 25 is pixel data located at the upper left corner. The evaluation circuit 91 effects a difference absolute value sum calculation of serial data of 14 pixels×14 pixels, i.e., 196 pixels of the macroblock data MB(P8) and serial data of 14 pixels×14 pixels, i.e., 196 pixels of the macroblock data MB(F) of the present frame shown in FIG. 27W, and an evaluated result is supplied to the minimum value selecting circuit 93.

Furthermore, as shown in FIG. 27V, the output (see FIG. 26L) from the adding circuit 85 is multiplied with coefficient data by the multiplying circuit 87, it is decreased to ¼ and thereby converted into macroblock data MB(P9) composed of half-pel data. A reference symbol "P9" in the above MB(P9) means a macroblock wherein the pixel data P9 shown in FIG. 25 is pixel data located at the upper left corner. The evaluation circuit 92 effects a difference absolute value sum calculation of serial data of 14 pixels×14 pixels, i.e., 196 pixels of the macroblock data MB(P9) and serial data of 14 pixels×14 pixels, i.e., 196 pixels of the macroblock data MB(F) of the present frame shown in FIG. 27W, and an evaluated result is supplied to the minimum value selecting circuit 93.

When difference absolute value sum data from the evaluation circuits 73, 74, 75, 81, 82, 83, 90, 91 and 92 are supplied to the minimum value selecting circuit 93, the minimum value selecting circuit 93 selects the minimum difference absolute value sum data from the nine difference absolute value sum data, obtains motion vector data on the basis of the thus selected difference absolute value sum data, and supplies resultant motion vector data to the motion compensation circuit 214 shown in FIG. 12 through the output terminal 95.

FIGS. 28 to 32 are flowcharts used to explain a motion detection operation according to this embodiment. In the description below, let it be assumed that a microcomputer comprising a CPU, a ROM and a RAM is used and that the microcomputer has substantially the equal function as the circuit shown in FIG. 23 when program data stored in the ROM is loaded onto the main memory of the CPU. Also in this case, the function of this motion detecting circuit becomes similar and names of circuits shown in FIG. 23 are used as they are in the following description.

Reference numerals in the brackets affixed to the steps of the flowcharts shown in FIGS. 28 to 32 are the same as those of the steps of the flowcharts shown in FIGS. 17 to 22. Steps in the flowcharts shown in FIGS. 28 to 32 are the same in processing as those of the steps of the flowcharts shown in FIGS. 17 to 22.

Operation in the main routine will be described with reference to FIGS. 28 and 29.

Figure 28:
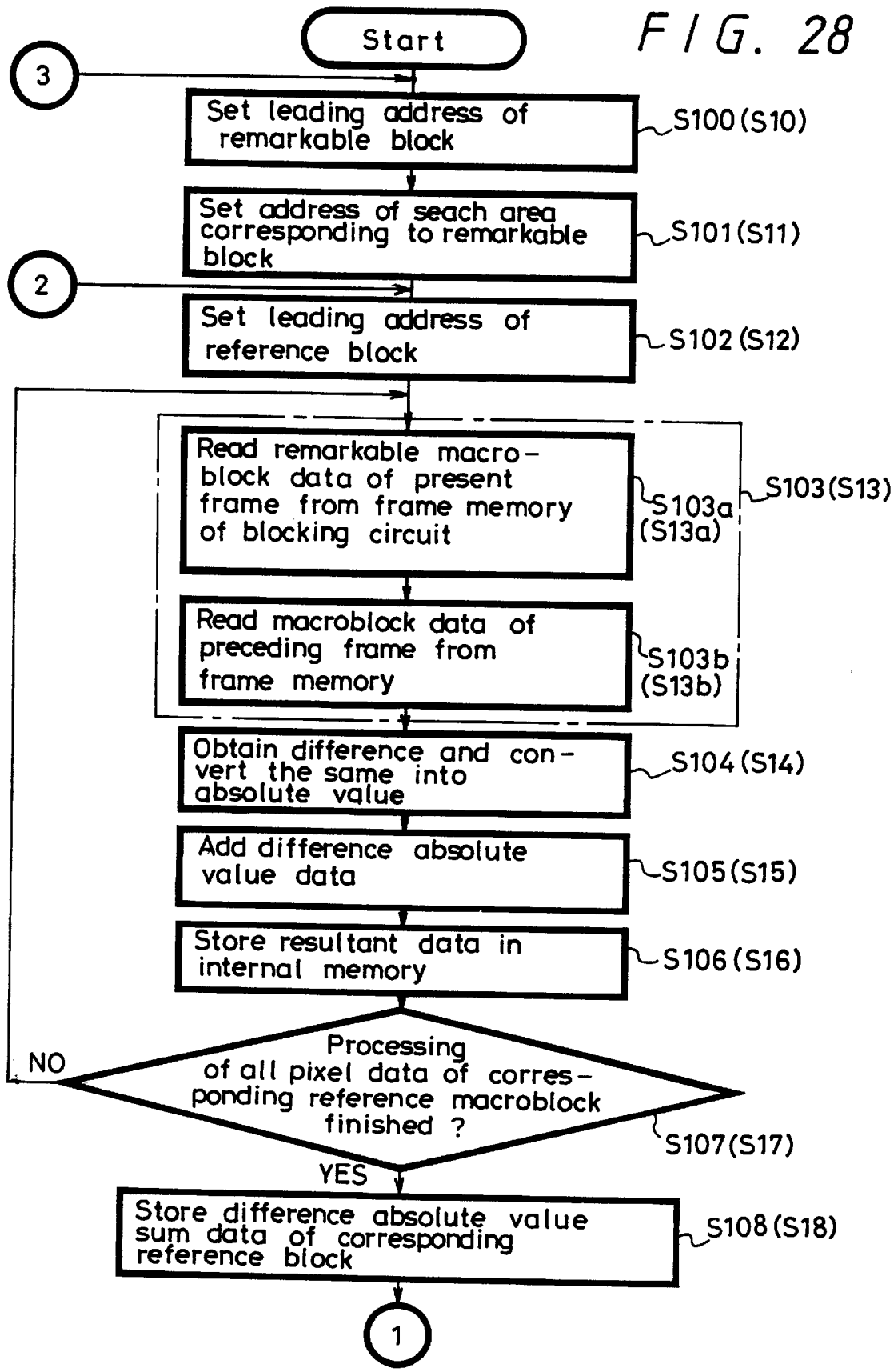
FIG. 28 is a flowchart showing a main routine, and to which reference will be made in explaining a motion detection operation according to a second embodiment of the present invention.

Referring to FIG. 28, following the start of operation, at step S100, the controller 57 shown in FIG. 23 supplies the control signal to the memory controller 1c of the blocking circuit 1 shown in FIG. 12 so that leading address of remarkable block is set on the memory space of the frame memory 1a or 1b of the blocking circuit 1. Then, the processing proceeds to step S101.

In step S101, the controller 57 shown in FIG. 23 sets search area address on the memory space of the frame memory 213 by setting address data supplied to the frame memory 214 shown in FIG. 12. Then, the processing proceeds to step S102.

In step S102, the controller 57 shown in FIG. 23 sets leading address of reference block on the memory space of the frame memory 213 by setting address data supplied to the frame 213 shown in FIG. 12. Then, the processing proceeds to step S103.

In step S103, two steps S103a, S103b encircled by a one-dot chain line are executed in parallel to each other. In one step S103a, the controller 57 shown in FIG. 23 supplies the read control signal to the memory controller 1c of the blocking circuit 1 shown in FIG. 12 so that the memory controller 1c reads out pixel data of remarkable macroblock.

In step S103b, the controller 57 shown in FIG. 23 supplies the read control signal to the frame memory 213 shown in FIG. 12 so that the macroblock data of preceding frame is read out from the frame memory 213. At the completion of these steps S103a and S103b, then the processing proceeds to step S104.

In step S104, the first motion detecting circuit 51 shown in FIG. 23 calculates a difference between the macroblock data MB(F) serving as the remarkable block supplied thereto through the input terminal 50 and the macroblock data MB(F-1) serving as the reference macroblock supplied thereto through the input terminal 53. Then, the processing proceeds to step S105.

In step S105, the first motion detecting circuit 51 shown in FIG. 23 adds difference absolute value data of pixel unit sequentially obtained. Then, the processing proceeds to step S106.

In step S106, the first motion detecting circuit 51 shown in FIG. 23 stores sequentially-obtained difference absolute value sum data in an internal memory (not shown). Then, the processing proceeds to the next decision step S107.

It is determined in decision step S107 whether or not the first motion detecting circuit 51 shown in FIG. 23 finishes processing all pixel data of the reference macroblock. If a YES is outputted at decision step S107, then the processing proceeds to the next step S108. If on the other hand a NO is outputted at decision step S107, then the processing returns to step S103.

In step S108, the first motion detecting circuit 51 shown in FIG. 23 stores difference absolute value sum data of the reference macroblock in the internal memory. Then, the processing proceeds to decision step S109 of the flowchart shown in FIG. 29.

Figure 29:
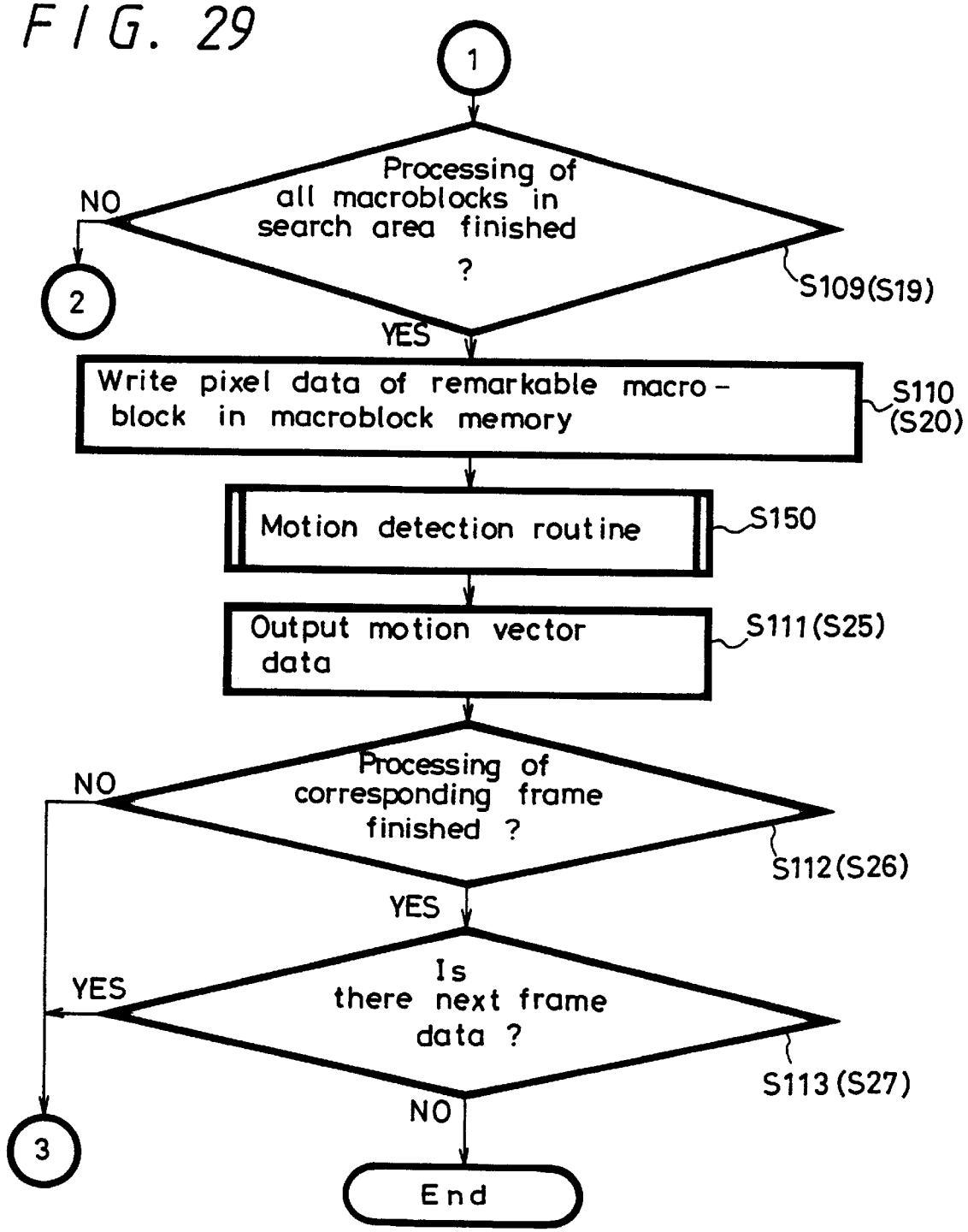
FIG. 29 is a flowchart showing a main routine, and to which reference will be made in explaining a motion detection operation according to the second embodiment of the present invention.

In decision step S109 of the flowchart shown in FIG. 29, it is determined by the controller 57 shown in FIG. 23 whether or not the processing of all macroblocks provided within the is finishedsearch area. If a YES is outputted at decision step S109, then the processing proceeds to step S110. If on the other hand a NO is outputted at decision step S109, then the processing returns to step S102 of the flowchart shown in FIG. 28.

In step S110, the controller 57 shown in FIG. 23 supplies a control signal to the memory controller 1c of the blocking circuit shown in FIG. 12 so that the memory controller 1c reads out the macroblock data MB(F) serving as the remarkable block from the frame memory 1a or 1b. Further, the controller 57 supplies the write control signal to the macroblock memory 52 shown in FIG. 23 so that the macroblock data MB(F) supplied thereto through the input terminal 50 is stored in the macroblock memory 52. Then, the processing proceeds to step S150.

In step S150, a motion detection routine is executed, and the processing proceeds to step S111.

In step S111, the second motion detecting circuit 56 shown in FIG. 23 outputs half-pel accuracy motion vector data mv obtained in the motion detection routine as motion-compensation processing motion vector data in the motion compensation circuit 214 shown in FIG. 12. Then, the processing proceeds to the next decision step S112.

In decision step S112, it is determined by the controller 57 shown in FIG. 23 whether or not the processing of the corresponding frame is finished. If a YES is outputted at decision step S112, then the processing proceeds to the next decision step S113. If on the other hand a NO is outputted at decision step S112, then the processing returns to step S100 of the flowchart shown in FIG. 28.

It is determined at decision step S113 by the controller 57 shown in FIG. 23 whether or not there is the next frame data. If a YES is outputted at decision step S113, then the processing returns to step S100 of the flowchart shown in FIG. 28. If on the other hand a NO is outputted at decision step S113, then the processing is ended.

Decisions made by circuits other than the controller 57 may be carried out by the controller 57, and information indicating judged results may be supplied from the controller 57 to respective circuit to thereby control the respective circuits.

Operation in the motion detection routine will be described with reference to FIGS. 30 to 32.

Figure 30:
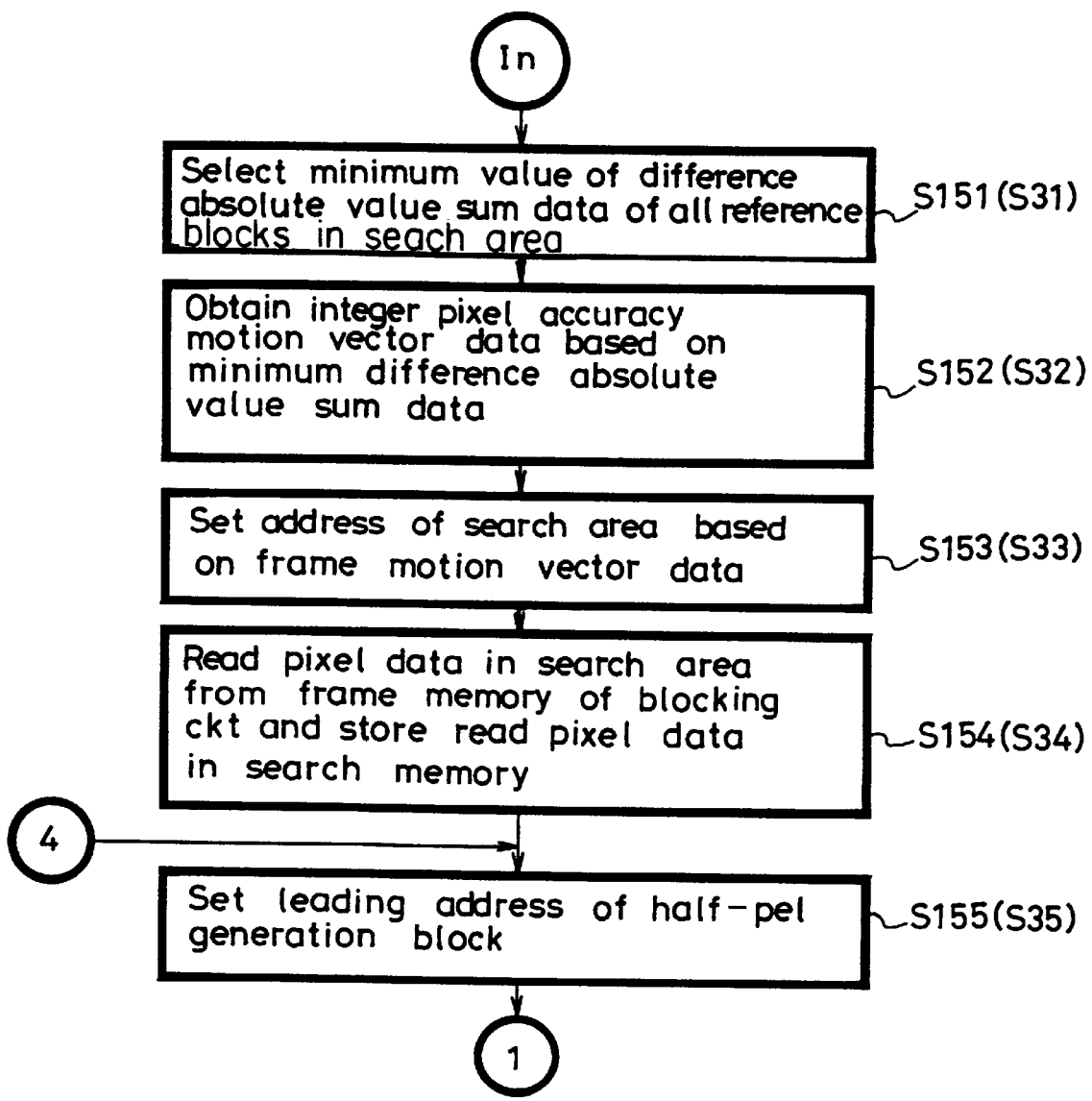
FIG. 30 is a flowchart showing a motion detection routine, and to which reference will be made in explaining a motion detection operation according to the second embodiment of the present invention.

As shown in FIG. 30, at step S151, the first motion detecting circuit 51 shown in FIG. 23 selects the minimum difference absolute value sum data from the difference absolute value sum data of all reference macroblocks located within the search area. Then, the processing proceeds to step S152.

In step S152, the first motion detecting circuit 51 shown in FIG. 23 obtains integer-pixel accuracy motion vector data MV on the basis of the difference absolute value sum data obtained at step S151. Then, the processing proceeds to step S153.

In step S153, the controller 57 shown in FIG. 23 sets setting search area address on the memory space of the frame memory 213 shown in FIG. 12 on the basis of the motion vector data MV supplied thereto from the first motion detecting circuit 51. Then, the processing proceeds to step S154.

In step S154, the controller 57 shown in FIG. 23 supplies the read control signal to the frame memory 213 shown in FIG. 12 so that pixel data provided within the search area set in step S153 are read out from the frame memory 213. Subsequently, the controller 57 supplies the write control signal to the search area memory 54 so that pixel data located within the search area read out from the frame memory 213 are stored in the search area memory 54. Then, the processing proceeds to step S155.

In step S155, the controller 57 shown in FIG. 23 sets leading address for half-pel generating block on the memory space serving as the search area of the search area memory 54 shown in FIG. 12. Then, the processing proceeds to step S156 shown in the flowchart of FIG. 31.

Figure 31:
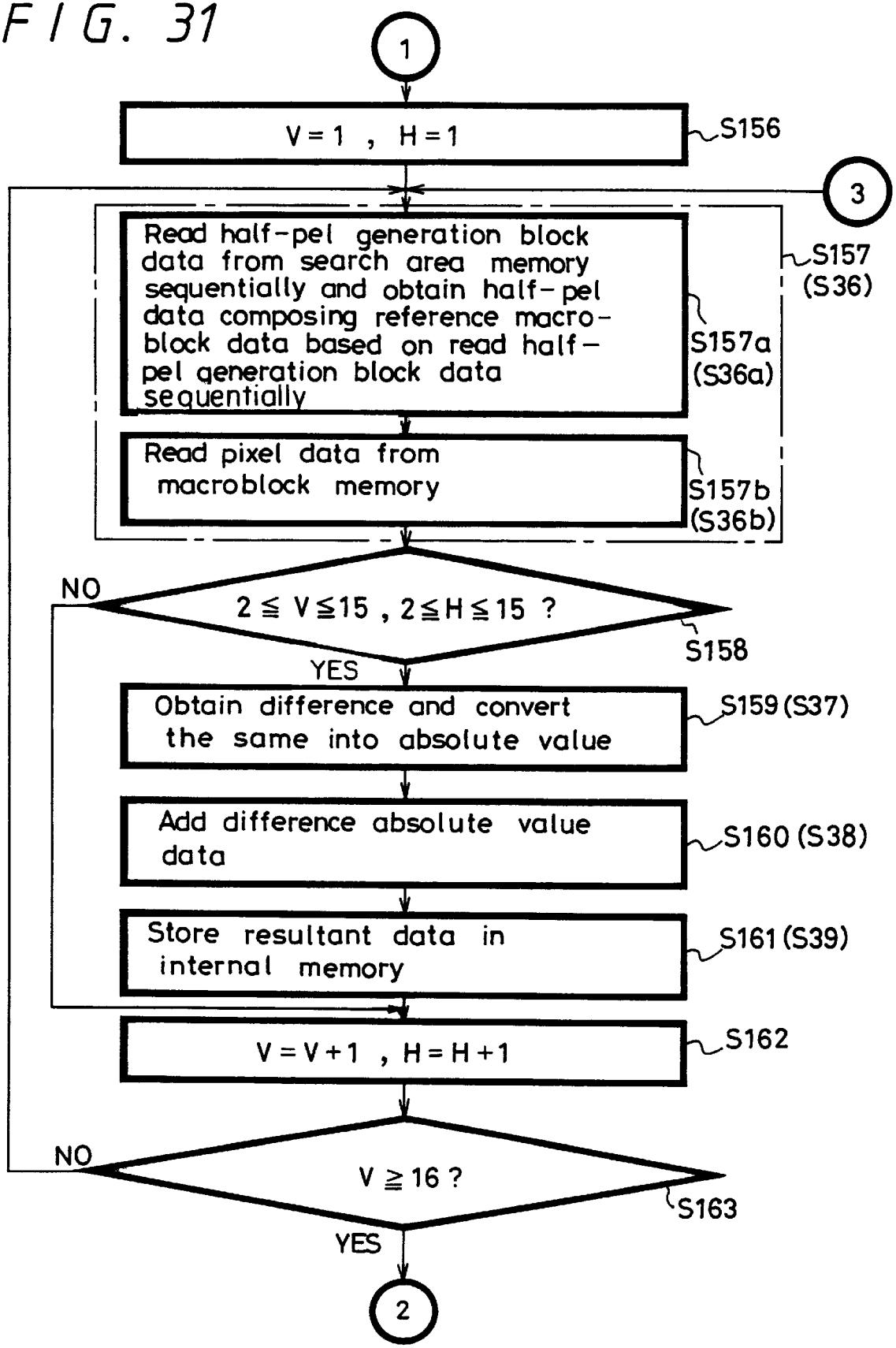
FIG. 31 is a flowchart showing a motion detection routine, and to which reference will be made in explaining a motion detection operation according to the second embodiment of the present invention.

As shown in FIG. 31, at step S156, the controller 57 shown in FIG. 23 sets vertical-direction count value data V corresponding to vertical direction address data set on the memory space of the search area memory 54 to "1", and sets horizontal-direction count value data H corresponding to horizontal-direction address data to "1". Then, the processing proceeds to step S157.

In step S157, two steps S157a, S157b serving as two subroutines encircled by a one-dot chain line are executed in parallel to each other. In one step S157a, the controller 57 shown in FIG. 23 supplies the read control signal to the search area memory 54 so that half-pel generating block data are read out from the search area memory 54. Then, the half-pel generating circuit 55 sequentially generates half-pel data comprising the reference macroblocks on the basis of half-pel generating block data supplied thereto from the search area memory 54.

In the other step S157b, the controller 57 shown in FIG. 23 supplies the read control signal to the macroblock memory 52 so that the macroblock memory MB(F) located within the remarkable macroblock are read out from the macroblock memory 52. At the completion of these two steps S157a, S157b, the processing proceeds to the next decision step S158.

It is determined by the controller 57 shown in FIG. 22 at decision step S158 whether the vertical-direction count value data V is larger than "2" and less than "15" and whether the horizontal-direction count value data H is larger than "2" and less than "15". If a YES is outputted at decision step S158, then the processing proceeds to step S159. If on the other hand a NO is outputted at decision step S159, then the processing proceeds to step S162. The decision step S159 is a decision step capable of reading only pixel data of the macroblock smaller than the original macroblock.

In step S159, the second motion detecting circuit 56 shown in FIG. 23 calculates a difference between the macroblock data MB(F-1) supplied thereto from the half-pel generating circuit 55 and the macroblock data MB(F) supplied thereto from the macroblock memory 52, and converts the resultant difference data into an absolute value. Then, the processing proceeds to step S160.

In step S160, the second motion detecting circuit 56 shown in FIG. 23 adds difference absolute value data obtained at step S150. Then, the processing proceeds to step S161.

In step S161, the second motion detecting circuit 56 shown in FIG. 23 stores the difference absolute value sum data obtained at step S160 in the internal memory (not shown). Then, the processing proceeds to step S162.

At step S162, the controller 57 shown in FIG. 23 adds "1" to the vertical-direction count value data V, and adds "1"to the horizontal-direction address data H. Then, the processing proceeds to the next decision step S163.

It is determined in decision step S163 by the controller 57 shown in FIG. 23 whether the vertical-direction count value data V is larger than "16". If a YES is outputted at decision step S163, then the processing proceeds to step S164 of the flowchart shown in FIG. 32. If on the other hand a NO is outputted at decision step S163, then the processing returns to step S157. This step S163 is a control step used in such a manner as to read out only pixel data located within the macroblock whose size is smaller than the size o the original macroblock. In this embodiment, since the size of the original macroblock is 16 pixels (vertical direction)×16 pixels (horizontal direction), when address data in the horizontal direction becomes "16", reading of pixel data located within the macroblock is stopped.

Figure 32:
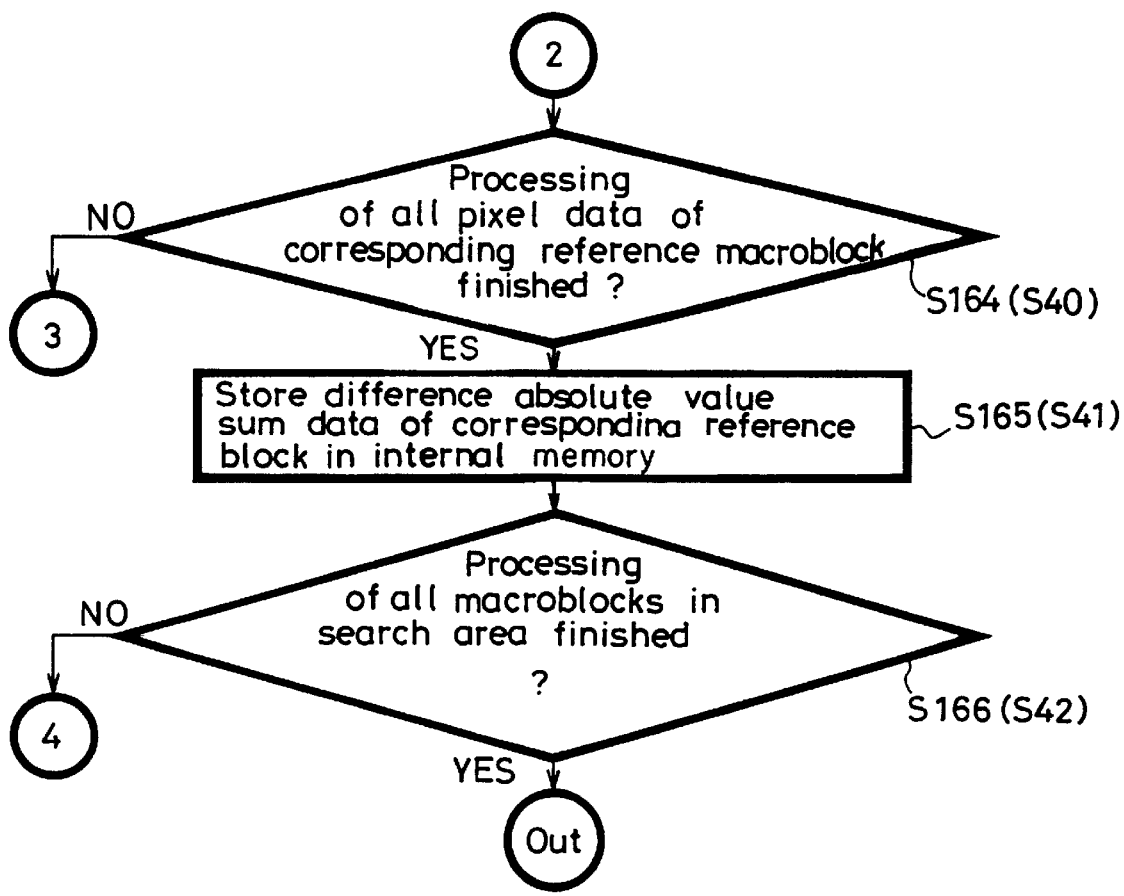
FIG. 32 is a flowchart showing a motion detection routine, and to which reference will be made in explaining a motion detection operation according to the second embodiment of the present invention.

As shown in FIG. 32, in the next decision step S164, it is determined whether or not the second motion detecting circuit 56 has finished the processing of all pixel data provided within the corresponding macroblock. If a YES is outputted at decision step S164, then the processing proceeds to the next step S165. If on the other hand a NO is outputted at decision step S164, then the processing returns to step S157 in the flowchart shown in FIG. 31.

In step S165, the second motion detecting circuit 56 shown in FIG. 23 stores the difference absolute value sum data of the corresponding reference block in the internal memory (not shown). Then, the processing proceeds to the next decision step S166.

It is determined at decision step S166 by the controller 57 shown in FIG. 23 whether or not the processing of all macroblocks is ended. If a YES is outputted at decision step S166, then the processing proceeds from this frame type motion detection routine to step S111 in the flowchart shown in FIG. 29. If on the other hand a NO is outputted at decision step S166, then the processing returns to step S155 in the flowchart shown in FIG. 30.

As described above, according to the second embodiment of the present invention, if the sizes of the macroblock data MB(F) of the present frame and the macroblock data MB(F-1) of the preceding frame are 16 pixels×16 pixels, for example, the difference absolute value sum calculation is carried out by use of the macroblock data of the smaller size of 14 pixels×14 pixels. Therefore, it is sufficient that only pixel data of 16 pixels×16 pixels are read out unlike the prior art in which pixel data of 18 pixels×18 pixels should be read out. Thus, the clock frequency need not be increased, and concurrently therewith, a complex timing control in the peripheral circuits need not be carried out, thereby resulting the arrangement being simplified and the processing speed being increased.

Figure 33:
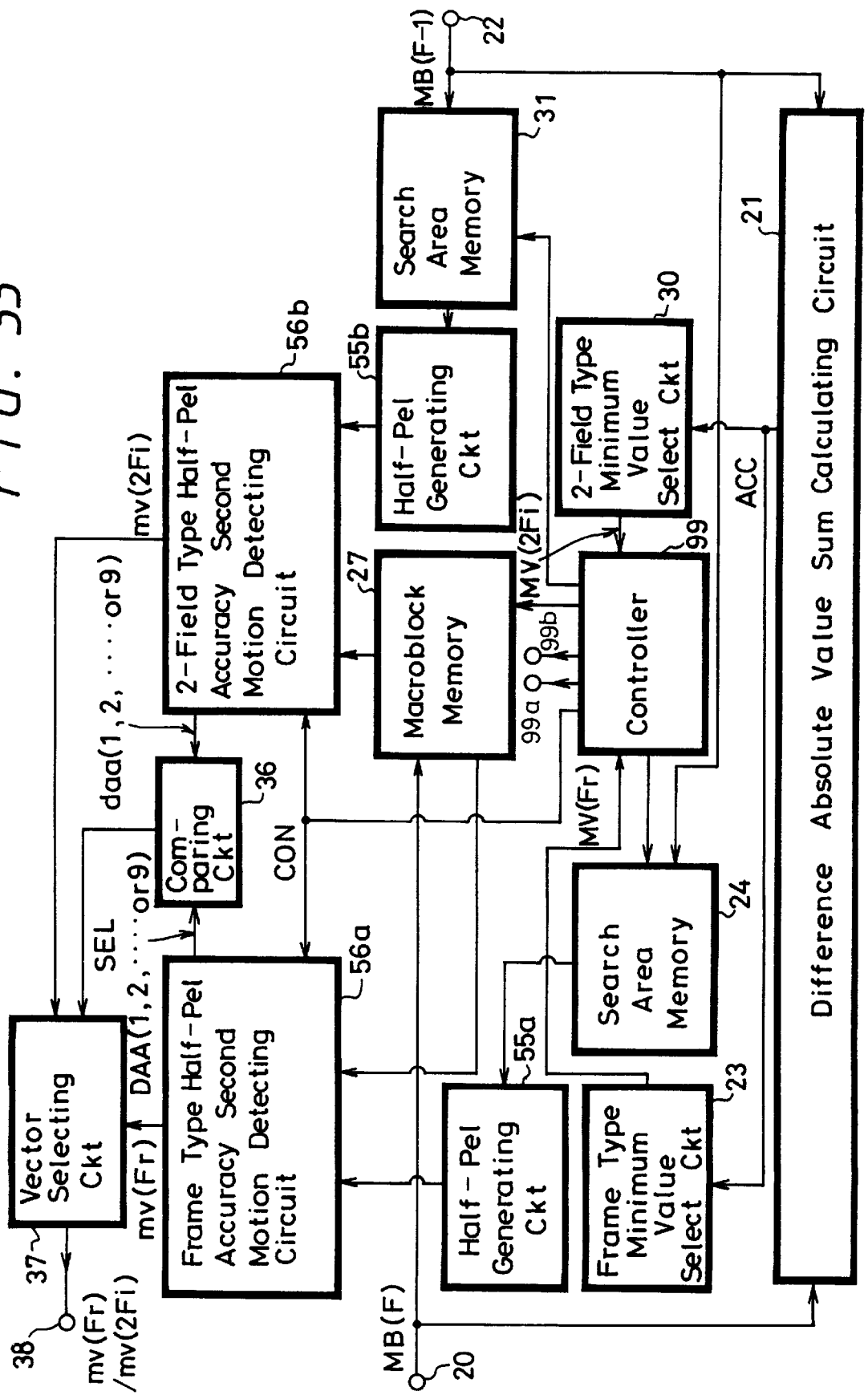
FIG. 33 is a block diagram showing a frame type/2-field type motion detecting circuit in the high-efficiency coding method and a high-efficiency coding apparatus according to a third embodiment of the present invention.

FIG. 33 is a block diagram showing an inside arrangement of the frame type/2-field type motion detecting circuit 2 shown in FIG. 12. In FIG. 33, elements and parts identical to those of FIG. 14 are marked with the same references and therefore need not be described in detail.

In FIG. 33, the half-pel generating circuit 55 (denoted with reference numeral "55a" in FIG. 33) is used instead of the half-pel generating circuit 26 shown in FIG. 14, and the half-pel generating circuit 55 (denoted with reference numeral "55b" in FIG. 33) shown in FIG. 24 is used instead of the half-pel generating circuit 26 shown in FIG. 14 . Further, the second motion detecting circuit 56 (denoted with reference numeral "56a" in FIG. 33) is used instead of the difference absolute value sum calculation circuit 28 and the minimum value selecting circuit 29 shown in FIG. 14, and the second motion detecting circuit 56 (denoted with reference numeral "56b" in FIG. 33) is used instead of the difference absolute value sum calculation circuit 34 and the minimum value selecting circuit 35 shown in FIG. 14. The inside arrangements of the half-pel generating circuit 55a and 55b shown in FIG. 33 become the same as that of the half-pel generating circuit 55 shown in FIG. 24, and the inside arrangements of the frame type half-pel accuracy second motion detecting circuit 56a and the 2-field type half-pel accuracy second motion detecting circuit 56b shown in FIG. 24 become the same as that of the second motion detecting circuit 56 shown in FIG. 24. A controller 99 shown in FIG. 33 is different from the controller 32 shown in FIG. 14, and supplies the above evaluation function control signal CON to the frame type half-pel accuracy second motion detecting circuit 56a and the 2-field type half-pel accuracy second motion detecting circuit 56b.

Specifically, according to the third embodiment of the present invention, the frame type/2-field type motion detection processing according to the first embodiment and the difference absolute value sum calculation for processing pixel data of macroblock whose size is smaller than that of the original macroblock according to the second embodiment are combined, whereby effects achieved by the technique according to the first embodiment and effects achieved by the technique according to the second embodiment can both be obtained. Synergism can be achieved by the combination of these techniques, i.e., the circuit arrangement can be simplified, motion compensation with high accuracy can be carried out by simple processing, and encoding can be efficiently carried out with high accuracy.

Operation of this motion detecting circuit according to the third embodiment will be described below.

The macroblock data MB(F) of the present frame from the blocking circuit shown in FIG. 12 is supplied through the input terminal 20 to the difference absolute value calculating circuit 21, and the macroblock data MB(F-1) of the preceding frame from the frame memory 213 shown in FIG. 12 is supplied through the input terminal 22 to the deference absolute value sum calculating circuit 21.

The macroblock data of the present frame supplied through the input terminal 20 is stored in the macroblock memory 27 under control of the controller 99. Under control of the controller 99, the remarkable macroblock data of the present frame is repeatedly outputted to the memory controller 1c shown in FIG. 12 through an output terminal 99a. The difference absolute value sum calculation circuit 21 obtains the difference absolute value sum data ACC of every macroblock by calculating difference absolute value sum of the macroblock data MB(F) of the present frame supplied thereto through the input terminal 20 and the macroblock data MB(F-1) of preceding frame sequentially supplied thereto through the input terminal 22.

The frame type minimum value selecting circuit 23 selects the minimum difference absolute value sum data from the difference absolute value sum data of all macroblocks supplied thereto from the difference absolute value sum calculating circuit 21, obtains the integer pixel accuracy frame motion vector data MV on the basis of the difference absolute value sum data, and supplies the frame motion vector data MV to the controller 99. Simultaneously, the 2-field type minimum value selecting circuit 30 selects the minimum difference absolute value sum data from the difference absolute value sum data of all macroblocks, which become even-numbered macroblocks in the longitudinal direction of all macroblocks, supplied from the difference absolute value sum calculating circuit 21, obtains the integer pixel accuracy 2-field motion vector data MV(2Fi) on the basis of the selected difference absolute value sum data, and supplies the 2-field motion vector data MV(2Fi) to the controller 99.

The controller 99 supplies the read control signal to the frame memory 213 shown in FIG. 12 through the output terminal 99*b* on the basis of the integer pixel accuracy frame motion vector data MV(Fr) supplied thereto from the frame type minimum value selecting circuit 23. Thus, all pixel data of search area including pixel data necessary for generating nine half-pel data including pixel data located at the position shown by the frame motion vector data MV(Fr) area read out from the frame memory 213. The pixel data read out from the frame memory 213 are supplied through the input terminal 22 to the search area memory 24, and the controller 99 supplies the write control signal to the search area memory 24, whereby pixel data of search area including pixel data necessary for generating the above pixel data are stored in the search area memory 24.

The controller 99 supplies the read control signal to the frame memory 213 shown in FIG. 12 through the output terminal 99*b* on the basis of the 2-field motion vector data MV(2Fi) with integer accuracy supplied thereto from the 2-field type minimum value selecting circuit 30 so that all pixel data of search area including pixel data necessary for generating nine half-pel data including pixel data located at the position shown by the 2-field motion vector data MV(2Fi) are read out from the frame memory 213. The pixel data read out from the frame memory 213 are supplied through the input terminal 22 to the search area memory 31, and the controller 99 supplies the write control signal to the search area memory 31, whereby pixel data of search area including pixel data necessary for generating the above half-pel data are stored in the search area memory 31.

Subsequently, the controller 99 supplies the read control signal to the search area memory 24 to read out the pixel data from the search area memory 24. At that time, the controller 99 reads out the pixel data necessary for sequentially generating nine half-pel accuracy macroblocks in such a manner that the above nine half-pel data become pixel data located at the upper left corners of the macroblocks each having half-pel accuracy. The pixel data thus read out are supplied to the half-pel generating circuit 56*a*. The half-pel generating circuit 56*a* sequentially generates half-pel data composing macroblocks with a half-pel accuracy on the basis of the pixel data supplied thereto from the search area memory 24, and supplies the half-pel data thus generated to the frame type half-pel accuracy second motion detecting circuit 56*a*.

The frame type half-pel accuracy second motion detecting circuit 56*a* calculates difference absolute value sum of the half-pel accuracy macroblock data sequentially supplied thereto from the half-pel generating circuit 55*a* and the macroblock data of the present frame supplied thereto from the macroblock memory 27, and supplies the minimum difference absolute value sum data DATA(1, 2, . . . or 9) of the resultant nine difference absolute value sum data to the comparing circuit 36. Moreover, the frame type half-pel accuracy second motion detecting circuit 56*a* obtains half-pel accuracy frame motion vector data mv(Fr) on the basis of the difference absolute value sum data DAA(1, 2, . . . or 9), and supplies this frame motion vector data mv(Fr) to the vector selecting circuit 37.

On the other hand, the controller 99 supplies the read control signal to the search area memory 31 in such a manner as to read out pixel data from the search area memory 31. At that time, the controller 99 reads out the pixel data necessary for sequentially generating nine half-pel accuracy macroblocks in such a manner that the above nine half-pel data become pixel data located at the upper left corners of the half-pel accuracy macroblocks. The pixel data thus read out are supplied to the half-pel generating circuit 56*b*.

The half-pel generating circuit 56*b* sequentially generates half-pel data comprising the half-pel accuracy macroblocks on the basis of the pixel data supplied thereto from the search area memory 31, and supplies the half-pel data thus generated to the frame type half-pel accuracy second motion detecting circuit 56*b*.

The frame type half-pel accuracy second motion detecting circuit 56*b* calculates difference absolute value sum of the macroblock data with half-pel accuracy sequentially supplied thereto from the half-pel generating circuit 55*b* and the macroblock data of the present frame supplied from the macroblock memory 27, and supplies the minimum difference absolute value sum data daa(1, 2, . . . or 9) of the resultant nine difference absolute value sum data to the comparing circuit 36. Moreover, the frame type half-pel accuracy second motion detecting circuit 56*b* obtains the half-pel accuracy 2-field motion vector data mv(2Fi) on the basis of the difference absolute value sum data DAA(1, 2, . . . or 9), and supplies the thus obtained 2-field motion vector data mv(2Fi) to the vector selecting circuit 37.

The comparing circuit 36 compares the difference absolute value sum data DAA(1, 2, . . . or 9) supplied thereto from the minimum value selecting circuit 29 and the difference absolute value sum data daa(1, 2, . . . or 9) supplied thereto from the minimum value selecting circuit 35 as follows:

Specifically, if DAA(1, 2, . . . or 9)>daa(1, 2, . . . or 9), then the comparing circuit 36 outputs the selection control signal SEL indicating that the 2-field motion vector data mv(2Fi) should be selected.

If DAA(1, 2, . . . or 9)<daa(1, 2, . . . or 9), then the comparing circuit 36 selects the selection control signal SEL indicating that the frame motion vector mv(Fr) should be selected.

When the above selection control signal SEL is supplied to the vector selecting circuit 37, the vector selecting circuit 37 selects the frame motion vector data mv(Fr) supplied thereto from the minimum value selecting circuit 29 or the 2-field motion vector data mv(2Fi) supplied thereto from the minimum value selecting circuit 35 on the basis of the contents of the selection control signal SEL. The frame motion vector data or 2-field motion vector data mv(Fr)/mv(2Fi) thus selected by the vector selecting circuit 37 is supplied through the output terminal 38 to the motion compensation circuit 214 shown in FIG. 12.

FIGS. 34 through 41 are flowcharts used to explain a motion detection operation according to the third embodiment of the present invention. In the description below, let it be assumed that a microcomputer comprising a CPU, a ROM and a RAM is used and that the microcomputer has substantially equal function as that of the circuits shown in FIG. 33 when program data stored in the ROM is loaded on a main memory of the CPU.

The flowcharts of FIGS. 34 through 41 are effected by a combination of the first and second embodiments, and processing operations in respective steps in these flowcharts of FIGS. 34 through 41 become similar to those of the respective steps of the first and second embodiments. Reference numerals in brackets affixed to reference numerals in the respective steps of FIGS. 34 through 41 are those of steps in the flowcharts of FIGS. 28 through 32, illustrating that respective steps in the flowcharts of FIGS. 34 through 41 are the same in processing operation as those of the flowcharts of FIGS. 17 through 22 or the flowcharts of FIGS. 28 through 32.

Therefore, the processing operations in the respective steps in the flowcharts of FIGS. 34 to 41 need not be described herein, and the flowcharts (FIGS. 17 to 22 or FIGS. 28 to 32) of the first or second embodiment, which are shown by reference numerals in the brackets affixed to the reference numerals in the respective steps shown in FIGS. 34 through 41 will be referred to below. In that case, the controller 32 which took initiative for the processing operation in the first embodiment is replace with the controller 99 according to the third embodiment, the difference absolute value sum calculation circuit 21 is replaced with the difference absolute value sum calculation circuit 21 shown in FIG. 33 according to the third embodiment, the frame type minimum value selecting circuit 23 is replaced with the frame type minimum value selecting circuit 32 shown in FIG. 33 according to the third embodiment, the 2-field type minimum value selecting circuit 30 is replaced with the 2-field type minimum value selecting circuit shown in FIG. 33 according to the third embodiment, the half-pel generating circuit 26 is replaced with the half-pel generating circuit 55a shown in FIG. 33 according to the third embodiment, the half-pel generating circuit 33 is replaced with the half-pel generating circuit 55b shown in FIGS. 33 according to the third embodiment, the comparing circuit 36 is replaced with the comparing circuit 36 shown in FIG. 33 according to the third embodiment, and the vector selecting circuit 37 is replaced with the vector selecting circuit 37 shown in FIG. 33 according to the third embodiment. The controller 57 which took initiative for the processing operation in the second embodiment is replaced with the controller 99 shown in FIG. 33 according to the third embodiment, the half-pel generating circuit 55 is replaced with the half-pel generating circuits 55a, 55b shown in FIG. 33 according to the third embodiment, and the second motion detecting circuit 56 is replaced with the frame type half-pel accuracy second motion detecting circuit 56a and the 2-field type half-pel accuracy second motion detecting circuit 56b shown in FIG. 33 according to the third embodiment.

Figure 34:
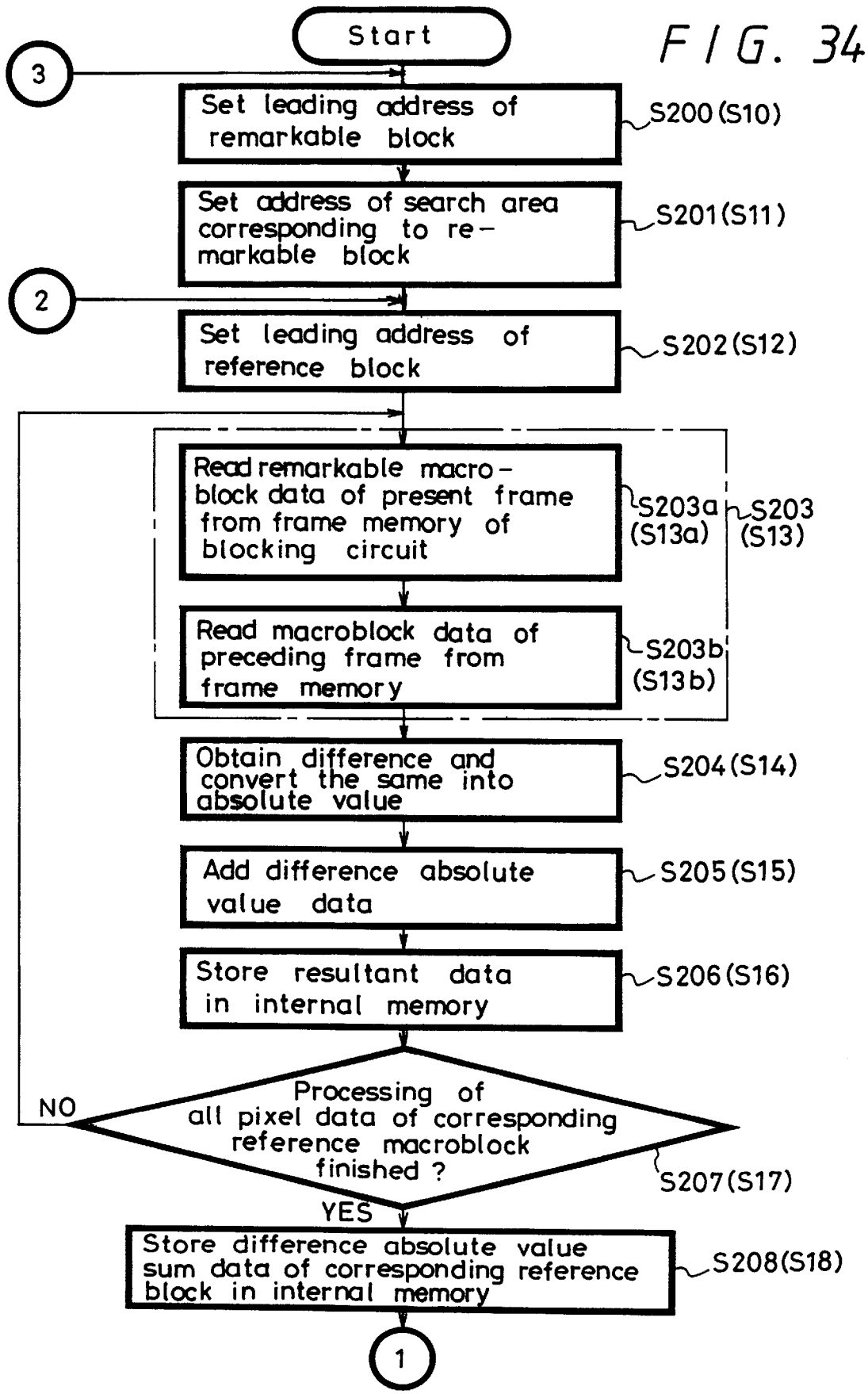
FIG. 34 is a flowchart showing a main routine, and to which reference will be made in explaining a motion detection operation according to the third embodiment of the present invention.
Figure 35:
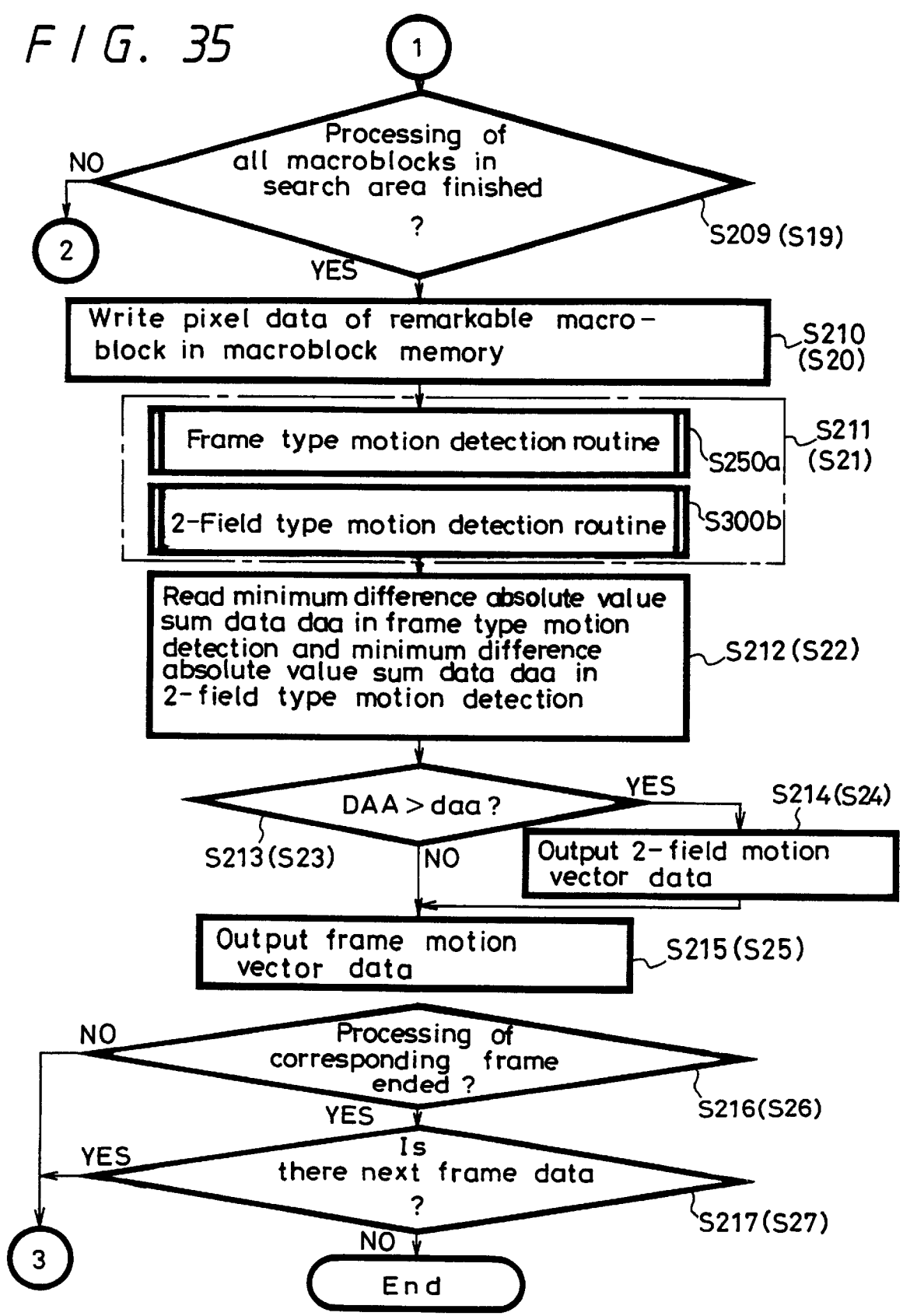
FIG. 35 is a flowchart showing a main routine, and to which reference will be made in explaining a motion detection operation according to the third embodiment of the present invention.

FIGS. 34 and 35 show flowcharts of main routine, and in this main routine, the controller 99, the difference absolute value sum calculation circuit 21, the comparing circuit 36 and the vector selecting circuit 37 take initiative for processing operations.

Figure 36:
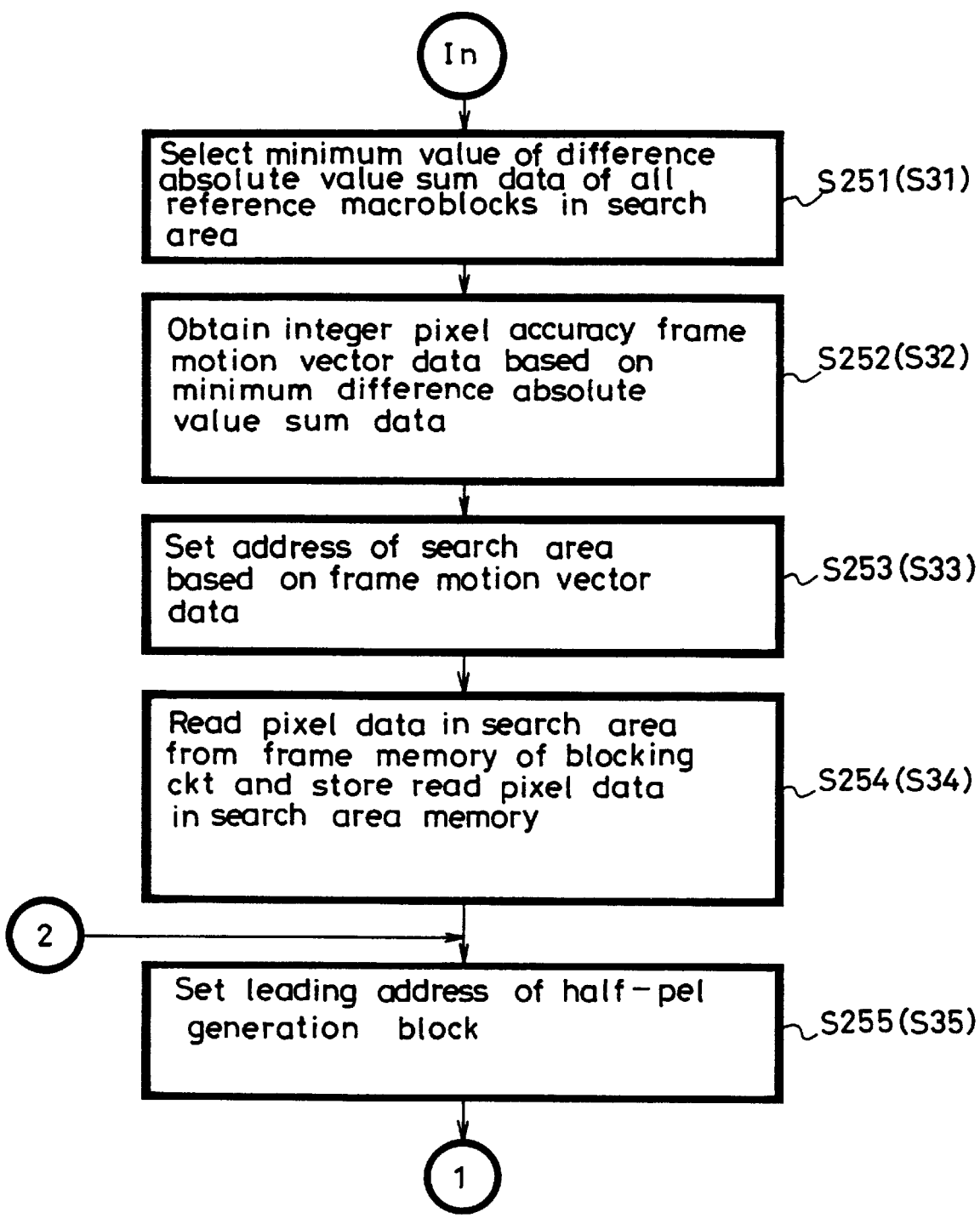
FIG. 36 is a flowchart showing a frame type motion detection routine, and to which reference will be made in explaining a motion detection operation according to the third embodiment of the present invention.
Figure 37:
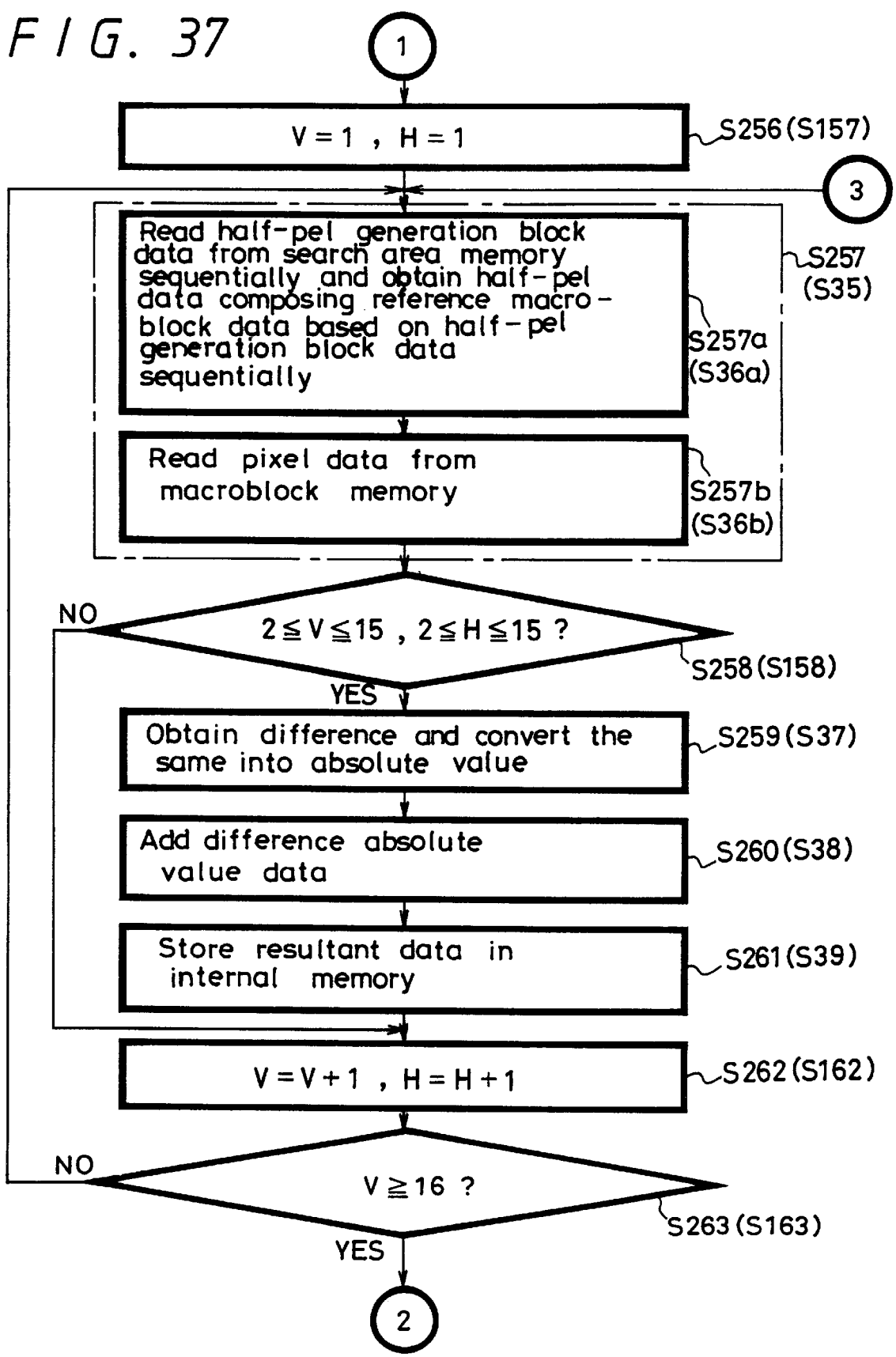
FIG. 37 is a flowchart showing a frame type motion detection routine, and to which reference will be made in explaining a motion detection operation according to the third embodiment of the present invention.
Figure 38:
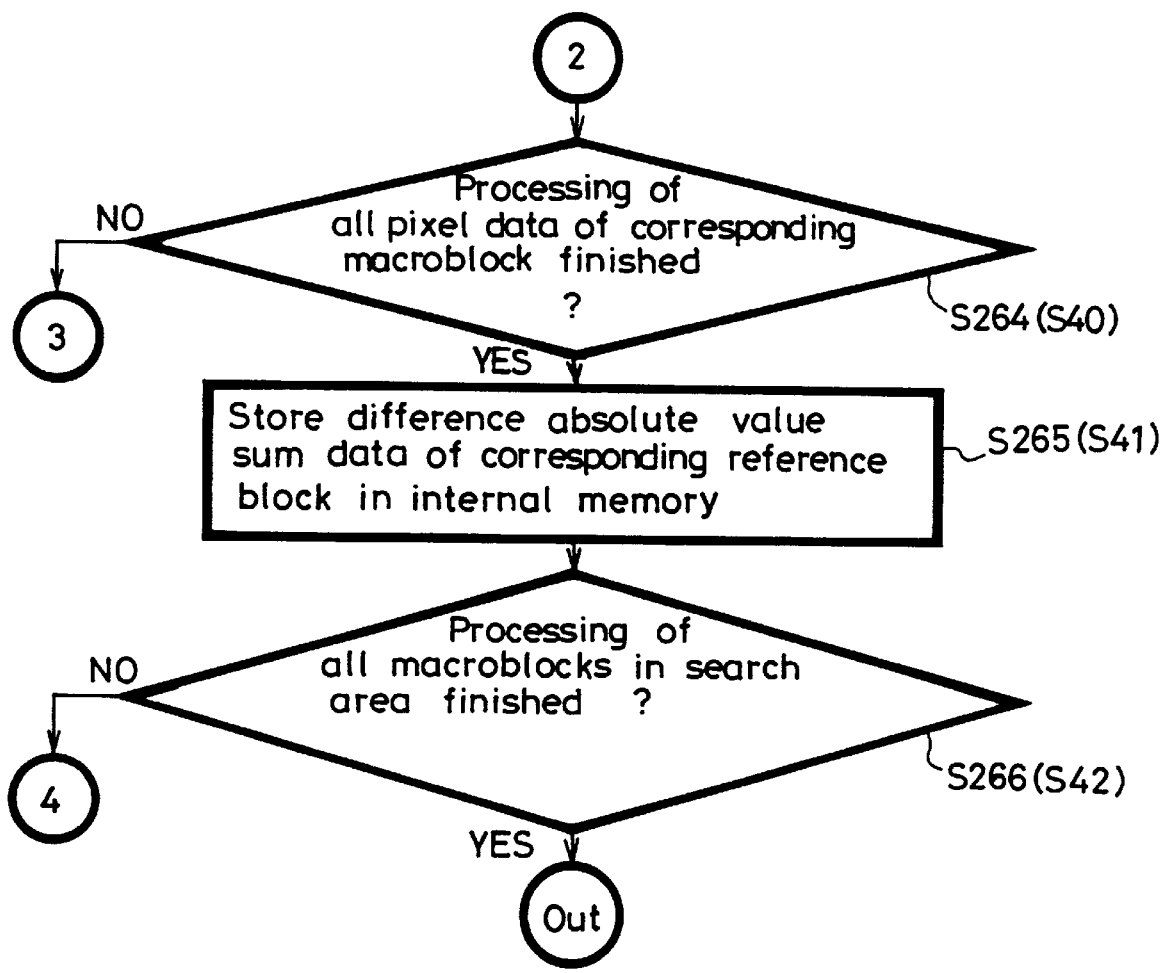
FIG. 38 is a flowchart showing a frame type motion detection routine, and to which reference will be made in explaining a motion detection operation according to the third embodiment of the present invention.

FIGS. 36 to 38 show a frame type motion detection routine S250a shown in FIGS. 34 and 35. In this frame type motion detection routine S250a, the controller 99, the frame type minimum value selecting circuit 23, the half-pel generating circuit 55a, and the frame type half-pel accuracy motion detecting circuit 56a take initiative for the processing operations.

Figure 39:
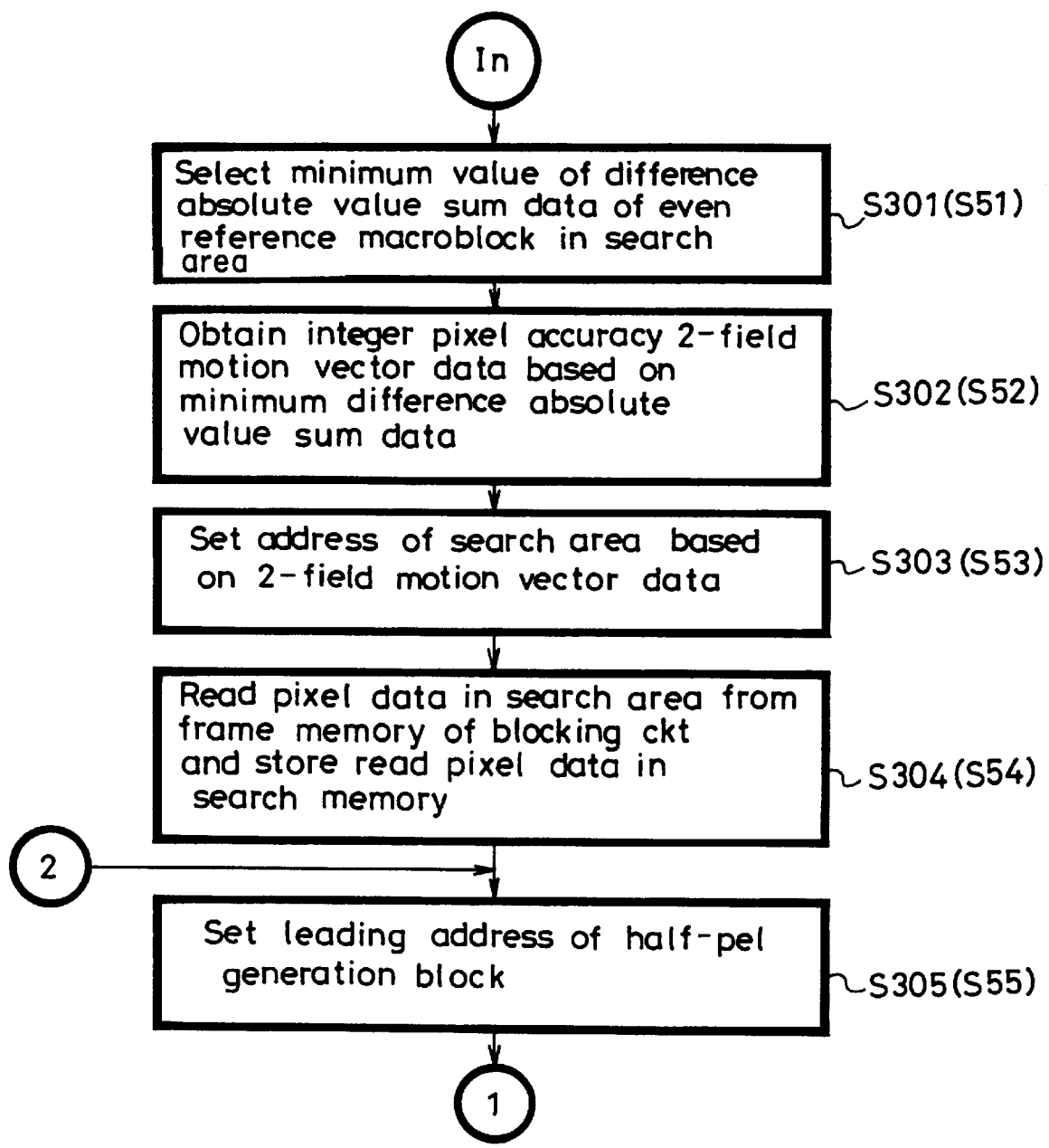
FIG. 39 is a flowchart showing a 2-field type motion detection routine, and to which reference will be made in explaining a motion detection operation according to the third embodiment of the present invention.
Figure 40:
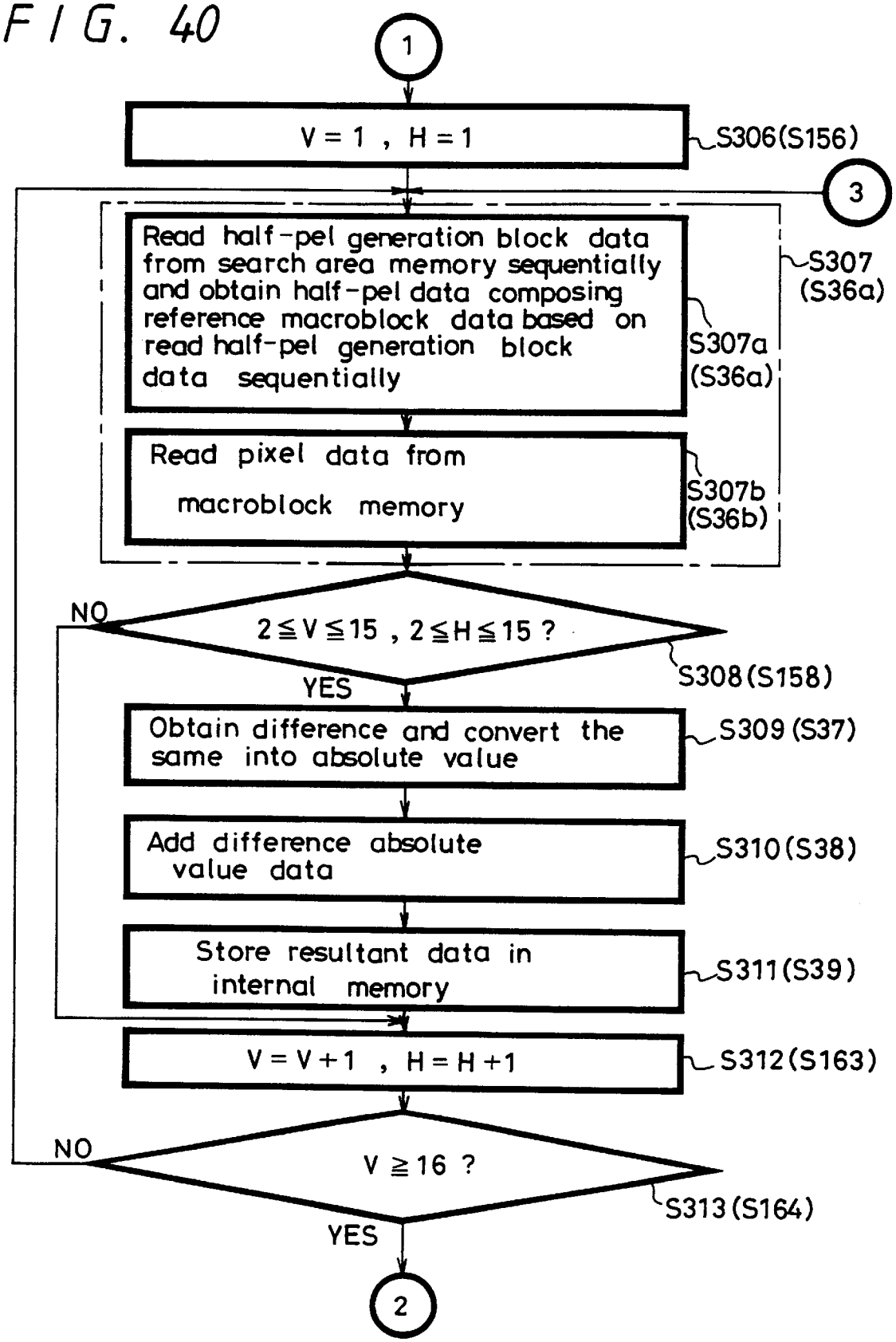
FIG. 40 is a flowchart showing a 2-field type motion detection routine, and to which reference will be made in explaining a motion detection operation according to the third embodiment of the present invention.
Figure 41:
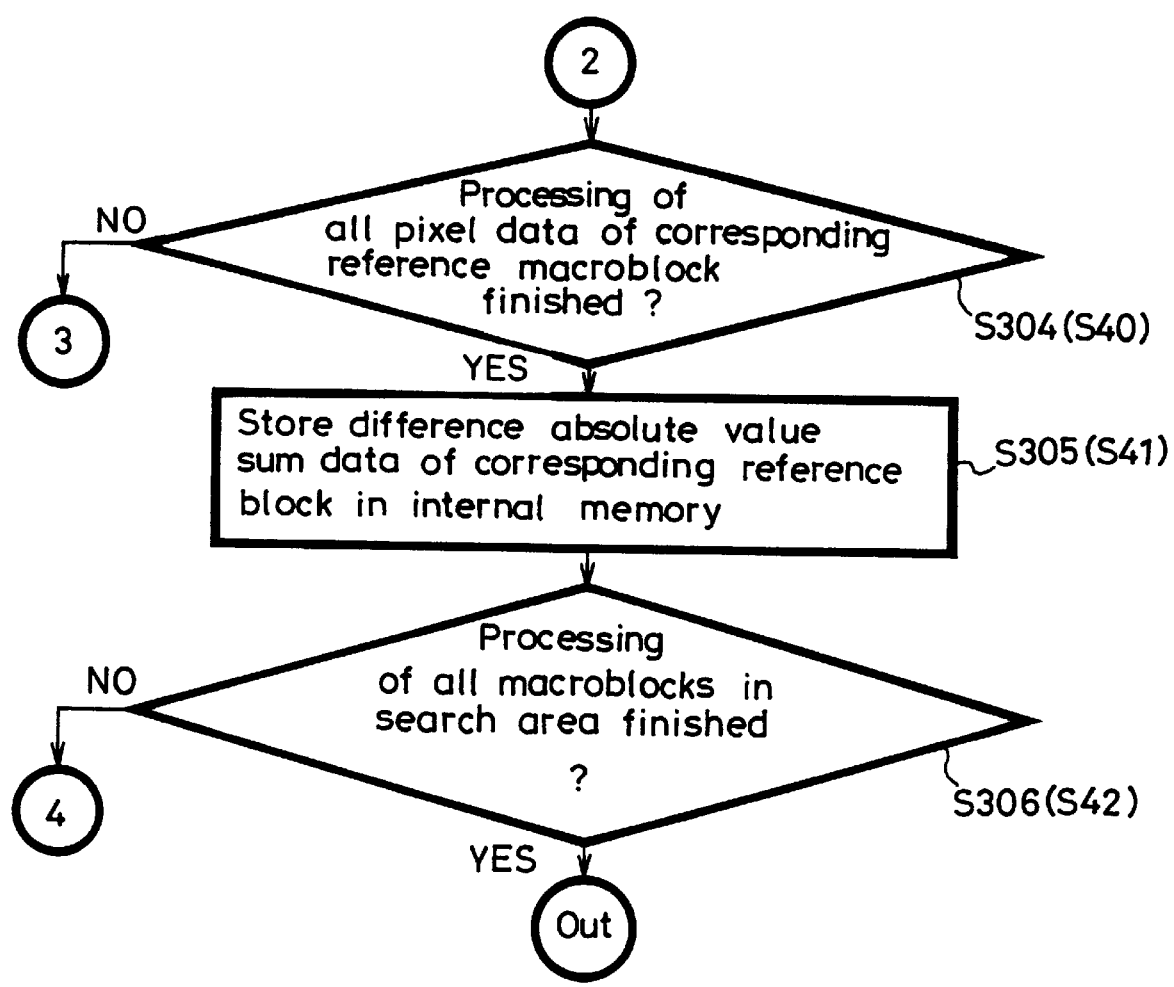
FIG. 41 is a flowchart showing a 2-field type motion detection routine, and to which reference will be made in explaining a motion detection operation according to the third embodiment of the present invention.

FIGS. 39 to 41 show a 2-field type motion detection routine S250b shown in FIGS. 34 and 35. In this 2-field type motion detection routine S250b, the controller 99, the 2-field type minimum value selecting circuit 30, the half-pel generating circuit 55b and the 2-field type half-pel accuracy second motion detecting circuit 56b take initiative for the processing operation.

As described above, according to this embodiment, frame motion vector data MV(Fr) with integer pixel accuracy is obtained on the basis of the minimum difference absolute value sum data of all difference absolute value sum data obtained in the difference absolute value sum calculation in the frame type motion detection. Frame motion vector data mv(Fr) with half-pel accuracy is obtained by effecting the half-pel accuracy frame type motion detection on the basis of the frame motion vector data MV(Fr). Also, integer pixel accuracy 2-field motion vector data MV(2Fi) is obtained on the basis of the minimum difference absolute value sum data of the difference absolute value sum data corresponding to all even-numbered macroblocks in the longitudinal direction of the search area of all difference absolute value sum data obtained in the difference absolute value sum calculation in the integer pixel accuracy frame type motion detection. Then, half-pel accuracy 2-field motion vector data mv(Fi) is obtained by effecting the 2-field type motion detection on the basis of the 2-field motion vector data MV(2Fi). One of the 2-field motion vector data mv(2Fi) and the frame motion vector data (Fr) whose difference absolute value sum data is smaller is selected, and a motion compensation is carried out by use of such vector data.

Further, if the sizes of the macroblock data MB(F)) of the present frame and the macroblock data MB(F-1) of the preceding frame are 16 pixels×16 pixels, for example, a difference absolute value sum calculation is carried out by use of the macroblock data whose size is smaller, e.g., 14 pixels×14 pixels.

Accordingly, in the integer pixel accuracy motion detection, the field type motion detecting circuit and the frame type motion detecting circuit both need not be provided, and only one motion detecting circuit is sufficient. Also, the encoder has only one motion detecting circuit which becomes the largest in circuit scale, and the field type motion detection and the frame type motion detection may be carried out adaptively, thereby making it possible to carry out the accurate and efficient encoding. Unlike the prior art wherein pixel data of 18 pixels×18 pixels have to be read out, according to this embodiment, it is sufficient to read out the pixel data of 16 pixels×16 pixels. Accordingly, the clock frequency, for example, need not be increased, and concurrently therewith, a complex timing control for peripheral circuits need not be carried out, resulting in the arrangement being simplified and the processing speed being increased. Furthermore, as synergism, the motion compensation with high accuracy can be carried out by the simple arrangement and the simple processing, and also accurate and efficient encoding can be carried out.

Figure 42:
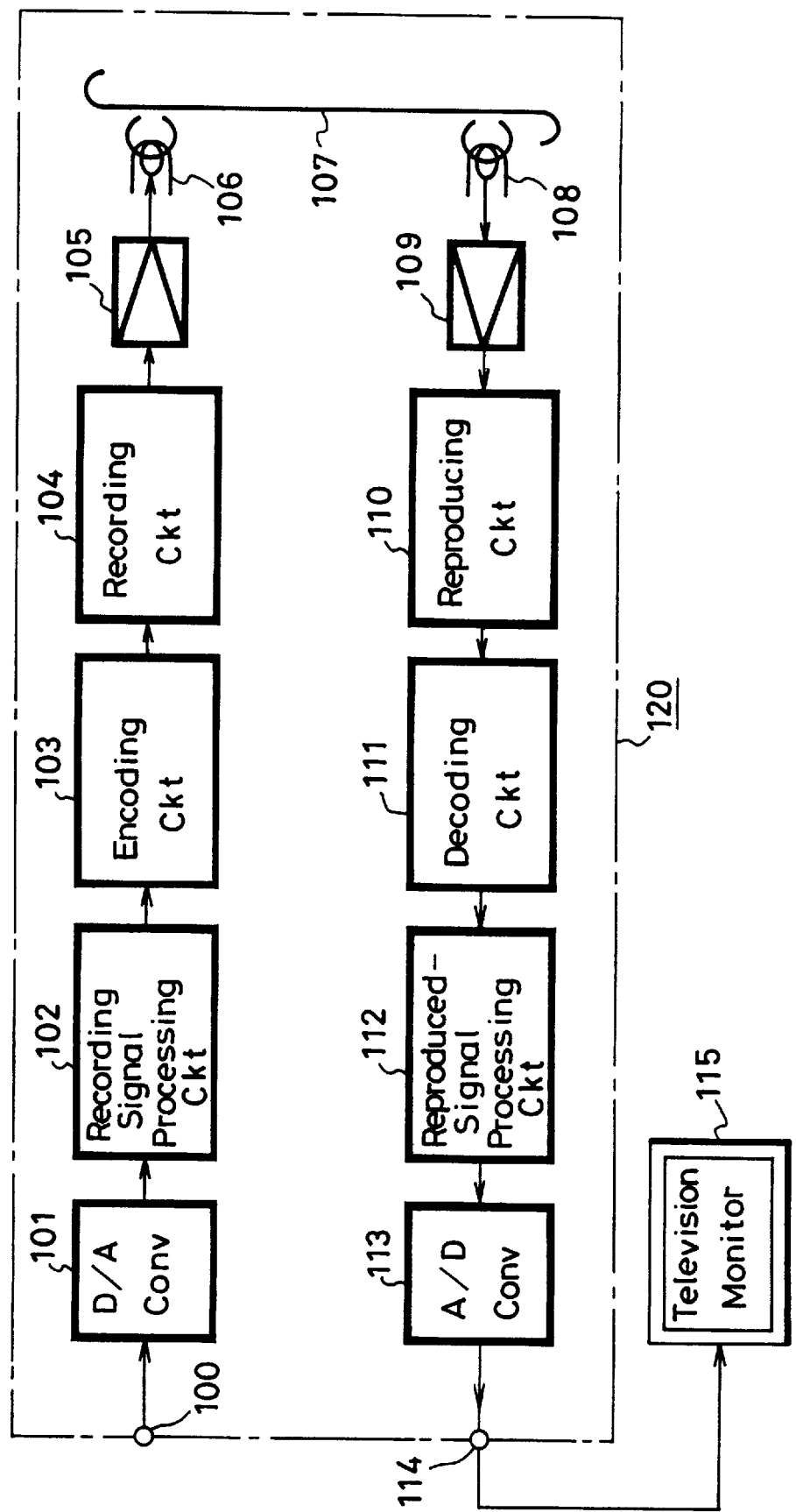
FIG. 42 is a block diagram specifically showing a digital VTR (video tape recorder) to which an encoding circuit shown in FIG. 12 is applied.

A manner in which the encoding circuit according to the present invention is applied to a digital VTR (recording and reproducing apparatus) will be described with reference to FIG. 42. FIG. 42 shows, in block form, an example in which the encoding circuit shown in FIG. 12 is mounted on the recording system of the digital VTR.

In the digital VTR shown in FIG. 42, upon recording, an analog video signal supplied through an input terminal 100 is supplied to and converted by a digital-to-analog (D/A) converter 101 into a digital video signal. This digital video signal is supplied to and processed by a recording signal processing circuit 102 in various manners for recording. An output from the recording signal processing circuit 102 is encoded by an encoding circuit 103, and an encoded output from the encoding circuit 103 is processed by a recording circuit 104 in a suitable recording processing fashion such as digital modulation. An output from the recording circuit 104 is supplied through a recording amplifying circuit 105 to a recording head 106, and a recording signal is recorded on a magnetic tape 107 by the recording head 106 so as to form slant tracks.

Upon reproduction, in the digital VTR, the recording signal recorded on the magnetic tape 107 is reproduced by a reproducing head 108, and a reproduced signal is supplied through a playback amplifying circuit 109 to a reproducing circuit 110, in which it is demodulated, and a demodulated output is supplied to a decoding circuit 111. The reproduced signal is decoded by the decoding circuit 111, and the output from the decoding circuit 111 is processed by a reproduced signal processing circuit 112 in various processing manners for reproduction to provide a digital video signal. This digital video signal is converted by an analog-to-digital (A/D) converter 113 into an analog video signal. This analog video signal is supplied through an output terminal 114 to a television monitor 115 and thereby displayed on a picture screen of the television monitor 115 as an image.

The encoding circuit 103 may become the same in arrangement as that of the encoding circuit shown in FIG. 12, and the above digital VTR may be such one which can record the digital video signal as a component or composite video signal.

As described above, when the encoding circuit shown in FIG. 12 is mounted on the digital VTR, upon recording, the video signal is motion-compensated by the accurate motion detection, encoded, and recorded so that, if the recording signal recorded on the magnetic tape 107 is reproduced, the reproduced signal is supplied to the television monitor 105, and displayed on the picture screen of the television monitor 105 as an image, then a reproducibility of image becomes satisfactory, and the processing and arrangement for recording become simplified. Accordingly, the recording system and the reproducing system can be reduced in circuit scale, thereby making it possible to miniaturize the digital VTR. Furthermore, since the encoding efficiency is excellent, only necessary minimum information can be recorded with the result that an amount of a recording medium consumed upon recording can be minimized.

Figure 43:
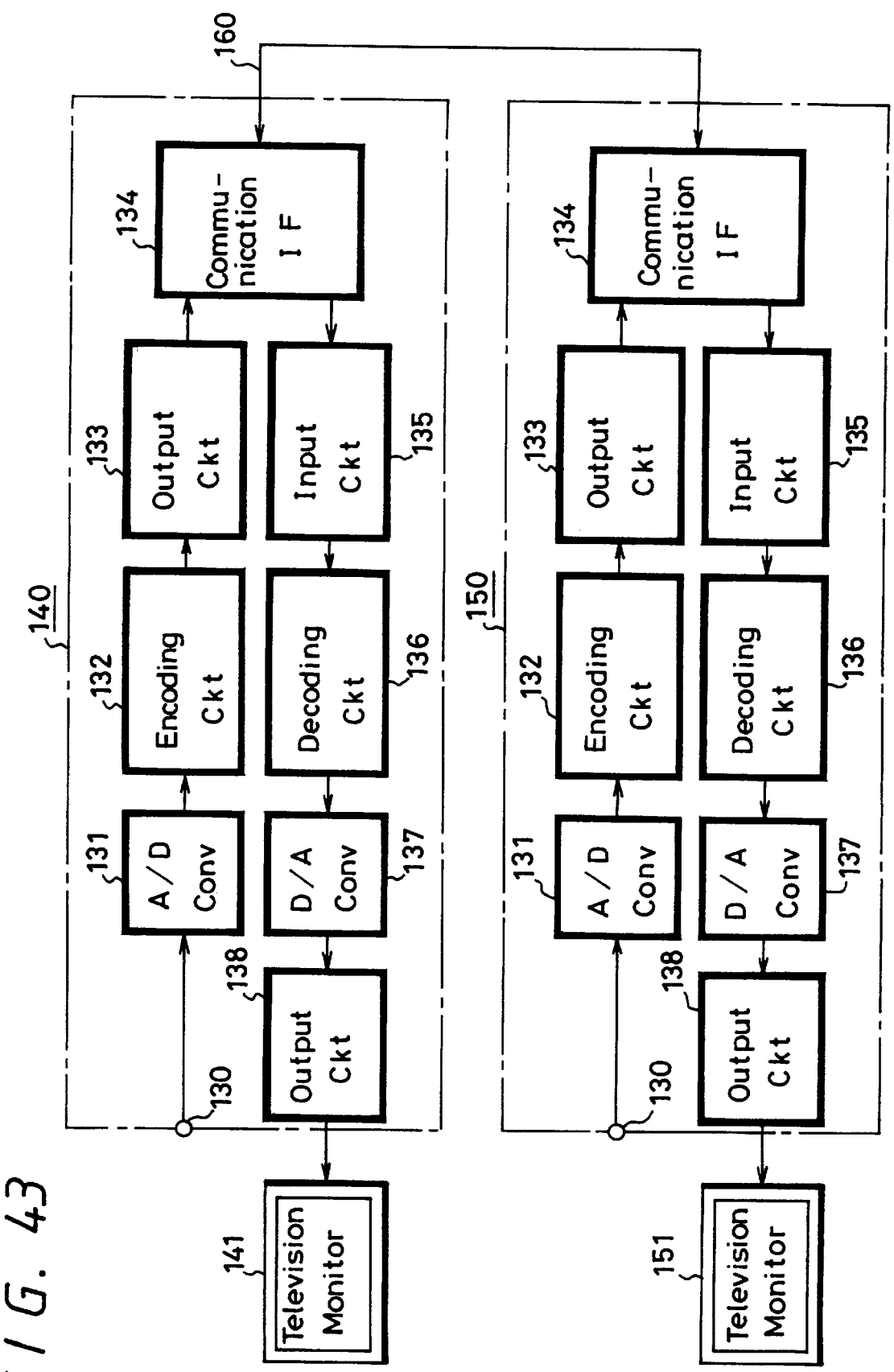
FIG. 43 is a block diagram specifically showing a transmission and reception system to which the encoding circuit shown in FIG. 12 is applied.

A manner in which the encoding circuit according to the present invention is applied to a transmission and reception system (information transmission system) will be described with reference to FIG. 43. FIG. 43 shows, in block form, an example in which the encoding circuit shown in FIG. 12 is applied to the transmission system of the transmission and reception system.

FIG. 43 shows two transmitter and receivers 140, 150 mounted on the transmission system with the encoding circuit shown in FIG. 12 mounted on the transmission system. A television monitor 141 is connected to the transmitter and receiver 140, and a television monitor 151 is connected to the transmitter and receiver 150. The transmitter and receivers 140 and 150 are connected via a cable 160 which is capable of two-ways communication.

In the transmitter and receiver 140, an analog video signal supplied through an input terminal 130 is converted by an A/D converter 131 into a digital video signal, and this digital video signal is encoded by an encoding circuit 132. A signal encoded by the encoding circuit 132 is processed by the output circuit 133, and an output signal from this output circuit 133 is transmitted through a communication interface (communication IF) 134 and the cable 160 to the transmitter and receiver 150. Further, in the transmitter and receiver 140, a transmission signal supplied from the transmitter and receiver 150 through the cable 160 is received through a communication interface (communication IF) 134 and an input circuit 135. A received signal is decoded by a decoding circuit 136 and thereby a digital video signal is obtained. This digital video signal is converted by a D/A converter 137 into an analog video signal, and this analog video signal is supplied through an output circuit 138, which is used to output this analog video signal as a television signal, to the television monitor 151, thereby being outputted on the picture screen of the television monitor 151 as an image. Since the transmitter and receiver 150 is the same in arrangement as the transmitter and receiver 140, elements and parts thereof are marked with the same references and therefore need not be described.

As described above, when the encoding circuit shown in FIG. 12 is applied to the transmission and reception system, the video signal is motion-compensated by the motion detection carried out accurately in the transmission processing, encoded and transmitted. Therefore, if the transmitted signal is received, the received signal is supplied to the television monitor 141 (or 151) and displayed on the picture screen of the television monitor 141 (or 151), a reproducibility of image becomes satisfactory. Further, the processing and arrangement upon transmission can be simplified, the circuit scales of the transmission system and the reception system can be reduced, thereby making it possible to miniaturize the transmission and reception system. Furthermore, since the encoding efficiency is satisfactory, only minimum necessary information can be transmitted, and therefore a communication time can be reduced.

While the present invention is applied to the digital VTR and the transmission and reception system as described above, the principle of the present invention can of course be applied to a digital still camera, a digital video disk player, a color facsimile, a still picture database system or the like. So long as the device is required to encode an image signal, the arrangements shown in FIGS. 12 through 23 may be used with similar effects being achieved.

Further, a software can be easily made by the method shown in FIG. 1. In that case, the software thus made may be installed on a recording medium, such as hard disk of a personal computer and a computer of a work station. An arrangement in that case may be such one in which a video signal processing board, referred to as a "video capture board" having a video signal input terminal and a video signal output terminal is mounted on a computer body, an output terminal of video camera is connected to the input terminal of the video capture board, and an input terminal of a VTR (or transmitter, etc.) is connected to the output terminal of the video capture board.

If the above software is activated, a video signal from the video camera is stored in a memory of the computer through the video capture board, image data stored in the memory is encoded in accordance with the software as described above, and the encoded image data is supplied to the VTR through the video capture board, similar effects can be achieved even by a combination of software, computer and video devices.

According to the high-efficiency coding method of the present invention, a first motion detection is carried out by use of pixel data located within a plurality of reference blocks corresponding to one field of the reference blocks and pixel data located within a remarkable block extracted from the present frame, and first motion vector data can be obtained. In a predetermined area of one field including pixel data locate at the position in the preceding frame indicated by the first motion vector data, interpolation pixel data between pixel data and pixel data are generated to obtain a plurality of interpolation reference blocks, and second motion vector data is obtained by carrying out a second motion detection by use of pixel data located within the interpolation reference blocks and pixel data located within the remarkable block extracted from the present frame. Image information of preceding frame is motion-compensated on the basis of the second motion vector data, and encoding is carried out by calculating a difference between image information of present frame and image information of present frame thus motion-compensated. The first motion detection is effected only on the pixel data located within a plurality of reference blocks corresponding to one field. When interpolation pixels are generated from the second motion detection, a compensation is carried out by use of pixel data corresponding to one field, and the second motion detection is carried out by use of resultant interpolation pixel data. Therefore, as compared with the case that a motion detection is effected on both of even and odd fields, accuracy of motion compensation and processing speed can be increased without increasing the circuit scale. Also, an accurate encoding can be carried out so that information can be transmitted or recorded satisfactorily.

According to the high-efficiency coding apparatus of the present invention, a motion detection is effected by use of a part of pixel data located within a plurality of reference blocks corresponding to one field within a plurality of reference blocks and a part of pixel data located with the remarkable block extracted from the present frame, the image information of preceding frame is motion-compensated on the basis of the motion vector data calculated in the above motion detection, and an encoding is carried out by calculating a difference between the image information of the present frame and the motion-compensated image information of preceding frame. Therefore, a motion detection need not be carried out by use of all pixel data located within the block when a motion detection is carried out. Thus, without modifying the circuit and varying the processing timing, the processing speed of motion compensation can be increased, and information can be transmitted or recorded satisfactorily.

Further, according to the high-efficiency coding apparatus of the present invention, the first motion detecting means obtains the first motion vector data by carrying out a motion detection of pixel data located within reference blocks sequentially set in a predetermined range of the image information of preceding frame stored in the second memory means and pixel data located within the remarkable block in the image data of present frame stored in the first memory means, the second motion detecting means obtains the second motion vector data by carrying out a motion detection of pixel data located within the reference block corresponding to one field in the reference blocks sequentially set within a predetermined range in the image information of preceding frame stored in the second memory means and the pixel data located within the remarkable block in the image information of present frame stored in the first memory means, the third motion detecting means generates the interpolation pixel data between the pixel data and the pixel data within a predetermined area including the pixel data in the image information of preceding frame indicated by the first motion vector data supplied thereto from the first motion detecting means, calculates the difference absolute value sum of the interpolation pixel data located within a plurality of interpolation reference blocks composed of the interpolation pixel data and the pixel data located within the remarkable block, and obtains the third motion vector data based on the first difference absolute value sum data of smallest value from a plurality of difference absolute value sum data obtained by the difference absolute sum value calculation, the fourth motion detecting means generates the interpolation pixel data between the pixel data and the pixel data within a predetermined area of one field including pixel data in the image information of preceding frame indicated by the second motion vector data supplied thereto from the second motion detecting means, calculates difference absolute value sum of the interpolation pixel data located within a plurality of interpolation reference blocks composed of the interpolation pixel data an the pixel data located within the remarkable block, and obtains the fourth motion vector data based on the second difference absolute value sum data of smallest value from a plurality of difference absolute value sum data obtained by the difference absolute value sum calculation, the selecting means the third motion vector data supplied thereto from the third motion detecting means or the fourth motion vector data supplied thereto from the fourth motion detecting means on the basis of compared result of the first difference absolute value sum data from the second motion detecting means and the second difference absolute value sum data from the third motion detecting means, the motion compensating means motion-compensates the image information of preceding frame on the basis of the third motion vector data or the fourth motion vector data supplied thereto from the selecting means, and the encoding means carries out encoding on the basis of the motion-compensated image information of preceding frame supplied thereto from the motion compensating means and the image information of present frame stored in the first memory means. Accordingly, the second motion detection is effected only on the pixel data located within a plurality of reference blocks corresponding to one field. In addition, when interpolation pixel data is generated in order to effect the fourth motion detection, an interpolation is carried out by use of pixel data corresponding to one field, an the fourth detection is carried out by use of resultant interpolation pixel data. Therefore, as compared with the case that a motion detection is effected on both even and odd fields, without increasing the circuit scale, a motion compensation accuracy and a motion compensation processing speed can be increased, and an accurate encoding can be carried out. Thus, information can be transmitted or recorded satisfactorily.

Furthermore, according to the high-efficiency coding apparatus of the present invention, the first motion detecting means obtains the first motion vector data by effecting a motion detection of the pixel data located within the reference blocks sequentially set in the predetermined range of the image information of preceding frame stored in the second memory means and the pixel data located within the remarkable block in the image information of present frame stored in the first memory means, the interpolation pixel generating means generates interpolation pixel data between the pixel data and the pixel data within the predetermined area including the pixel data in the image information of preceding frame indicated by the first motion vector data supplied thereto from the first motion detecting means, the second motion detecting means obtains the second motion vector data by effecting a motion detection of the interpolation pixel data located within a plurality of sub-interpolation reference blocks smaller than the reference blocks composed of the interpolation pixel data supplied thereto from the interpolation pixel generating means, and the pixel data located within the sub-remarkable block smaller than the remarkable block, the motion compensating means motion-compensates the image information of the preceding frame based on the second motion vector data supplied thereto from the second motion detecting means, and the encoding means effects encoding based on the motion-compensated image information of preceding frame supplied thereto from the motion compensating means and the image information of present frame stored in the first memory means. Therefore, when the second motion detection is carried out, all pixels located within the reference block need not be used, and the motion compensation processing speed can be increased without modifying the circuit and varying the processing timing. Thus, information can be transmitted or recorded satisfactorily.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A high-efficiency coding method comprising the steps of:

a block-dividing step for dividing image information extracted from a predetermined area of a preceding frame to provide a plurality of reference block of a predetermined unit at every frame;

a difference absolute value sum calculation step for calculating a difference absolute value sum of pixel data located within said plurality of reference blocks and pixel data located within a remarkable block extracted from a present frame;

a first motion detection step for obtaining first motion vector data based on first difference absolute value sum data of minimum value from a plurality of difference absolute value sum data provided at every plurality of reference blocks;

a second motion detection step for obtaining second motion vector data based on second difference absolute value sum data of minimum value from a plurality of difference absolute value sum data provided at every plurality of reference blocks corresponding to one field located within said plurality of reference blocks;

a comparison step for comparing said first difference absolute value sum data and said second difference absolute value sum data;

a selection step for selecting said first motion vector data or said second motion vector data based on a compared result of said comparison step;

a motion compensation step for motion-compensating image information of said preceding frame based on said first motion vector data or said second motion vector data; and an encoding step for effecting encoding by calculating a difference between said image information of present frame and said motion-compensated image information of preceding frame.

2. A high-efficiency coding method comprising the steps of:

a block-dividing step for dividing image information extracted from a predetermined area of a preceding frame to provide a plurality of reference blocks of a predetermined unit at every frame;

a first motion detection step for obtaining first motion vector data by effecting a first motion detection by use of pixel data located within said plurality of reference blocks and pixel data located within a remarkable block extracted from a present frame;

a second motion detection step for obtaining second motion vector data by effecting a second motion detection by use of pixel data located within said plurality of reference blocks corresponding to one field provided within said plurality of reference blocks and pixel data located within said remarkable block extracted from said present frame;

a first interpolation pixel data generation step for obtaining a plurality of interpolation reference blocks by generating interpolation pixel data between pixel data and pixel data within a predetermined area including pixel data located at positions in said preceding frame indicated by said first motion vector data;

a first difference absolute value sum calculation step for calculating a first difference absolute value sum of pixel data located within said interpolation reference blocks and pixel data located within said remarkable block extracted from said present frame;

a third motion detection step for obtaining third motion vector data based on first difference absolute value sum data of minimum value from a plurality of difference absolute value sum data located at every plurality of interpolation reference blocks;

a second interpolation pixel data generation step for obtaining a plurality of interpolation reference blocks by generating interpolation pixel data between pixel data and pixel data within a predetermined area of one field including pixel data located at positions in said preceding frame indicated by said second motion vector data;

a second difference absolute value sum calculation step for calculating a second difference absolute value sum of pixel data located within said interpolation reference blocks and pixel data located within said remarkable block extracted from said present frame;

a fourth motion detection step for obtaining fourth motion vector data based on second absolute value sum data of minimum value from a plurality of difference absolute value sum data provided at every plurality of interpolation reference blocks;

a comparison step for comparing said first difference absolute value sum data and said second difference absolute value sum data;

a selection step for selecting said third motion vector data or said fourth motion vector data based on a compared result of said comparison step;

a motion-compensation step for motion-compensating said image information of preceding frame based on said third motion vector data or said fourth motion vector data; and an encoding step for effecting encoding by calculating a difference between said image information of present frame and said motion-compensated image information of preceding frame.

3. A high-efficiency coding method comprising the steps of:

a block-dividing step for dividing image information extracted from a predetermined area of preceding frame to provide a plurality of reference blocks of a predetermined unit at every frame;

a first motion detection step for obtaining first motion vector data by effecting a first motion detection by use of pixel data located within said plurality of reference blocks and pixel data located within a remarkable block extracted from a present frame;

a second motion detection step for obtaining second motion vector data by effecting a second motion detection by use of pixel data located within a plurality of reference blocks corresponding to one field of said plurality of reference blocks and pixel data located within said remarkable block extracted from said present frame;

a first interpolation pixel data generation step for obtaining a plurality of interpolation reference blocks by generating interpolation pixel data between pixel data and pixel data within a predetermined area including pixel data located at positions in said preceding frame indicated by said first motion vector data;

a first difference absolute value sum calculation step for calculating a first difference absolute value sum calculation by use of pixel data located within said interpolation reference blocks and pixel data located within said remarkable block extracted from said present frame;

a third motion detection step for obtaining third motion vector data based on first difference absolute value sum data of minimum value from a plurality of difference absolute value sum data located at every plurality of interpolation reference blocks;

a second interpolation pixel data generation step for obtaining a plurality of interpolation reference blocks by generating interpolation pixel data between pixel data and pixel data within a predetermined area of one field including pixel data located positions in said preceding frame indicated by said second motion vector data;

a second difference absolute value sum calculation step for effecting a second difference absolute value sum calculation by use of a part of pixel data located within said interpolation reference blocks and a part of pixel data located within said remarkable block extracted from said present frame;

a fourth motion detection step for obtaining fourth motion vector data based on second difference absolute value sum data of minimum value from a plurality of difference absolute value sum data located at every plurality of interpolation reference blocks;

a comparison step for comparing said first difference absolute value sum data and said second difference absolute value sum data;

a selection step for selecting said third motion vector data or said fourth motion vector data based on a compared result of said comparison step;

a motion compensation step for motion-compensating said image information of preceding frame based on said third motion vector data or said fourth motion vector data; and an encoding step for effecting encoding by calculating a difference between said image information of present frame and said image information of preceding frame.

4. A high-efficiency coding apparatus comprising:

first memory means for storing image information of present frame to be encoded therein;

second memory means for storing image information of preceding frame therein;

first motion detecting means for obtaining first motion vector data by effecting a motion detection by use of pixel data located within reference blocks sequentially set within a predetermined range of said image information of preceding frame stored in said second memory means and pixel data located within a remarkable block in said image information of present frame stored in said first memory means;

second motion detecting means for obtaining second motion vector data by effecting a motion detection by use of pixel data located within reference blocks corresponding to one field of reference blocks sequentially set within a predetermined range of said image information of preceding frame stored in said second memory means and pixel data located within said remarkable block of said image information of present frame stored in said first memory means;

third motion detecting means for generating interpolation pixel data between pixel data and pixel data within a predetermined area including pixel data in said image information of preceding frame indicated by said first motion vector data supplied thereto from said first motion detecting means, calculating difference absolute value sum of interpolation pixel data located within a plurality of interpolation reference blocks composed of said interpolation pixel data and pixel data located within said remarkable block, and obtaining third motion vector data based on first difference absolute value sum data of minimum value from a plurality of difference absolute value sum data obtained by said difference absolute value sum calculation;

fourth motion detecting means for generating interpolation pixel data between pixel data and pixel data within a predetermined area of said one field including pixel data located in said image information of preceding frame indicated by said second motion vector data from said second motion detecting means, calculating difference absolute value sum of interpolation pixel data located within a plurality of interpolation reference blocks composed of said interpolation pixel data and pixel data located within said remarkable block, and obtaining fourth motion vector data based on second difference absolute value sum data of minimum value from a plurality of difference absolute value sum data obtained by said difference absolute value sum calculation;

selecting means for selecting said third motion vector data supplied thereto from said third motion detecting means or said fourth motion vector data supplied thereto from said fourth motion detecting means based on a compared result of said first difference absolute value sum data supplied thereto from said second motion detecting means and said second difference absolute value sum data supplied thereto from said third motion detecting means;

motion compensating means for motion-compensating said image information of preceding frame based on said third motion vector data or said fourth motion vector data supplied thereto from said selecting means; and encoding means for effecting encoding based on said motion-compensated image information of preceding frame supplied thereto from said motion compensating means and said image information of present frame stored in said memory means.

5. A high-efficiency coding apparatus comprising:

first memory means for storing image information of present frame to be encoded therein;

second memory means for storing image information of preceding frame therein;

first difference absolute value sum calculating means for calculating difference absolute value sum of pixel data located within reference blocks sequentially set within a predetermined range of said image information of preceding frame stored in said second memory means and pixel data located within a remarkable block in said image information of present frame stored in said first memory means;

first minimum value selecting means for obtaining first motion vector data based on first difference absolute value sum data of minimum value from a plurality of difference absolute value sum data supplied thereto from said first difference absolute value sum calculating means;

second minimum value selecting means for obtaining second motion vector data based on second difference absolute value sum data of minimum value of difference absolute value sum data which result from calculating difference absolute value sum of pixel data located within a reference block corresponding to one field corresponding to reference blocks sequentially set within a predetermined range of said image information of preceding frame stored in said second memory means and pixel data located within said remarkable block in said image information of present frame of a plurality of difference absolute value sum data supplied thereto from said first difference absolute value sum calculating means;

first interpolation pixel generating means for generating interpolation pixel data between pixel data and pixel data within a predetermined area including pixel data in said image information of preceding frame indicated by said first motion vector data supplied thereto from said first minimum value selecting means;

second difference absolute value sum calculating means for calculating difference absolute value sum of interpolation pixel data located within a plurality of interpolation reference blocks composed of interpolation pixel data supplied thereto from said first interpolation pixel generating means and pixel data located within said remarkable block;

third minimum value selecting means for obtaining third motion vector data based on third difference absolute value sum data of minimum value from a plurality of difference absolute value sum data supplied thereto from said second difference absolute value sum calculating means;

second interpolation pixel generating means for generating interpolation pixel data between pixel data and pixel data within a predetermined area including pixel data located in said image information of preceding frame indicated by said second vector data supplied thereto from said second minimum value selecting means;

third difference absolute value sum calculating means for calculating difference absolute value sum of interpolation pixel data located within a plurality of interpolation reference blocks composed of interpolation pixel data supplied thereto from said second interpolation pixel generating means;

fourth minimum value selecting means for obtaining fourth motion vector data based on fourth difference absolute value sum data of minimum value from a plurality of difference absolute value sum data obtained by said third difference absolute value calculating means;

comparing means for comparing said third difference absolute value sum data supplied thereto from said third minimum value selecting means and said fourth difference absolute value sum data supplied thereto from said fourth minimum value selecting means;

selecting means for selecting said third motion vector data supplied thereto from said third minimum value selecting means or said fourth motion vector data supplied thereto from said minimum value selecting means based on a compared result of said comparing means;

motion compensating means for motion-compensating said image information of preceding frame based on said third motion vector data or said fourth motion vector data supplied thereto from said selecting means; and encoding means for effecting encoding based on said motion-compensated image information of preceding frame supplied thereto from said motion compensating means and image information of present frame stored in said first memory means.

6. A high-efficiency coding apparatus comprising:

first memory means for storing image information of present frame to be encoded therein;

second memory means for storing image information of preceding frame;

first difference absolute value sum calculating means for calculating difference absolute value sum of pixel data located within reference blocks sequentially set within a predetermined range of said image information of preceding frame stored in said second memory means, and pixel data located within a remarkable block in said image information of preceding frame stored in said memory means;

first minimum value selecting means for obtaining first integer pixel accuracy motion vector data based on first difference absolute value sum data of minimum value from a plurality of difference absolute value sum data supplied thereto from said difference absolute value sum calculating means;

second minimum value selecting means for obtaining second integer pixel accuracy motion vector data based on second difference absolute value sum data of minimum value in difference absolute value sum data which result from calculating difference absolute value sum of pixel data located within reference block corresponding to one field located within reference blocks sequentially set within a predetermined range in said image information of preceding frame stored in said second memory means and pixel data located within the remarkable block of said image information of present frame stored in said first memory means from a plurality of difference absolute value sum data supplied thereto from said first difference absolute value sum calculating means;

first interpolation pixel generating means for generating interpolation pixel data between pixel data and pixel data within a predetermined area including pixel data in said image information of preceding frame indicated by said first integer pixel accuracy motion vector data supplied thereto from said first minimum value selecting means;

first motion detecting means for calculating difference absolute value sum of interpolation pixel data located within sub-interpolation reference block smaller than a plurality of interpolation reference block composed of interpolation pixel data from said first interpolation pixel generating means and pixel data located within sub-remarkable block smaller than said remarkable block, and obtaining first half-pel accuracy motion vector data baaed on third difference absolute value sum data of minimum value of a plurality of difference absolute value sum data obtained by said difference absolute value sum calculation;

second interpolation pixel generating means for generating interpolation pixel data between pixel data and pixel data within a predetermined area including pixel data located in said image information of preceding frame indicated by said second integer pixel accuracy motion vector data supplied thereto from said second minimum value selecting means;

second motion detecting means for calculating difference absolute value sum of interpolation pixel data located within a sub-interpolation reference block smaller than a plurality said interpolation reference blocks supplied thereto from said second interpolation pixel generating means and pixel data located within a sub-remarkable block smaller than said remarkable block, and obtaining second half-pel accuracy motion vector data based on fourth difference absolute value sum data of minimum value from a plurality of difference absolute value sum data obtained by said difference absolute value sum calculation;

comparing means for comparing said third difference absolute value sum data supplied thereto from said first motion detecting means and said fourth difference absolute value sum data supplied thereto from said second motion detecting means;

selecting means for selecting said first half-pel accuracy motion vector data from said first motion detecting circuit or said second half-pel accuracy motion vector data supplied thereto from said second motion detecting means based on a compared result of said comparing means;

motion compensating means for motion-compensating said image information of preceding frame based on said half-pel accuracy motion vector or said second half-pel accuracy motion vector data supplied thereto from said selecting means; and encoding means for effecting encoding based on said motion-compensated image information of preceding frame supplied thereto from said motion compensating means and said image information of present frame stored in said first memory means.

7. A high-efficiency coding apparatus according to claim 6, wherein said first and second interpolation pixel generating means comprise a plurality of systems each composed of a plurality of delay circuits and adding circuits whose number is the same as that of said reference blocks for generating interpolation pixel data of a plurality of reference blocks from said image information of preceding frame supplied thereto from said second memory means, and averaging means provided at last stages of said plurality of systems, and said third and fourth motion detecting means comprise a plurality of difference absolute value sum calculating means for calculating difference absolute value sum of respective output from said plurality of averaging means and said remarkable block pixel data supplied thereto from said first memory means, and minimum value selecting means for obtaining motion vector data based on difference absolute value sum data of minimum value from a plurality of difference absolute value sum data supplied thereto from said plurality of difference absolute value sum calculating means.

8. A recording and reproducing apparatus comprising:

first memory means for storing image information of present frame to be encoded therein;

second memory means for storing image information of preceding frame therein;

first motion detecting means for obtaining first motion vector data by effecting a motion detection by use of pixel data located within reference blocks sequentially set within a predetermined range in said image information of preceding frame stored in said second memory means, and pixel data located within a remarkable block in said image information of preceding frame stored in said first memory means;

second motion detecting means for obtaining second motion vector data by effecting a motion detection by use of pixel data located within reference block corresponding to one field of reference blocks sequentially set within a predetermined range in said image information of preceding frame stored in said second memory means, and pixel data located within a remarkable block in said image information of present frame stored in said first memory means;

third motion detecting means for generating interpolation pixel data between pixel data and pixel data within a predetermined area including pixel data located in said image information of preceding frame indicated by said first motion vector data supplied thereto from said first motion detecting means, calculating difference absolute value sum of interpolation pixel data located within a plurality of interpolation reference blocks composed of said interpolation pixel data and pixel data located within said remarkable block, and obtaining third motion vector data based on first difference absolute value sum data of minimum value from a plurality of difference absolute value sum data obtained by said difference absolute value sum calculation;

fourth motion detecting means for generating interpolation pixel data between pixel data and pixel data within a predetermined area of one field including pixel data located in said image information of preceding frame indicated by said second motion vector data supplied thereto from said first motion detecting means, calculating difference absolute value sum of interpolation pixel data located within a plurality of interpolation reference blocks composed of said interpolation pixel data, and pixel data located within said remarkable block, and obtaining fourth motion vector data based on second difference absolute value sum data of minimum value from a plurality of difference absolute sum value data obtained by said difference absolute value sum calculation;

selecting means for selecting said third motion vector data supplied thereto from said third motion detecting means or said fourth motion vector data supplied thereto from said fourth motion detecting means based on a compared result of said second difference absolute value sum data supplied thereto from said second motion detecting means, and said third difference absolute value sum data supplied thereto from said third motion detecting means;

motion compensating means for motion-compensating said image information of preceding frame based on said third motion vector data or said fourth motion vector data supplied thereto from said selecting means;

encoding means for effecting encoding based on said motion-compensated image information of preceding frame supplied thereto from said motion compensating means, and said image information of present frame stored in said first memory means;

recording means for recording an output from said encoding means on a recording medium;

reproducing means for reproducing recording information recorded on said recording medium;

decoding means for decoding a reproduced output from said reproducing means; and reproduced signal processing means for reproduced-signal-processing an output supplied thereto from said decoding means.

9. A recording and reproducing apparatus comprising:

recording signal processing means for processing image information to be recorded for recording;

first memory means for storing image information of present frame to be encoded therein;

second memory means for storing image information of preceding frame therein;

first difference absolute value sum calculating means for calculating difference absolute value sum of pixel data located within reference blocks sequentially set within a predetermined range in said image information of preceding frame stored in said second memory means, and pixel data located within a remarkable block in said image information of present frame stored in said first memory means;

first minimum value selecting means for obtaining first motion vector data based on first difference absolute value sum data of minimum value from a plurality of difference absolute value sum data supplied thereto from said difference absolute value sum calculating means;

second minimum value selecting means for obtaining second motion vector data based on second difference absolute value sum data of minimum value of difference absolute value sum data which result from calculating difference absolute value sum of pixel data located within reference block corresponding to one field of reference blocks sequentially set within a predetermined range of said image information of preceding frame stored in said second memory means and pixel data located within a remarkable block in said image information of present frame stored in said memory means of a plurality of difference absolute value sum data supplied thereto from said first difference absolute value sum calculating means;

first interpolation pixel generating means for generating interpolation pixel data between pixel data and pixel data within a predetermined area including pixel data in said image information of preceding frame indicated by said first motion vector data supplied thereto from said first minimum value selecting means;

second difference absolute value sum calculating means for calculating difference absolute value sum of interpolation pixel data located within a plurality of interpolation reference blocks composed of interpolation pixel data supplied thereto from said first interpolation pixel generating means, and pixel data located within said remarkable block;

third minimum value selecting means for obtaining third motion vector data based on third difference absolute value sum data of minimum value of a plurality of difference absolute value sum data supplied thereto from said second difference absolute value sum calculating means;

second interpolation pixel generating means for generating interpolation pixel data between pixel data and pixel data within a predetermined area of one field including pixel data in said image information of preceding frame indicated by said second motion vector data supplied from said second minimum value selecting means;

third difference absolute value sum calculating means for calculating difference absolute value sum of interpolation pixel data located within a plurality of interpolation pixel data supplied thereto from said second interpolation pixel generating means and pixel data located within said remarkable block;

fourth minimum value selecting means for obtaining fourth motion vector data based on fourth difference absolute value sum data of minimum value from a plurality of difference absolute value sum data obtained by said third difference absolute value calculating means;

comparing means for comparing said third difference absolute value sum data supplied thereto from said third minimum value selecting means, and said fourth difference absolute value sum data supplied thereto from said fourth minimum value selecting means;

selecting means for selecting said third motion vector data supplied thereto from said third minimum value selecting means and said fourth motion vector data supplied thereto from said fourth minimum value selecting means based on a compared result from said comparing means;

motion compensating means for motion-compensating said preceding frame image information based on said third motion vector data or said fourth motion vector data supplied thereto from said selecting means;

encoding means for effecting encoding based on said motion-compensated preceding frame image information supplied thereto from said motion compensating means and said present frame image information stored in said first memory means;

recording means for recording an output from said encoding means on a recording medium;

reproducing means for reproducing recorded information from said recording medium;

decoding means for decoding a reproduced output supplied thereto from said reproducing means; and reproduced signal processing means for reproduced-signal-processing an output supplied thereto from said decoding means.

10. A recording and reproducing apparatus comprising:

recording-signal-processing means for processing recorded image information for recording;

first memory means for storing encoded image information of present frame;

second memory means for storing image information of preceding frame;

first difference value sum calculating means for calculating difference absolute value sum of pixel data located within reference blocks sequentially set within a predetermined range of image information of preceding frame stored in said second memory means, and pixel data located within a remarkable block of said image information of preceding frame stored in said first memory means;

first minimum value selecting means for obtaining motion vector data of first integer pixel accuracy based on first difference absolute value sum data of smallest value of a plurality of difference absolute value sum data supplied thereto from said difference absolute value sum calculating means;

second minimum value selecting means for obtaining motion vector data of second integer pixel accuracy based on second difference absolute value sum data of smallest value of difference absolute value sum data which result from calculating difference absolute value sum of pixel data located within a reference block corresponding to one field of reference blocks sequentially set within a predetermined range in image information of preceding frame stored in said second memory means and pixel data located within a remarkable block in said image information of present frame stored in said first memory means of a plurality of difference absolute value sum data supplied thereto from said first difference absolute value sum calculating means;

first interpolation pixel generating means for generating interpolation pixel data between pixel data and pixel data within a predetermined area including pixel data in said image information of preceding frame indicated by said motion vector data of first integer pixel accuracy supplied thereto from said first minimum value selecting means;

first motion detecting means for calculating difference absolute value sum of interpolation pixel data located within a sub-interpolation reference block smaller than said plurality of interpolation reference blocks composed of said interpolation pixel data supplied thereto from said first interpolation pixel generating means, and pixel data located within a sub-remarkable block smaller than said remarkable block, and obtaining motion vector data of first half-pel accuracy based on third difference absolute value sum data of smallest value of a plurality of difference absolute value sum data obtained by said difference absolute value sum calculation;

second interpolation pixel generating means for generating interpolation pixel data between pixel data and pixel data within a predetermined area of one field including pixel data located in said image information of preceding frame indicated by said motion vector data of second integer pixel accuracy supplied thereto from said second minimum value selecting means;

second motion detecting means for calculating difference absolute value sum of interpolation pixel data located within a sub-interpolation reference block smaller than said plurality of interpolation reference blocks composed of interpolation pixel data supplied thereto from said second interpolation pixel generating means and pixel data located within a sub-remarkable block smaller than said remarkable block, and obtaining motion vector data of second half-pel accuracy based on fourth difference absolute value sum data of smallest value of said plurality of difference absolute value sum data obtained by said difference absolute value sum calculation;

comparing means for comparing said third difference absolute value sum data supplied thereto from said first motion detecting means and said fourth difference absolute value sum data supplied thereto from said second motion detecting means;

selecting means for selecting said motion vector data of first half-pel accuracy supplied thereto from said first motion detecting means or said motion vector data of second half-pel accuracy supplied thereto from said second motion detecting means based on a compared result from said comparing means;

motion compensating means for motion-compensating said image information of preceding frame based on said third motion vector data or said fourth motion vector data supplied thereto from said selecting means;

encoding means for effecting encoding based on said motion-compensated image information of preceding frame supplied thereto from said motion compensating means and said image information of present frame stored in said first memory means;

recording means for recording an output from said encoding means on a recording medium;

reproducing means for reproducing recorded information from said recording medium;

decoding means for decoding a reproduced output supplied thereto from said reproducing means; and reproduced-signal-processing means for reproduced-signal-processing an output supplied thereto from said decoding means.

11. A recording and reproducing apparatus according to claim 10, wherein said first and second interpolation generating means comprise systems a plurality of delay circuits and adding circuits whose number is the same as that of said reference blocks for generating interpolation pixel data of said plurality of reference blocks from said image information of preceding frame supplied thereto from said second memory means, and averaging means provided at respective last stages of said plurality of systems, and said third and fourth motion detecting means comprise a plurality of difference absolute value sum calculating means for calculating difference absolute value sum of respective outputs of said plurality of averaging means and pixel data of said remarkable block supplied thereto from said first memory mean only during a predetermined period, and minimum value selecting means for obtaining motion vector data based on difference absolute value sum data of smallest value of a plurality of difference absolute value sum data supplied thereto from said plurality of difference absolute value sum calculating means.

12. An information transmission system comprising:

first memory means for storing encoded image information of present frame therein;

second memory means for storing image information of preceding frame therein;

first motion detecting means for obtaining first motion vector data by effecting a motion detection of pixel data located within reference blocks sequentially set within a predetermined range of said image information of preceding frame stored in said second memory means, and pixel data located within a remarkable block in said image information of present frame stored in said first memory means;

second motion detecting means for obtaining second motion vector data by effecting a motion detection of pixel data located within a reference block corresponding to one field located within reference blocks sequentially set within a predetermined range of said image information of preceding frame stored in said second memory means, and pixel data located within a remarkable block in said image information of present frame stored in said first memory means;

third motion detecting means for generating interpolation pixel data between pixel data and pixel data within a predetermined area including pixel data in said image information of preceding frame indicated by said first motion vector data supplied thereto from said first motion detecting means, calculating difference absolute value sum of interpolation pixel data located within a plurality of interpolation reference blocks, and obtaining third motion vector data based on first difference absolute value sum data of smallest value of a plurality of difference absolute value sum data obtained by said difference absolute value sum calculation;

fourth motion detecting means for generating interpolation pixel data between pixel data and pixel data located within a predetermined area of one field including pixel data in said image information of preceding frame indicated by said second motion vector data supplied thereto from said first motion detecting means, calculating difference absolute value sum of interpolation pixel data located within a plurality of reference blocks composed of said interpolation pixel data and pixel data located within said remarkable block, and obtaining fourth motion vector data based on second difference absolute value sum data of smallest value of a plurality of difference absolute value sum data obtained by said difference absolute value sum calculation;

selecting means for selecting said third motion vector data supplied thereto from said third motion detecting means or said fourth motion vector data supplied thereto from said fourth motion detecting means based on a compared result of said second difference absolute value sum data supplied thereto from said second motion detecting means and said third difference absolute value sum data supplied thereto from said third motion detecting means;

motion compensating means for motion-compensating said image information of preceding frame based on aid third motion vector data or said fourth motion vector data supplied thereto from said selecting means;

encoding means for effecting encoding based on said motion-compensated image information of preceding frame supplied thereto from said motion compensating means, and said image information of present frame stored in said first memory means;

transmitting means for transmitting an output supplied thereto from said encoding means; and decoding means for decoding said information transmitted.

13. An information transmission system comprising:

first memory means for storing encoded image information of present frame therein;

second memory means for storing image information of preceding frame therein;

first difference absolute value calculating means for calculating difference absolute value sum of pixel data located within reference blocks sequentially set within a predetermined range of said image information of preceding frame stored in said second memory means, and pixel data located within a remarkable block in said image information of present frame;

first minimum value selecting means for obtaining first motion vector data based on first difference absolute value sum data of smallest value of a plurality of difference absolute value sum data supplied thereto from said difference absolute value sum calculating means;

second minimum value selecting means for obtaining second motion vector data based on second difference absolute value sum data of smallest value located within difference absolute value sum data which result from calculating difference absolute value sum of pixel data located within a reference block corresponding to one field of reference blocks sequentially set within a predetermined range of said image information of preceding frame stored in said second memory means, and pixel data located within said remarkable block in said image information of present frame stored in said first memory means of a plurality of difference absolute value sum data supplied thereto from said first difference absolute value sum calculating means;

first interpolation pixel generating means for generating interpolation pixel data between pixel data and pixel data within a predetermined area including pixel data located in said image information of preceding frame indicated by said first motion vector data supplied thereto from said first minimum value selecting means;

second difference absolute value sum calculating means for calculating difference absolute value sum calculation of interpolation pixel data located with a plurality of interpolation reference blocks composed of said interpolation pixel data supplied thereto from said first interpolation pixel generating means, and pixel data located within said remarkable block;

third minimum value selecting means for obtaining third motion vector data based on third difference absolute value sum data of smallest value of a plurality of difference absolute value sum data supplied thereto from said second difference absolute value sum calculating means;

second interpolation pixel generating means for generating interpolation pixel data between pixel data and pixel data within a predetermined area of one field including pixel data located in said image information of preceding frame indicated by said second motion vector data supplied thereto from said second minimum value selecting means;

third difference absolute value sum calculating means for calculating difference absolute value sum of interpolation pixel data located within a plurality of interpolation reference blocks composed of interpolation pixel data supplied thereto from said second interpolation pixel generating means, and pixel data located within said remarkable block;

fourth minimum value selecting means for obtaining fourth motion vector data based on fourth difference absolute value sum data of smallest value of a plurality of difference absolute value sum data obtained by said third difference absolute value sum calculating means;

comparing means for comparing said third difference absolute value sum data supplied thereto from said third minimum value selecting means and said fourth difference absolute value sum data supplied thereto from said fourth minimum value selecting means;

selecting means for selecting said third motion vector data supplied thereto from said third minimum value selecting means or said fourth motion vector data supplied thereto from said fourth minimum value selecting means;

motion compensating means for motion-compensating said image information of preceding frame based on said third motion vector data or said fourth motion vector data supplied thereto from said selecting means;

encoding means for effecting encoding based on said motion-compensated image information of preceding frame supplied thereto from said motion compensating means and said image information of present frame stored in said first memory means;

transmitting means for transmitting an output supplied thereto from said encoding means; and decoding means for decoding transmitted information.

14. An information transmission system comprising:

first memory means for storing image information of present frame to be encoded therein;

second memory means for storing image information of preceding frame therein;

first difference absolute value sum calculating means for calculating difference absolute value sum of pixel data located within reference blocks sequentially set within a predetermined range of said image information of preceding frame stored in said second memory means;

first minimum value selecting means for obtaining motion vector data of first integer pixel accuracy based on first difference absolute value sum data of smallest value of a plurality of difference absolute value sum data from said difference absolute value sum calculating means;

second minimum value selecting means for obtaining motion vector data of second integer pixel accuracy based on second difference absolute value sum of smallest value of difference absolute value sum data which results from calculating pixel data located within a reference block corresponding to one field located within reference blocks sequentially set in a predetermined range of said image information of preceding frame stored in said second memory means and pixel data located within a remarkable block in said image information of present frame stored in said first memory means;

first interpolation pixel generating means for generating interpolation pixel data between pixel data and pixel data within a predetermined area including pixel data located in said image information of preceding frame indicated by said motion vector data of first integer pixel accuracy supplied thereto from said first minimum value selecting means;

third motion detecting means for calculating difference absolute value sum of interpolation pixel data located within a sub-interpolation reference block smaller than a plurality of interpolation reference blocks composed of interpolation pixel data supplied thereto from said first interpolation pixel generating means and pixel data located within a sub-remarkable block smaller than the remarkable block, and obtaining motion vector data of first half-pel accuracy based on third difference absolute value sum data of smallest value of a plurality of difference absolute value sum data obtained by difference absolute value sum calculation;

second interpolation pixel generating means for generating interpolation pixel data between pixel data and pixel data within a predetermined area of one field including pixel data located in said image information of preceding frame indicated by said motion vector data of second integer pixel accuracy supplied thereto from said second minimum value selecting means;

second motion detecting means for calculating difference absolute value sum of interpolation pixel data located within a sub-interpolation reference block smaller than a plurality of interpolation reference blocks composed of interpolation pixel data supplied from said second interpolation pixel generating means and pixel data located within a sub-remarkable block smaller than the remarkable block, and obtaining motion vector data of second half-pel accuracy based on fourth difference absolute value sum data of smallest value in a plurality of difference absolute value sum data obtained by said difference absolute value sum data;

comparing means for comparing said third difference absolute value sum data supplied thereto from said first motion detecting means and said fourth difference absolute value sum data supplied thereto from said second motion detecting means;

selecting means for selecting said motion vector data of first half-pel accuracy supplied thereto from said first motion detecting means and said motion vector data of second half-pel accuracy supplied thereto from said second motion detecting means based on a compared result from said comparing means;

motion compensating means for motion-compensating said image information of preceding frame based on said third motion vector data or said fourth motion vector data supplied thereto from said selecting means;

encoding means for effecting encoding based on said motion-compensated image information of preceding frame supplied thereto from said motion compensating means and said image information of present frame stored in said first memory means;

transmitting means for transmitting an output supplied thereto from said encoding means; and decoding means for decoding transmitted information.

15. An information transmission system according to claim 14, wherein said first and second interpolation pixel generating means comprise a plurality of systems composed of a plurality of delay circuits and adding circuits whose number is the same as that of said reference blocks for generating interpolation pixel data of a plurality of reference blocks from said image information of preceding frame supplied thereto from said second memory means, and averaging means respectively provided at last stages of said plurality of systems, and said third and fourth motion detecting means comprise a plurality of difference absolute value sum calculating means for calculating difference absolute value sum of respective outputs supplied thereto from said plurality of difference absolute value sum calculating means and pixel data of said remarkable block supplied thereto from said first memory means, and minimum value selecting means for obtaining motion vector data based on difference absolute value sum of smallest value of a plurality of difference absolute value sum data supplied thereto from said plurality of difference absolute value sum calculating means.

* * * * *